(12) United States Patent
Taylor

(10) Patent No.: US 12,192,307 B2
(45) Date of Patent: Jan. 7, 2025

(54) DISTRIBUTIVE ON-DEMAND ADMINISTRATIVE TASKING APPARATUSES, METHODS AND SYSTEMS

(71) Applicant: Timothy G. Taylor, Bloomington, MN (US)

(72) Inventor: Timothy G. Taylor, Bloomington, MN (US)

( * ) Notice: Subject to any disclaimer, the term of this patent is extended or adjusted under 35 U.S.C. 154(b) by 1257 days.

(21) Appl. No.: 16/444,432

(22) Filed: Jun. 18, 2019

(65) Prior Publication Data

US 2019/0306272 A1 Oct. 3, 2019

Related U.S. Application Data

(63) Continuation of application No. 14/444,544, filed on Jul. 28, 2014, now abandoned, which is a
(Continued)

(51) Int. Cl.
| | |
|---|---|
| H04L 67/62 | (2022.01) |
| G06Q 10/02 | (2012.01) |
| G06Q 10/06 | (2023.01) |
| G06Q 10/0631 | (2023.01) |
| G06Q 20/08 | (2012.01) |
| G06Q 20/10 | (2012.01) |
| G06Q 30/018 | (2023.01) |
| G06Q 30/08 | (2012.01) |
| G06Q 40/12 | (2023.01) |
| G06Q 50/18 | (2012.01) |
| G06Q 50/40 | (2024.01) |

(Continued)

(52) U.S. Cl.
CPC .............. *H04L 67/62* (2022.05); *G06Q 10/02* (2013.01); *G06Q 10/06* (2013.01); *G06Q 10/06311* (2013.01); *G06Q 20/08* (2013.01); *G06Q 20/10* (2013.01); *G06Q 30/018* (2013.01); *G06Q 30/08* (2013.01); *G06Q 40/12* (2013.12); *G06Q 50/18* (2013.01); *G06Q 50/40* (2024.01); *H04L 67/10* (2013.01); *H04L 67/1097* (2013.01); *H04L 67/51* (2022.05)

(58) Field of Classification Search
None
See application file for complete search history.

(56) References Cited

U.S. PATENT DOCUMENTS

| | | |
|---|---|---|
| 2,883,106 A | 4/1959 | Cornell et al. |
| 3,631,452 A | 12/1971 | Richard |
| | (Continued) | |

FOREIGN PATENT DOCUMENTS

WO 03/003704 9/2003

OTHER PUBLICATIONS

International Search Report dated Jun. 6, 2013, and Written Opinion dated Jun. 6, 2013 for PCT/US2013023446; 10 pages.
(Continued)

*Primary Examiner* — Atta Khan
(74) *Attorney, Agent, or Firm* — DeWitt LLP; Brian R. Pollack, Esq.

(57) ABSTRACT

The DISTRIBUTIVE ON-DEMAND ADMINISTRATIVE TASKING APPARATUSES, METHODS AND SYSTEMS ("DODAT™ embodiments"), in many embodiments, transform ticket and user inputs via DODAT™ components into payment and work product outputs.

17 Claims, 17 Drawing Sheets

Related U.S. Application Data continuation of application No. PCT/US2013/023446, filed on Jan. 28, 2013.

(60) Provisional application No. 61/592,186, filed on Jan. 30, 2012.

(51) Int. Cl.
*H04L 67/10* (2022.01)
*H04L 67/1097* (2022.01)
*H04L 67/51* (2022.01)

(56) References Cited

U.S. PATENT DOCUMENTS

| | | |
|---|---|---|
| 4,805,107 A | 2/1989 | Kieckhafer et al. |
| 4,817,018 A | 3/1989 | Cree et al. |
| 4,862,357 A | 8/1989 | Ahlstrom et al. |
| 4,896,269 A | 1/1990 | Tong |
| 4,937,743 A | 6/1990 | Rassman et al. |
| 5,093,794 A | 3/1992 | Howie et al. |
| 5,182,705 A | 1/1993 | Barr et al. |
| 5,253,166 A | 10/1993 | Dellelbach et al. |
| 5,255,181 A | 10/1993 | Chapman et al. |
| 5,301,320 A | 4/1994 | McAtee et al. |
| 5,311,425 A | 5/1994 | Inada |
| 5,416,473 A | 5/1995 | Dulaney, III et al. |
| 5,423,023 A | 6/1995 | Batch et al. |
| 5,467,268 A | 11/1995 | Sisley et al. |
| 5,481,668 A | 1/1996 | Marcus |
| 5,530,861 A | 6/1996 | Diamant et al. |
| 5,548,506 A | 8/1996 | Srinivasan |
| 5,581,691 A | 12/1996 | Hsu et al. |
| 5,604,676 A | 2/1997 | Penzias |
| 5,742,520 A | 3/1998 | Goheen |
| 5,832,452 A | 11/1998 | Schneider et al. |
| 5,832,454 A | 11/1998 | Jafri et al. |
| 5,842,176 A | 11/1998 | Hunt et al. |
| 5,848,393 A | 12/1998 | Goodridge et al. |
| 5,864,818 A | 1/1999 | Feldman |
| 5,867,822 A | 2/1999 | Sankar |
| 5,948,040 A | 9/1999 | Delorme et al. |
| 5,960,420 A | 9/1999 | Leymann et al. |
| 5,963,913 A | 10/1999 | Henneuse et al. |
| 5,974,392 A | 10/1999 | Endo |
| 5,999,911 A | 12/1999 | Berg et al. |
| 6,014,628 A | 1/2000 | Kovarik, Jr. |
| 6,049,776 A | 4/2000 | Donnelly et al. |
| 6,092,048 A | 7/2000 | Nakaoka |
| 6,094,640 A | 7/2000 | Goheen |
| 6,148,297 A | 11/2000 | Swor et al. |
| 6,157,934 A | 12/2000 | Khan et al. |
| 6,161,146 A | 12/2000 | Kiey et al. |
| 6,304,850 B1 | 10/2001 | Keller et al. |
| 6,477,503 B1 | 11/2002 | Mankes |
| 6,571,158 B2 | 5/2003 | Sinex |
| 6,578,006 B1 | 6/2003 | Saito et al. |
| 6,618,504 B1 | 9/2003 | Yoshino |
| 6,675,151 B1 | 1/2004 | Thompson et al. |
| 6,810,383 B1 * | 10/2004 | Loveland ............... G06Q 10/06 705/7.38 |
| 6,832,176 B2 | 12/2004 | Hartigan et al. |
| 6,859,523 B1 | 2/2005 | Jilk et al. |
| 6,910,627 B1 | 6/2005 | Simpson-Young et al. |
| 6,937,993 B1 | 8/2005 | Gabbita et al. |
| 6,938,048 B1 | 8/2005 | Jilk et al. |
| 6,954,737 B2 | 10/2005 | Kalantar et al. |
| 6,965,876 B2 | 11/2005 | Dabbiere |
| 6,968,503 B1 | 11/2005 | Chang et al. |
| 7,107,268 B1 | 4/2006 | Lahey et al. |
| 7,069,228 B1 | 6/2006 | Rose et al. |
| 7,152,038 B2 | 12/2006 | Murashita et al. |
| 7,184,967 B1 | 2/2007 | Mital et al. |
| 7,275,039 B2 | 9/2007 | Setteducati |
| 7,328,166 B1 | 2/2008 | Geoghegan et al. |
| 7,357,298 B2 | 4/2008 | Pokorny et al. |
| 7,454,361 B1 | 11/2008 | Halavais et al. |
| 7,482,952 B2 | 1/2009 | Horstemeyer |
| 7,503,480 B2 | 3/2009 | Barnes et al. |
| 7,570,151 B2 | 8/2009 | Tuttle |
| 7,584,110 B2 | 9/2009 | Robertson |
| 7,668,800 B2 | 2/2010 | Motoyama et al. |
| 7,818,197 B2 | 10/2010 | Cho et al. |
| 8,032,913 B1 | 10/2011 | Pierre et al. |
| 8,055,510 B2 | 11/2011 | Miller |
| 8,139,592 B2 | 3/2012 | Clark et al. |
| 8,225,271 B2 | 7/2012 | Eldridge et al. |
| 8,499,300 B2 | 7/2013 | Zimberg et al. |
| 8,520,230 B2 | 8/2013 | Kato et al. |
| 8,571,884 B2 | 10/2013 | Badgett et al. |
| 8,589,204 B2 | 11/2013 | Takashi |
| 8,606,605 B2 | 12/2013 | Bayne et al. |
| 8,620,750 B2 | 12/2013 | DePasquale et al. |
| 8,645,907 B2 | 2/2014 | Sandeep et al. |
| 8,655,692 B2 | 2/2014 | Junkin |
| 8,757,485 B2 | 6/2014 | Drees et al. |
| 8,781,998 B2 | 7/2014 | Jafri et al. |
| 8,805,713 B2 | 8/2014 | Duffy et al. |
| 8,825,511 B2 | 9/2014 | Hamilton et al. |
| 8,826,282 B2 | 9/2014 | Motoyama et al. |
| 8,856,246 B2 | 10/2014 | Post et al. |
| 2002/0007300 A1 | 1/2002 | Slatter |
| 2002/0013832 A1 | 1/2002 | Hubbard |
| 2002/0016729 A1 | 2/2002 | Breitenbach et al. |
| 2002/0019886 A1 | 2/2002 | Sanghvi et al. |
| 2002/0046072 A1 | 4/2002 | Arai et al. |
| 2002/0077842 A1 | 6/2002 | Charisius et al. |
| 2002/0082946 A1 | 7/2002 | Morrison et al. |
| 2002/0111842 A1 * | 8/2002 | Miles ............... G06Q 10/1097 705/7.24 |
| 2003/0004760 A1 | 1/2003 | Schiff et al. |
| 2003/0018508 A1 | 1/2003 | Schwanke |
| 2003/0084016 A1 | 5/2003 | Norgaard et al. |
| 2003/0110070 A1 | 6/2003 | De Goeij |
| 2003/0149714 A1 | 8/2003 | Casati et al. |
| 2003/0177178 A1 | 9/2003 | Jones et al. |
| 2004/0117046 A1 | 6/2004 | Colle et al. |
| 2004/0128173 A1 | 7/2004 | Salonen |
| 2005/0004818 A1 | 1/2005 | Liman |
| 2005/0027651 A1 | 2/2005 | Devault |
| 2005/0028158 A1 * | 2/2005 | Ferguson ............... G06F 9/542 718/100 |
| 2005/0038722 A1 | 2/2005 | Throndson et al. |
| 2005/0201546 A1 * | 9/2005 | Yanase ............... G06Q 10/04 379/265.12 |
| 2005/0288974 A1 | 12/2005 | Branowski et al. |
| 2006/0026082 A1 | 2/2006 | Han |
| 2006/0074714 A1 | 4/2006 | Aziz et al. |
| 2006/0282504 A1 | 12/2006 | Yoshioka et al. |
| 2007/0094661 A1 | 4/2007 | Baird et al. |
| 2007/0271123 A1 | 11/2007 | Miyashita |
| 2008/0010105 A1 | 1/2008 | Rose et al. |
| 2008/0015875 A1 | 1/2008 | Gardner |
| 2008/0021885 A1 | 1/2008 | Jones |
| 2008/0052159 A1 | 2/2008 | Balakrishman et al. |
| 2008/0114638 A1 | 5/2008 | Colliau et al. |
| 2008/0120129 A1 | 5/2008 | Seubert et al. |
| 2008/0142581 A1 | 6/2008 | Roebke et al. |
| 2008/0221964 A1 | 9/2008 | Berkovitz et al. |
| 2008/0229214 A1 | 9/2008 | Hamilton et al. |
| 2009/0030885 A1 | 1/2009 | DePasquale et al. |
| 2009/0157555 A1 | 6/2009 | Biffle et al. |
| 2009/0187454 A1 | 7/2009 | Khasin et al. |
| 2009/0204470 A1 | 8/2009 | Weyl et al. |
| 2009/0204471 A1 | 8/2009 | Elenbaas et al. |
| 2009/0210282 A1 | 8/2009 | Elenbaas et al. |
| 2009/0276259 A1 | 11/2009 | Bliznak |
| 2009/0307019 A1 | 12/2009 | Grussu |
| 2009/0328227 A1 | 12/2009 | Cook et al. |
| 2010/0010862 A1 | 1/2010 | Nielsen et al. |
| 2010/0125475 A1 | 2/2010 | Swart |
| 2010/0174577 A1 | 5/2010 | Twyman |
| 2011/0145057 A1 | 6/2011 | Jones et al. |
| 2012/0011239 A1 | 1/2012 | Svane et al. |

(56) References Cited

U.S. PATENT DOCUMENTS

2012/0053992 A1    3/2012   Erol et al.
2012/0166264 A1    6/2012   Shum et al.
2012/0330697 A1   12/2012  Smith et al.
2013/0198358 A1    8/2013   Taylor

OTHER PUBLICATIONS

Zendesk Overview, 34 pages, May 2013.
Freshdesk Overview, Storyboard:V001, 13 pages, Copyright 2012 mypromovideos.
USPTO Non-Final Office Action with notification date of Sep. 3, 2013, in related U.S. Appl. No. 13/768,231.
USPTO Final Office Action with notification date of Jan. 30, 2014, in related U.S. Appl. No. 13/768,231.
USPTO Non-Final Office Action with notification date of Sep. 11, 2014, in related U.S. Appl. No. 13/768,231.
USPTO Final Office Action with notification date of Jun. 3, 2015, in related U.S. Appl. No. 13/768,231.
USPTO Non-Final Office Action with notification date of Oct. 5, 2015, in related U.S. Appl. No. 13/768,231.
USPTO Final Office Action with notification date of May 26, 2016, in related U.S. Appl. No. 13/768,231.
USPTO Non Final Office Action with notification date of Aug. 31, 2017, in related U.S. Appl. No. 14/444,544.
USPTO Final Office Action with notification date of Mar. 18, 2019, in related U.S. Appl. No. 14/444,544.

\* cited by examiner

| | |
|---|---|
| Administrative employees want a fast and simple method of obtaining work<br>110 | Supervisors want a simple way of delegating tasks and keeping track of high-priority tasks<br>120 |

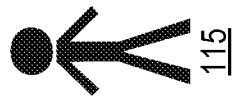
115

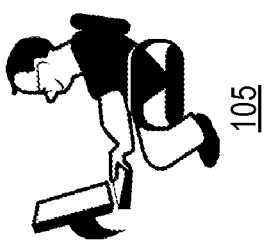
105

| | |
|---|---|
| Truckers want a fast and simple method of getting paid after completing a delivery<br>130 | DODAT(TM) systems, methods and programs allow supervisors to create tickets that represent tasks to be completed, allows employees to easily choose tasks to complete, and allows truckers to provide proof of delivery immediately after the delivery<br>140 |

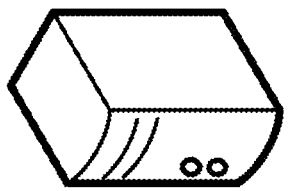
135

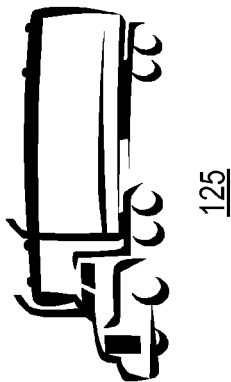
125

Figure 1a

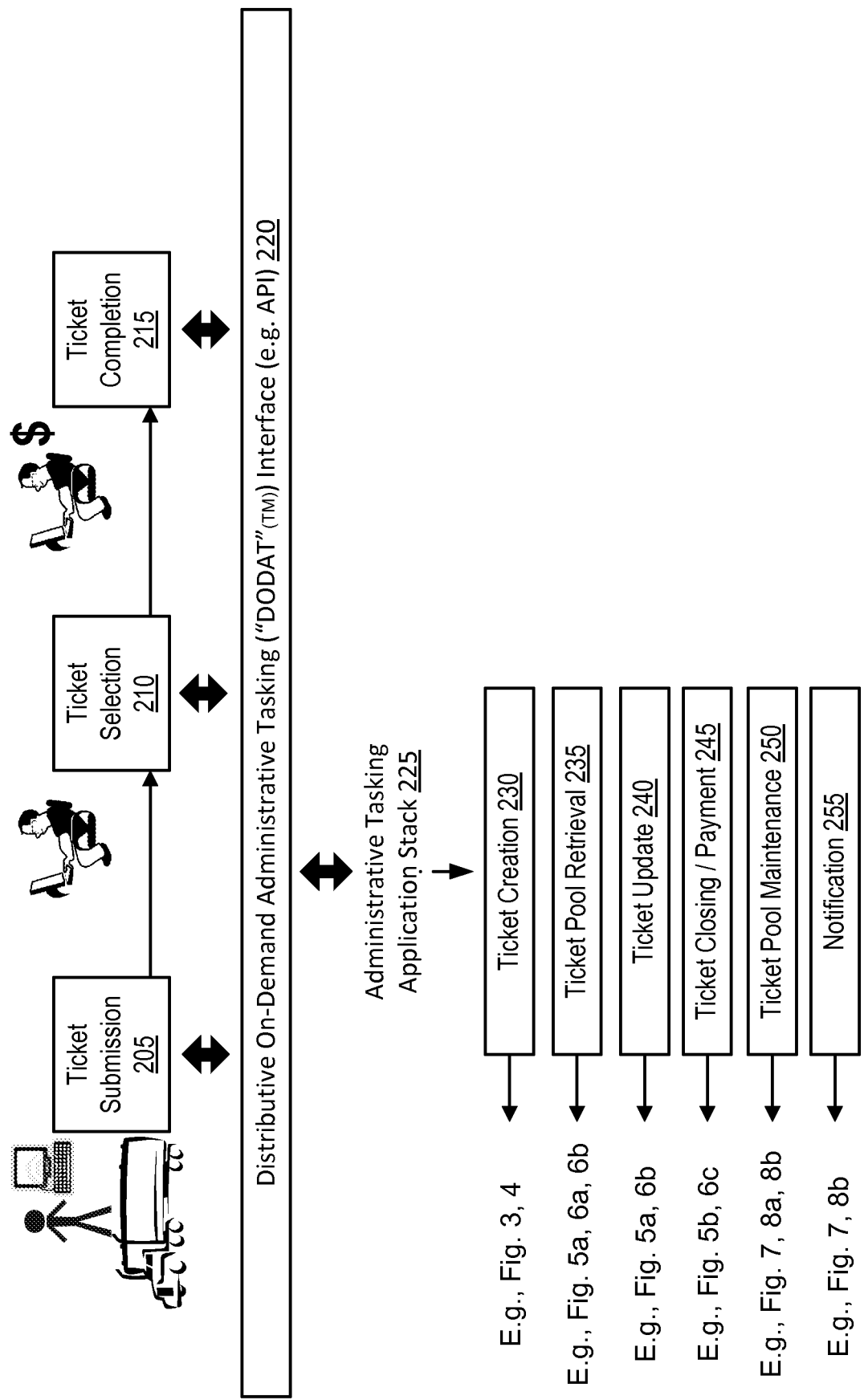

DISTRIBUTIVE ON-DEMAND ADMINISTRATIVE TASKING APPARATUSES, METHODS AND SYSTEMS

CROSS-REFERENCE TO RELATED APPLICATIONS

The present patent application is a continuation of and claims the benefit of priority to U.S. patent application Ser. No. 14/444,544, filed Jul. 28, 2014, which in turn is a continuation of and claims the benefit of priority to International Patent Application No. PCT/US2013/023446, filed Jan. 28, 2013, which in turn claims the benefit of priority to U.S. Provisional Patent Application No. 61/592,186, filed Jan. 30, 2012. Each of the foregoing patent applications is incorporated by reference herein in its entirety for any purpose whatsoever.

COPYRIGHT NOTICE

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

Computers are used in a number of different contexts for a variety of different purposes. A user may interact with a computer to connect to the Internet, which may allow the user to complete a number of different tasks via websites. Websites information is often stored in servers, which are able to keep track of data concerning the user and the user's activity.

SUMMARY OF THE DISCLOSURE

The purposes and advantages of embodiments of the present disclosure will be set forth in and become apparent from the description that follows. Additional advantages of the disclosed embodiments will be realized and attained by the methods, systems, computer programs and mobile computing devices particularly pointed out in the written description hereof, as well as from the appended drawings.

In a first aspect, the disclosure provides a method for operating a distributive on demand administrative tasking system. In some embodiments, the method includes receiving distributive on demand administrative task information via processor, the distributive on demand administrative task information relating to a distributive on demand administrative task to be performed, analyzing the distributive on demand administrative task information via processor to create a distributive on demand administrative task ticket containing a plurality of fields containing distributive on demand administrative task ticket information, and storing the distributive on demand administrative task ticket in a distributive on demand administrative task database.

In some embodiments, the method can further include receiving a distributive on demand administrative task ticket request from an administrative service provider. If desired, the method can further include forwarding the distributive on demand administrative task ticket to the administrative service provider by way of a distributive on demand administrative tasking server. The distributive on demand administrative task ticket may or may not be time sensitive.

In some implementations, the distributive on demand administrative tasking server has a distributive on demand administrative task ticket queue for posting distributive on demand administrative task tickets, the queue being adapted and configured to permit an administrative service provider to select at least one distributive on demand administrative task ticket for completion. The method can further include posting a set of distributive on demand administrative task tickets to the queue on the distributive on demand administrative tasking server during a preselected time period. The preselected time period can coincide with when workflow in the queue is at a relatively low level. In some implementations, the preselected time period is seasonal and can vary with industry. For example, the time period can be between mid-April and mid-October, and the distributive on demand administrative task tickets can relate to completion of amended tax returns in contrast to regular federal tax return filings typically due on April 15 and October 15.

In some implementations, the method can further include posting a set of distributive on demand administrative task tickets to a queue in a distributive on demand administrative tasking server at a predetermined time of the day, the queue being adapted and configured to permit an administrative service provider to select at least one distributive on demand administrative task ticket for completion. The predetermined time of the day may be selected to overlap with a critical business flow time period, such as 6 am-9 am eastern standard time US or 4 pm-7 pm pacific time US.

In many implementations, completion of a distributive on demand administrative task ticket within the queue results in remuneration to the administrative service provider. In some implementations, all or substantially all of the distributive on demand administrative task tickets in the queue can be assigned a remuneration value, wherein completion of each ticket can result in remuneration to the administrative service provider in an amount equal to the remuneration value. In some implementations, the distributive on demand administrative task tickets in the queue can have an average remuneration value, and the set of distributive on demand administrative task tickets can form a subset of distributive on demand administrative task tickets within the queue. The average remuneration value of the distributive on demand administrative tasks in the set of distributive on demand administrative task tickets in the queue can be more than the average remuneration value of the distributive on demand administrative task tickets in the queue.

In some implementations, the distributive on demand administrative task ticket relates to a task involving at least one of: (i) a strategic administrative task, (ii) verification of information in company records, (iii) verification that an agreement has been signed with a service provider, (iv) collection of competitive business intelligence, (v) contacting a service provider to establish an automated clearing house ("ACH") funds transfer agreement, (vi) governmental administrative functions, (vii) the sale of goods or services, (viii) vehicular maintenance, (ix) aircraft maintenance, (x) administrative processing of legal rights, (xi) processing of permits, (xii) processing of licenses, (xiii) resolving billing disputes, (xiv) technical support and (xv) online support. In some implementations, the distributive on demand administrative task tickets can relate to at least one of: (i) verifying that a contract is in place with a client, (ii) verifying that a contract is in place with a shipper, (iii) verification of address information, (iv) a credit check, (v) a cash advance, (vi) contacting administrative service providers working for a competitor in order to determine if they are interested in exploring career opportunities and (vii) contacting a trucking company to establish an automated clearing house ("ACH") funds transfer agreement.

In some implementations, the method can further include assigning a distributive on demand administrative task time frame within which the distributive on demand administrative task needs to be performed, and populating at least one of the plurality of fields of the distributive on demand administrative task ticket with the distributive on demand administrative task time frame. In some implementations, the method can further include assigning a distributive on demand administrative task description, and populating at least one of the plurality of fields of the distributive on demand administrative task ticket with the distributive on demand administrative task description. In further implementations, the method can further include assigning a distributive on demand administrative task priority level relating to the urgency of the distributive on demand administrative task, and populating at least one of the plurality of fields of the distributive on demand administrative task ticket with the distributive on demand administrative task priority level.

In some implementations, the method can further include assigning a remuneration value for completing the distributive on demand administrative task ticket, and populating at least one of the plurality of fields of the distributive on demand administrative task ticket with the remuneration value for completing the distributive on demand administrative task ticket. The remuneration value assignment step can include, by way of example, assigning a first remuneration value to a first distributive on demand administrative task ticket, and assigning a second remuneration value different than the first remuneration value to a second distributive on demand administrative task ticket. The first distributive on demand administrative task ticket and second distributive on demand administrative task ticket may relate to different types of administrative tasks, such as tasks requiring different amounts of work to complete. The remuneration value for completing the distributive on demand administrative task ticket can vary depending on the time of day, or other factors, as set forth herein. For example, the remuneration value for completing the distributive on demand administrative task ticket can vary depending on the number of tickets in the queue. If desired, the distributive on demand administrative task ticket can have a relatively high remuneration value at a time of peak workflow.

In some implementations, the remuneration value can be established by receiving at least one bid from a bidder for completing the distributive on demand administrative task ticket, analyzing the at least one bid to determine if the at least one bid is equal to or less than a threshold value, and awarding the distributive on demand administrative task ticket to the bidder associated with the at least one bid if the bid is equal to or less than the threshold value. In some implementations, the method can further include awarding the distributive on demand administrative task ticket to the lowest bidder if the lowest bid is higher than the threshold. In further implementations, the method can further include raising the threshold value if no bids are received that are equal to or less than the threshold, receiving further bids for completing the distributive on demand administrative task ticket, analyzing the further bids to determine if the at least one bid is less than or equal to the threshold value, and awarding the distributive on demand administrative task ticket to the bidder that submitted the lowest bid if the lowest bid is less than or equal to the threshold value. Such methods can further include raising the threshold value and receiving further bids until at least one bid is equal to or less than the threshold value, and awarding the distributive on demand administrative task ticket to the bidder that submitted the lowest bid.

In various implementations, the method can further include receiving a plurality of bids for completing the distributive on demand administrative task ticket from one or more bidders, reviewing the plurality of bids to identify at least one bid is less than or equal to the threshold value, and awarding the distributive on demand administrative task ticket to the bidder that submitted the lowest bid.

The disclosure provides further methods for operating a distributive on demand administrative tasking system. In some implementations, the methods can include receiving a message containing distributive on demand administrative task information via processor, the distributive on demand administrative task information relating to a distributive on demand administrative task to be performed, parsing the message and extracting the distributive on demand administrative task information via processor, analyzing the distributive on demand administrative task information via processor to create a distributive on demand administrative task ticket containing a plurality of fields of distributive on demand administrative task ticket information, and posting the distributive on demand administrative task ticket in a queue in a distributive on demand administrative tasking server.

In some implementations, the method can further include storing the distributive on demand administrative task ticket in a distributive on demand administrative task database. If desired, the message containing distributive on demand administrative task information can be received via a facsimile message, and the facsimile message can be parsed to identify and extract the distributive on demand administrative task information. The message containing distributive on demand administrative task information can be an electronic mail message, and the electronic mail message can be parsed to identify and extract the distributive on demand administrative task information. In some implementations, the distributive on demand administrative task information can relate to an inquiry from an administrative service provider. In some implementations, the method can further include searching the distributive on demand administrative task information to identify a key word, assigning a priority value to the ticket created using the distributive on demand administrative task information if the key word is present in the distributive on demand administrative task information to create a priority ticket, and posting the priority ticket proximate the top of the queue in the distributive on demand administrative tasking server. Such methods can further include searching the distributive on demand administrative task information to identify a key word, assigning a normal value to the ticket created using the distributive on demand administrative task information if the key word is not present in the distributive on demand administrative task information to create a normal ticket, and posting the normal ticket to the queue in the distributive on demand administrative tasking server, or storing the distributive on demand administrative task ticket in the distributive on demand administrative task database. By way of further example, such methods can further include generating a first alarm message if the priority ticket is not selected for processing by a service provider within a first predetermined time period; and forwarding the first alarm message to a supervisor. In some implementations, the method further includes generating a second alarm message if the priority ticket is not selected for processing by a service provider within a second predetermined time period; and forwarding the alarm message to a supervisor. At least one of the first alarm message and second alarm message is forwarded to the supervisor as a SMS text message or electronic mail message. In some implementations, the method can further include forwarding the first alarm message to a plurality of service providers logged into the distributive on demand administrative tasking system. The first predetermined time period can be between, for example, about one minute and about ten minutes, about three minutes and about eight minutes and the like, and can be, for example, about five minutes.

In some implementations, the priority ticket can relate to at least one of: (i) a credit hold, (ii) a cash advance, (iii) a credit advance, (iii) a fuel advance, (iv) a parts advance, (v) a credit check and (vi) a medical emergency. In some implementations, the priority ticket must be selected by an administrative service provider for completion before a normal ticket assigned a normal priority value can be selected for completion.

In further aspects, the disclosure provides a method for operating a distributive on demand administrative tasking system that includes receiving distributive on demand administrative task information via processor, the distributive on demand administrative task information relating to a distributive on demand administrative task to be performed, analyzing the distributive on demand administrative task information via processor to create a distributive on demand administrative task ticket containing a plurality of fields containing distributive on demand administrative task ticket information, forwarding the distributive on demand administrative task ticket to an administrative service provider by way of a distributive on demand administrative tasking server, receiving completion information from the administrative service provider indicating that the distributive on demand administrative task is complete, and initiating payment to the administrative service provider for completing the distributive on demand administrative task. In some implementations, the amount of payment to the administrative service provider can be dependent upon the degree to which the task was completed.

In further aspects, the disclosure provides a method for managing payments within a distributive on demand administrative tasking system that includes receiving payment information via processor from a first party, the payment information relating to a payment to be received by a bank account associated with an administrator of the distributive on demand administrative tasking system from a second party in order to issue payment to a third party, receiving funds transfer information relating to the bank account associated with the administrator of the distributive on demand administrative tasking system, analyzing the funds transfer information to identify an amount of funds transferred into the bank account associated with the administrator of the distributive on demand administrative tasking system, and comparing the funds transfer information to the payment information to determine if the amount of funds transferred into the bank account associated with the administrator of the distributive on demand administrative tasking system is sufficient to permit issuance of payment to the third party.

In some implementations, the amount of funds transferred into the bank account associated with the administrator of the distributive on demand administrative tasking system may be insufficient to permit issuance of payment to the third party. If so, the method can further include generating a distributive on demand administrative task ticket including a request to resolve the insufficiency of funds, and posting the distributive on demand administrative task in a queue visible to at least one service provider. In some implementations, the payment information can include a key word that, when parsed and detected, causes the distributive on demand administrative tasking system to interrogate a bank account server associated with the bank account in order to obtain the funds transfer information. The distributive on demand administrative tasking system can interrogate the bank account server periodically until it obtains the funds transfer information.

The disclosure further provides methods for managing payments within a distributive on demand administrative tasking system. In some implementations, the methods can include receiving distributive on demand administrative task payment information via processor from a first party, the distributive on demand administrative task payment information relating to funds to be received by a bank account associated with an administrator of the distributive on demand administrative tasking system from a second party for issuing a payment in a first amount to a third party, analyzing the distributive on demand administrative task payment information via processor to create a first distributive on demand administrative task ticket containing a plurality of fields containing distributive on demand administrative task ticket information relating to the payment, receiving funds transfer information relating to the account associated with the administrator of the distributive on demand administrative tasking system, generating a second distributive on demand administrative task ticket, the second distributive on demand administrative task ticket including a request to determine if the funds transfer information describes a funds transfer that satisfies the payment information, forwarding the second distributive on demand administrative task ticket to a service provider for execution, and receiving matching information from the service provider, the matching indication indicating whether funds were received from the second party in an amount sufficient to satisfy the payment.

In some implementations, the matching information may indicate that sufficient funds were received to issue payment to the third party, and the method can further include forwarding the payment in the first amount to the third party. In some implementations, the method can further include issuing a service payment to the service provider for completing the distributive on demand administrative task. The service payment can be a predetermined percentage of the payment to the third party, or a different amount, as desired. The matching information can indicate that insufficient funds were received from the second party to issue payment in the first amount to the third party, and the method can further include forwarding a payment to the third party in a second amount less than the first amount. In some implementations, the method can further include directing the third party to the service provider to resolve payment issues.

In some implementations, the method can further include issuing a service payment to the service provider for completing the distributive on demand administrative task in an amount less than an amount the service provider would have received if the funds received from the second party were sufficient to issue payment in the first amount to the third party. In some implementations, the administrator can be, for example, a broker, and the first party can be an agent that arranged a service by the third party for the benefit of the second party.

In accordance with further embodiments, the disclosure provides methods for managing payments within a distributive on demand administrative tasking system. In some implementations, the methods can include receiving payment information via processor from a first party, the payment information relating to a payment to be received by a bank account associated with an administrator of the distributive on demand administrative tasking system from a second party in order to issue payment to a third party, receiving funds transfer information via processor relating to the bank account associated with the administrator of the distributive on demand administrative tasking system, generating a distributive on demand administrative task ticket for comparing the payment information the funds transfer information, forwarding the distributive on demand administrative task ticket to an administrative service provider, and receiving a verification message via processor from the administrative service provider, the verification message including verification information concerning whether the payment information matches the funds transfer information to permit payment to be issued to the third party.

In some implementations, the verification information may indicate that the payment information matches the funds transfer information; and the method can further include issuing payment to the third party. The verification information may indicate that the payment information does not match the funds transfer information, and that that the payment information is correct. In such embodiments, the method can further include issuing a payment to the third party in accordance with the payment information. In other implementations, the verification information may indicate that the payment information does not match the funds transfer information, that the funds transfer information is correct and the payment information is incorrect. In such embodiments, the method may further include issuing a payment to the third party in accordance with the funds transfer information. In some implementations, an administrator may receive payment for a commission when the funds transfer information is received.

The disclosure further provides methods for managing payments and/or complaints within a daily deal system, such as those operated under the trade names of GroupOn® and LivingSocial®. Such implementations can include, for example, receiving payment input from a customer via processor to purchase a coupon for the purchase of goods and/or services from a merchant, distributing the coupon to the customer for purchasing the goods and/or services from the merchant; receiving complaint information via processor from at least one of the merchant and the customer, the complaint information describing a complaint related to the coupon and generating a distributive on demand administrative task ticket for resolving the complaint, and forwarding the complaint to an administrative service provider to resolve the complaint. In some implementations, the administrative service provider may be an agent that arranged a contract with the merchant for the coupon.

The disclosure further provides methods for managing payments and/or complaints within a transportation booking system. Some implementations can include receiving payment input from a customer via processor to purchase a ticket for travel from a first location to a second location from a carrier, distributing the ticket to the customer for executing the travel, receiving complaint information via processor from the customer, the complaint information describing a complaint related to at least one of the ticket and the travel, generating a distributive on demand administrative task ticket for resolving the complaint, and forwarding the complaint to an administrative service provider to resolve the complaint.

The disclosure also provides further methods for operating a distributive on demand administrative tasking system. Some implementations can include receiving invoice information via processor, the invoice information describing a payment required to satisfy the invoice, receiving payment information via processor, the payment information describing a payment for satisfying the invoice, comparing the invoice information to the payment information to determine if the amount of the payment is sufficient to satisfy the invoice, generating a distributive on demand administrative task ticket if the payment is insufficient to satisfy the invoice, and posting the distributive on demand administrative task ticket in a queue on a distributive on demand administrative tasking server, the queue and distributive on demand administrative task ticket being available for selection by at least one administrative service provider.

In some implementations, the method can further include forwarding the distributive on demand administrative task ticket to the at least one administrative service provider for execution, and receiving completion information from the at least one administrative service provider, the completion information indicating that the distributive on demand administrative task is complete. In some implementations, the method can further include receiving further payment information via processor, the further payment information describing the provision of further funds for satisfying the invoice, and comparing the invoice information to the payment information and further payment information to determine if sufficient funds have been received to satisfy the invoice. In some implementations, the comparing step may generate a sufficient funds condition indicating that sufficient funds have been received to satisfy the invoice; and the method may further include issuing payment for the invoice. In some implementations, the comparing step may generates an insufficient funds condition indicating that insufficient funds have been received to satisfy the invoice, and the method can further include generating a second distributive on demand administrative task ticket containing information relating to resolving the insufficient funds condition, and posting the second distributive on demand administrative task ticket in the queue on the distributive on demand administrative tasking server, the queue and distributive on demand administrative task ticket being available for selection by the at least one service provider. In some embodiments, the invoice may relate to at least one of: (i) payment for shipment of goods, (ii) trade services (iii) legal services, (iv) investment services and (v) administrative services.

In some embodiments, the method can further include logging each instance a distributive on demand administrative task ticket is generated for a first agent responsible for generating invoices or providing payment information. The method can further include preparing and sending an alert to an administrator of the distributive on demand administrative tasking system if the number of tickets attributable to the first agent exceeds a threshold. In some implementations, the threshold can determined by performing a comparison of the number of tickets attributable to the first agent with an average number of tickets attributable to each of a plurality of agents. If desired, the method can further include generating a graphical representation of the comparison and displaying the comparison to the administrator.

The disclosure also provides further methods for initiating a payment process in a distributive on demand service management system. In some implementations, the method can include receiving a message including distributive on demand service completion information from a service provider via processor, the distributive on demand service completion information including an indication that a distributive on demand service has been completed and the geographic coordinates of the physical origin of the distributive on demand service completion information, parsing the distributive on demand service completion information, extracting at least a portion of the distributive on demand service completion information from the message, retrieving reference distributive on demand service completion data from a distributive on demand service database, the reference distributive on demand service completion data including a description of the distributive on demand service to be completed and the geographic coordinates of a location where the distributive on demand service is to be completed; and comparing the distributive on demand service completion information with the distributive on demand service completion data to determine if the geographic coordinates of the physical origin of the distributive on demand service completion information comport with the geographic coordinates of the location where the distributive on demand service is to be completed.

In some implementations, the geographic coordinates of the physical origin of the distributive on demand service completion information may comport with the geographic coordinates of the location where the distributive on demand service is to be completed, and the method can further include initiating payment to the service provider for completing the distributive on demand service. In other implementations, the geographic coordinates of the physical origin of the distributive on demand service completion information may substantially comport with the geographic coordinates of the location where the distributive on demand service is to be completed, and the method can further include generating a distributive on demand administrative task ticket to confirm that the distributive on demand service has been completed, and posting the distributive on demand administrative task ticket in a queue on a distributive on demand administrative tasking server, the queue and distributive on demand administrative task ticket being available for selection by at least one administrative service provider. In further implementations, the method can further include forwarding the distributive on demand administrative task ticket to the at least one administrative service provider for execution, and receiving completion information from the at least one administrative service provider, the completion information indicating that the distributive on demand service is complete. In some implementations, the method can include initiating payment to the service provider for completing the distributive on demand service.

In some implementations, the geographic coordinates of the physical origin of the distributive on demand service completion information may not comport with the geographic coordinates of the location where the distributive on demand service is to be completed, and the method can further include generating a distributive on demand administrative task audit ticket to investigate whether the distributive on demand service has been completed, and posting the distributive on demand administrative task audit ticket in a queue on a distributive on demand administrative tasking server, the queue and distributive on demand administrative task audit ticket being available for selection by at least one administrative service provider. In further implementations, the distributive on demand service completion information can include a picture and/or written description of the location where the distributive on demand service is to be completed. In some implementations, the distributive on demand service can include delivery of a shipment by a delivery service.

In some embodiments, the distributive on demand service completion information can include a picture taken proximate the geographic coordinates of the location where the distributive on demand service is to be completed and the picture can evidence that action was taken to complete the distributive on demand service. In some embodiments, the distributive on demand service is assigned to the service provider by the service provider selecting a distributive on demand service ticket from a queue in a distributive on demand service database. The distributive on demand service ticket can be created by the distributive on demand service database in response to receiving a request for a distributive on demand service from a customer.

In some implementations, the method can further include forwarding a critique request to the customer after the distributive on demand service is completed to rate the quality of the services provided by the service provider. In further implementations, the method can include forwarding a critique request to the service provider after the distributive on demand service is completed to rate one or more attributes of the customer.

In some embodiments, the distributive on demand service relates to at least one of food delivery services, plumbing services, mechanic/repair services, lawn/landscaping services, electrician services, carpentry services shipping services, other trade services, administrative services and aircraft maintenance and repair services.

In some implementations, systems, methods and machine readable programs are provided permitting an end user (e.g., customer) purchase and/or bid on goods in transit. Such goods may be subject to expiration. For example, in one embodiment, a food delivery service is provided (e.g., for pizza and other deliverable prepared foods. A comestible product (e.g., pizza) can be assigned a profile or other data describing, for example, the nature of the article (e.g., type of pizza, size of pizza, toppings, etc.), and time stamp of when the pizza came out of a cooking device (e.g., oven), price, and how long before it expires. Geolocation information can also be associated with the article on the article, (e.g., on a thermal container used to transport the pizza or other comestible product) or be associated with the individual or vehicle responsible for ultimate delivery. The article can then proceed toward an intended recipient, if desired. However, if desired, additional articles can be provided with a certain time before expiration, and a customer can observe the article's movement on a map through a geolocation service that includes the GPS encoding for the article/delivery vehicle. The user can tap on a screen of a mobile device (e.g., tablet, smartphone) to select an icon on a map where the article is located to review some or all of the data for the article. If the user so desires, the user can execute an online payment to pay for the article and to have it delivered, for example, to their geolocation by embedding location information in their order to permit the individual responsible for delivery to deliver the pizza. While it is appreciated that this system works well for pizza and other foods, it may similarly be adapted for use with other products subject to expiration such as flowers and the like. Moreover, it is contemplated that a mobile facility that produces products subject to expiration (e.g., flowers, food products) can be incorporated into the system such that an individual can monitor the location of the vehicle, determine what products it has to sell, the price of such products and/or reviews of the products. The individual can reserve such goods and drive to the location of the vehicle, request delivery of the goods, or establish a location to meet in order to collect the goods from the vendor. In some embodiments, pricing may be subject to the age of the article, and in further embodiments, one or more prospective purchasers may bid on the goods or negotiate for a purchase price for the goods with the vendor.

In some implementations, the distributive on demand service ticket includes information relating to at least one of weather conditions at the geographic coordinates of the location where the distributive on demand service is to be completed, an amount of compensation for completing the distributive on demand service, a description of services to be completed, a rating of the recipient of the distributive on demand service, a reference number for the distributive on demand service ticket and a time frame within which the distributive on demand service needs to be completed. In some further implementations, the service provider can select the distributive on demand service ticket by way of a mobile computing device such as a tablet or smartphone.

In some implementations, the distributive on demand service completion information may include time spent by the service provider at the geographic coordinates of the physical origin of the distributive on demand service completion information, and the method can further include matching the time spent by the service provider with an amount required to be spent by the service provider at the geographic coordinates of the physical origin of the distributive on demand service completion information. Payment can accordingly be made to the service provider upon completing the service in accordance with the time spent by the service provider at the geographic coordinates of the physical origin of the distributive on demand service completion information.

The disclosure also provides further methods for issuing a legal violation notice. In some implementations, the methods can include one or more of receiving a message including legal violation information from a first party via processor, the legal violation information including an indication that a legal violation has occurred and the geographic coordinates of the physical origin of the legal violation information, parsing the legal violation information, extracting at least a portion of the legal violation information from the message, analyzing the extracted legal violation information to identify a second party responsible for the legal violation, and issuing a legal violation notice to the second party.

In some embodiments, the legal violation information can include a visual representation of a vehicle parked illegally and image information of identification information of the vehicle. The method can further include analyzing the image to identify the vehicle. The legal violation can be issued to the owner of the vehicle. In some embodiments, the geographic coordinates can be used to identify the location of the illegally parked vehicle. In further implementations, the visual representation can include at least one of a still photograph and a digital video. In some implementations, the legal violation information relates to a moving traffic violation, and the legal violation information can include a visual representation of a moving vehicle engaged in illegal activity as well as identification information of the vehicle, as desired. The method can accordingly further include analyzing the image to identify the vehicle. Similarly, the legal violation can be issued to the owner of the vehicle.

In further implementations, the legal violation information can relate to at least one of running a red light, changing lanes without signaling, driving under the influence of alcohol and/or a controlled substance, and speeding. In various implementations, the visual representation can include at least one of a still photograph and a digital video.

In various implementations, the legal violation information relate to violation of a law or regulation. For example, the legal violation information can relate to at least one of unlawful trespassing, a violent crime, violation of a court order, a public nuisance, property damage, a zoning violation, littering, domestic violence and abuse of a minor. In various embodiments, the message including legal violation information can be generated and sent by way of a smartphone or a tablet. The legal violation notice can be issued to the second party by electronic means, such as electronic mail, facsimile, mobile device application, SMS text and the like, and/or may be sent by regular mail.

The disclosure also provides various distributive on demand administrative tasking systems. In some embodiments, such a system can include means for receiving distributive on demand administrative task information via a processor, the distributive on demand administrative task information relating to a distributive on demand administrative task to be performed, means for analyzing the distributive on demand administrative task information via processor to create a distributive on demand administrative task ticket containing a plurality of fields containing distributive on demand administrative task ticket information, and means for storing the distributive on demand administrative task ticket in a distributive on demand administrative task database.

In some implementations, the distributive on demand administrative tasking system can further include means for receiving a distributive on demand administrative task ticket request from an administrative service provider. If desired, the distributive on demand administrative tasking system can further include means for forwarding the distributive on demand administrative task ticket to the administrative service provider by way of a distributive on demand administrative tasking server. The distributive on demand administrative task ticket may or may not be time sensitive. The distributive on demand administrative tasking server can further include a distributive on demand administrative task ticket queue for posting distributive on demand administrative task tickets, the queue being adapted and configured to permit an administrative service provider to select at least one distributive on demand administrative task ticket for completion. The distributive on demand administrative tasking system can further include means for posting a set of distributive on demand administrative task tickets to the queue on the distributive on demand administrative tasking server during a preselected time period. If desired, the preselected time period can coincide with when workflow in the queue is at a relatively low level. For example, the preselected time period can be seasonal. In one embodiment, the time period is between mid-April and mid-October, and the distributive on demand administrative task tickets relate to completion of amended tax returns.

In some implementations, the distributive on demand administrative tasking system can further include means for posting a set of distributive on demand administrative task tickets to a queue in a distributive on demand administrative tasking server at a predetermined time of the day, the queue being adapted and configured to permit an administrative service provider to select at least one distributive on demand administrative task ticket for completion. The predetermined time of the day can be adapted to overlap with a critical business flow time period. Completion of a distributive on demand administrative task ticket within the queue can result in the system issuing remuneration to the administrative service provider.

In many embodiments, all or substantially all of the distributive on demand administrative task tickets in the queue have a remuneration value, wherein completion of each ticket results in the system issuing remuneration to the administrative service provider in an amount equal to the remuneration value. The distributive on demand administrative task tickets in the queue can have an average remuneration value, and the set of distributive on demand administrative task tickets can form a subset of distributive on demand administrative task tickets within the queue, wherein the average remuneration value of the distributive on demand administrative tasks in the set of distributive on demand administrative task tickets in the queue is more than the average remuneration value of the distributive on demand administrative task tickets in the queue.

In some embodiments, the distributive on demand administrative task ticket can relate to a task involving at least one of: (i) a strategic administrative task, (ii) verification of information in company records, (iii) verification that an agreement has been signed with a service provider, (iv) collection of competitive business intelligence, (v) contacting a service provider to establish an automated clearing house ("ACH") funds transfer agreement, (vi) governmental administrative functions, (vii) the sale of goods or services, (viii) vehicular maintenance, (ix) aircraft maintenance, (x) administrative processing of legal rights, (xi) processing of permits, (xii) processing of licenses, (xiii) resolving billing disputes, (xiv) technical support and (xv) online support.

In further embodiments, the distributive on demand administrative task ticket can relate to at least one of: (i) verifying that a contract is in place with a client, (ii) verifying that a contract is in place with a shipper, (iii) verification of address information, (iv) a credit check, (v) a cash advance, (vi) contacting administrative service providers working for a competitor in order to determine if they are interested in exploring career opportunities and (vii) contacting a trucking company to establish an automated clearing house ("ACH") funds transfer agreement.

In some implementations, the distributive on demand administrative tasking system can further include means for assigning a distributive on demand administrative task time frame within which the distributive on demand administrative task needs to be performed, and means for populating at least one of the plurality of fields of the distributive on demand administrative task ticket with the distributive on demand administrative task time frame. If desired, the distributive on demand administrative tasking system can further include means for assigning a distributive on demand administrative task description, and means for populating at least one of the plurality of fields of the distributive on demand administrative task ticket with the distributive on demand administrative task description. In some embodiments, the distributive on demand administrative tasking system can further include means for assigning a distributive on demand administrative task priority level relating to the urgency of the distributive on demand administrative task, and means for populating at least one of the plurality of fields of the distributive on demand administrative task ticket with the distributive on demand administrative task priority level.

If desired, the distributive on demand administrative tasking system can further include means for assigning a remuneration value for completing the distributive on demand administrative task ticket, and means for populating at least one of the plurality of fields of the distributive on demand administrative task ticket with the remuneration value for completing the distributive on demand administrative task ticket. The means for assigning a remuneration value can include means for assigning a first remuneration value to a first distributive on demand administrative task ticket, and means for assigning a second remuneration value different than the first remuneration value to a second distributive on demand administrative task ticket. The first distributive on demand administrative task ticket and second distributive on demand administrative task ticket can relate to different types of administrative tasks. The remuneration value for completing the distributive on demand administrative task ticket can vary, for example, depending on the time of day or in accordance with other parameters. For example, the remuneration value for completing the distributive on demand administrative task ticket can vary depending on the number of tickets in the queue. If desired, the distributive on demand administrative task ticket can have a relatively high remuneration value at a time of peak workflow.

In some implementations, the means for assigning a remuneration value can include means for receiving at least one bid from a bidder for completing the distributive on demand administrative task ticket, means for analyzing the at least one bid to determine if the at least one bid is equal to or less than a threshold value, and means for awarding the distributive on demand administrative task ticket to the bidder associated with the at least one bid if the bid is equal to or less than the threshold value. The distributive on demand administrative tasking system can further include means for awarding the distributive on demand administrative task ticket to the lowest bidder if the lowest bid is higher than the threshold. Moreover, if desired, the distributive on demand administrative tasking system can further include means for raising the threshold value if no bids are received that are equal to or less than the threshold, means for receiving further bids for completing the distributive on demand administrative task ticket, means for analyzing the further bids to determine if the at least one bid is less than or equal to the threshold value, and means for awarding the distributive on demand administrative task ticket to the bidder that submitted the lowest bid if the lowest bid is less than or equal to the threshold value.

In some implementations, the distributive on demand administrative tasking system can further include means for raising the threshold value and receiving further bids until at least one bid is equal to or less than the threshold value, and means for awarding the distributive on demand administrative task ticket to the bidder that submitted the lowest bid. If desired, the distributive on demand administrative tasking system can further include means for receiving a plurality of bids for completing the distributive on demand administrative task ticket from one or more bidders, means for reviewing the plurality of bids to identify at least one bid is less than or equal to the threshold value, and means for awarding the distributive on demand administrative task ticket to the bidder that submitted the lowest bid.

The disclosure also provides further systems for operating a distributive on demand administrative tasking system. In some embodiments, the systems can include means for receiving a message containing distributive on demand administrative task information via processor, the distributive on demand administrative task information relating to a distributive on demand administrative task to be performed, means for parsing the message and extracting the distributive on demand administrative task information via processor, means for analyzing the distributive on demand administrative task information via processor, means for generating a distributive on demand administrative task ticket containing a plurality of fields of distributive on demand administrative task ticket information, and means for posting the distributive on demand administrative task ticket in a queue in a distributive on demand administrative tasking server.

In accordance with further aspects, the distributive on demand administrative tasking can further include means for storing the distributive on demand administrative task ticket in a distributive on demand administrative task database. The distributive on demand administrative tasking system can further include means for receiving the message containing distributive on demand administrative task information is via facsimile, and further wherein the distributive on demand administrative tasking system includes means for parsing the facsimile message to identify and extract the distributive on demand administrative task information. If desired, the distributive on demand administrative tasking system can further include an email server for receiving the distributive on demand administrative task information as an electronic mail message, and the distributive on demand administrative tasking system can include means for parsing the electronic mail message to identify and extract the distributive on demand administrative task information. In some implementations, the distributive on demand administrative task information relates to an inquiry from an administrative service provider.

In accordance with still further aspects, the distributive on demand administrative tasking system can further include means for searching the distributive on demand administrative task information to identify a key word, means for assigning a priority value to the ticket created using the distributive on demand administrative task information if the key word is present in the distributive on demand administrative task information to create a priority ticket, and means for posting the priority ticket proximate the top of the queue in the distributive on demand administrative tasking server. If desired, the distributive on demand administrative tasking system can further include means for searching the distributive on demand administrative task information to identify a key word, means for assigning a normal value to the ticket created using the distributive on demand administrative task information if the key word is not present in the distributive on demand administrative task information to create a normal ticket, and means for posting the normal ticket to the queue in the distributive on demand administrative tasking server, or storing the distributive on demand administrative task ticket in the distributive on demand administrative task database.

In some embodiments, the distributive on demand administrative tasking system can further include means for generating a first alarm message if the priority ticket is not selected for processing by a service provider within a first predetermined time period, and means for forwarding the first alarm message to a supervisor. The distributive on demand administrative tasking system can further include means for generating a second alarm message if the priority ticket is not selected for processing by a service provider within a second predetermined time period, and means for forwarding the alarm message to a supervisor. The system can be adapted to forward at least one of the first alarm message and second alarm message to the supervisor as a SMS text message. The system can be adapted to forward the first alarm message to the supervisor as an electronic mail message. The distributive on demand administrative tasking system can further include means for forwarding the first alarm message to a plurality of service providers logged into the distributive on demand administrative tasking system. The first predetermined time period can be between about one minute and about ten minutes, between about three minutes and about eight minutes, or about five minutes, among other time increments in increments of one minute, or halves or quarters of a minute.

In some implementations, the priority ticket can relate to at least one of: (i) a credit hold, (ii) a cash advance, (iii) a credit advance, (iii) a fuel advance, (iv) a parts advance, (v) a credit check and (vi) a medical emergency. The priority ticket can be adapted to be selected by an administrative service provider for completion before a normal ticket assigned a normal priority value can be selected for completion.

The disclosure further provides an administrative tasking system that includes means for receiving distributive on demand administrative task information via processor, the distributive on demand administrative task information relating to a distributive on demand administrative task to be performed, means for analyzing the distributive on demand administrative task information via processor, means for creating a distributive on demand administrative task ticket containing a plurality of fields containing distributive on demand administrative task ticket information, means for forwarding the distributive on demand administrative task ticket to an administrative service provider by way of a distributive on demand administrative tasking server, means for receiving completion information from the administrative service provider indicating that the distributive on demand administrative task is complete, and means for initiating payment to the administrative service provider for completing the distributive on demand administrative task. In some embodiments, the amount of payment to the administrative service provider can be dependent upon the degree to which the task was completed.

The disclosure further provides a distributive on demand administrative tasking system including means for receiving payment information via processor from a first party, the payment information relating to a payment to be received by a bank account associated with an administrator of the distributive on demand administrative tasking system from a second party in order to issue payment to a third party, means for receiving funds transfer information relating to the bank account associated with the administrator of the distributive on demand administrative tasking system, means for analyzing the funds transfer information to identify an amount of funds transferred into the bank account associated with the administrator of the distributive on demand administrative tasking system, and means for comparing the funds transfer information to the payment information to determine if the amount of funds transferred into the bank account associated with the administrator of the distributive on demand administrative tasking system is sufficient to permit issuance of payment to the third party.

In some implementations, the distributive on demand administrative tasking system further includes means for generating a distributive on demand administrative task ticket including a request to resolve an insufficiency of funds, and means for posting the distributive on demand administrative task in a queue visible to at least one service provider. The distributive on demand administrative tasking system can further include means for locating a key word that, when located, causes the distributive on demand administrative tasking system to interrogate a bank account server associated with the bank account in order to obtain the funds transfer information. The distributive on demand administrative tasking system can be adapted to interrogate the bank account server periodically until it obtains the funds transfer information.

The disclosure further provides a distributive on demand administrative tasking system that includes means for receiving distributive on demand administrative task payment information via processor from a first party, the distributive on demand administrative task payment information relating to funds to be received by a bank account associated with an administrator of the distributive on demand administrative tasking system from a second party for issuing a payment in a first amount to a third party, means for analyzing the distributive on demand administrative task payment information via processor, means for creating a first distributive on demand administrative task ticket containing a plurality of fields containing distributive on demand administrative task ticket information relating to the payment, means for receiving funds transfer information relating to the account associated with the administrator of the distributive on demand administrative tasking system, means for generating a second distributive on demand administrative task ticket, the second distributive on demand administrative task ticket including a request to determine if the funds transfer information describes a funds transfer that satisfies the payment information, means for forwarding the second distributive on demand administrative task ticket to a service provider for execution, and means for receiving matching information from the service provider, the matching indication indicating whether funds were received from the second party in an amount sufficient to satisfy the payment.

In some embodiments, the matching information may indicate that sufficient funds were received to issue payment to the third party, and the distributive on demand administrative tasking system can further include means for forwarding the payment in the first amount to the third party. The distributive on demand administrative tasking system can further include means for issuing a service payment to the service provider for completing the distributive on demand administrative task. The service payment can be adapted to be a predetermined percentage of the payment to the third party. The matching information may indicate that insufficient funds were received from the second party to issue payment in the first amount to the third party, and the distributive on demand administrative tasking system can further include means for forwarding a payment to the third party in a second amount less than the first amount.

In some implementations, the distributive on demand administrative tasking system can further include means for directing the third party to the service provider to resolve payment issues. If desired, the distributive on demand administrative tasking system can further include means for issuing a service payment to the service provider for completing the distributive on demand administrative task in an amount less than an amount the service provider would have received if the funds received from the second party were sufficient to issue payment in the first amount to the third party. The administrator can be a broker, and the first party can be an agent that arranged a service by the third party for the benefit of the second party.

The disclosure also provides a distributive on demand administrative tasking system that includes means for receiving payment information via processor from a first party, the payment information relating to a payment to be received by a bank account associated with an administrator of the distributive on demand administrative tasking system from a second party in order to issue payment to a third party, means for receiving funds transfer information via processor relating to the bank account associated with the administrator of the distributive on demand administrative tasking system, means for generating a distributive on demand administrative task ticket for comparing the payment information the funds transfer information, means for forwarding the distributive on demand administrative task ticket to an administrative service provider; and means for receiving a verification message via processor from the administrative service provider, the verification message including verification information concerning whether the payment information matches the funds transfer information to permit payment to be issued to the third party. In some embodiments, the verification information may indicate that the payment information matches the funds transfer information, and the distributive on demand administrative tasking system may further include means for issuing payment to the third party. In other embodiments, the verification information may indicate that the payment information does not match the funds transfer information and that the payment information is indicated as being correct, and the distributive on demand administrative tasking system may further include means for issuing a payment to the third party in accordance with the payment information. In still other embodiments, the verification information may indicate that the payment information does not match the funds transfer information and that the funds transfer information is correct and the payment information is incorrect, in which case the distributive on demand administrative tasking system can further include means for issuing a payment to the third party in accordance with the funds transfer information. In still other embodiments, the distributive on demand administrative tasking system can further include means for issuing a commission payment to the administrator when the funds transfer information is received.

The disclosure further provides daily deal systems, such as for managing daily online coupons offered to consumers. Such systems can include means for receiving payment input from a customer via processor to purchase a coupon for the purchase of goods and/or services from a merchant, means for distributing the coupon to the customer for purchasing the goods and/or services from the merchant, means for receiving complaint information via processor from at least one of the merchant and the customer, the complaint information describing a complaint related to the coupon, means for generating a distributive on demand administrative task ticket for resolving the complaint, and means for forwarding the complaint to an administrative service provider to resolve the complaint. If desired, the administrative service provider can be an agent that arranged a contract with the merchant for the coupon.

In further aspects, the disclosure provides transportation booking and/or complaint management systems. Such systems can include means for receiving payment input from a customer via processor to purchase a ticket for travel from a first location to a second location on a carrier (e.g., airline, bus company, rental car company, cruise line, etc.), means for distributing the ticket to the customer for executing the travel, means for receiving complaint information via processor from the customer, the complaint information describing a complaint related to at least one of the ticket and the travel, means for generating a distributive on demand administrative task ticket for resolving the complaint; and means for forwarding the complaint to an administrative service provider to resolve the complaint.

The disclosure provides still further embodiments of distributive on demand administrative tasking systems. Such systems can include, for example, means for receiving invoice information via processor, the invoice information describing a payment required to satisfy the invoice, means for receiving payment information via processor, the payment information describing a payment for satisfying the invoice, means for comparing the invoice information to the payment information to determine if the amount of the payment is sufficient to satisfy the invoice, means for generating a distributive on demand administrative task ticket if the payment is insufficient to satisfy the invoice, and means for posting the distributive on demand administrative task ticket in a queue on a distributive on demand administrative tasking server, the queue and distributive on demand administrative task ticket being adapted to be available for selection by at least one administrative service provider.

In some embodiments, the distributive on demand administrative tasking system can further include means for forwarding the distributive on demand administrative task ticket to the at least one administrative service provider for execution, and means for receiving completion information from the at least one administrative service provider, the completion information indicating that the distributive on demand administrative task is complete. In further embodiments, the distributive on demand administrative tasking system can further include means for receiving further payment information via processor, the further payment information describing the provision of further funds for satisfying the invoice, and means for comparing the invoice information to the payment information and further payment information to determine if sufficient funds have been received to satisfy the invoice. In some instances, the means for comparing can generate a sufficient funds condition indicating that sufficient funds have been received to satisfy the invoice, and the distributive on demand administrative tasking system can further include means for issuing payment for the invoice. In other instances, the means for comparing may generate an insufficient funds condition indicating that insufficient funds have been received to satisfy the invoice, and the distributive on demand administrative tasking system can further include means for generating a second distributive on demand administrative task ticket containing information relating to resolving the insufficient funds condition, and means for posting the second distributive on demand administrative task ticket in the queue on the distributive on demand administrative tasking server, the queue and distributive on demand administrative task ticket being adapted to be available for selection by the at least one service provider. In some implementations, the invoice can relate to at least one of payment for shipment of goods, trade services, legal services, investment services and administrative services.

In further embodiments, the distributive on demand administrative tasking can further include means for logging each instance a distributive on demand administrative task ticket is generated for a first agent responsible for generating invoices or providing payment information. If desired, the distributive on demand administrative tasking system can further include means for preparing and sending an alert to an administrator of the distributive on demand administrative tasking system if the number of tickets attributable to the first agent exceeds a threshold. The threshold can be determined, for example, by a means for comparing the number of tickets attributable to the first agent with an average number of tickets attributable to each of a plurality of agents. In still further embodiments, the distributive on demand administrative tasking system can further include means for generating a graphical representation of the comparison and displaying the comparison to the administrator.

The disclosure further provides distributive on demand service management systems capable of providing automated payment for services. In some embodiments, such systems include means for receiving a message including distributive on demand service completion information from a service provider via processor, the distributive on demand service completion information including (i) an indication that a distributive on demand service has been completed and (ii) the geographic coordinates of the physical origin of the distributive on demand service completion information, means for parsing the distributive on demand service completion information, means for extracting at least a portion of the distributive on demand service completion information from the message, means for retrieving reference distributive on demand service completion data from a distributive on demand service database, the reference distributive on demand service completion data including (i) a description of the distributive on demand service to be completed and (ii) the geographic coordinates of a location where the distributive on demand service is to be completed, and means for comparing the distributive on demand service completion information with the distributive on demand service completion data to determine if the geographic coordinates of the physical origin of the distributive on demand service completion information comport with the geographic coordinates of the location where the distributive on demand service is to be completed.

In some embodiments, the geographic coordinates of the physical origin of the distributive on demand service completion information comport with the geographic coordinates of the location where the distributive on demand service is to be completed; and, the distributive on demand administrative tasking system further includes means for initiating payment to the service provider for completing the distributive on demand service. In further implementations, the geographic coordinates of the physical origin of the distributive on demand service completion information substantially comports with the geographic coordinates of the location where the distributive on demand service is to be completed, and the distributive on demand administrative tasking system can further include means for generating a distributive on demand administrative task ticket to confirm that the distributive on demand service has been completed, and means for posting the distributive on demand administrative task ticket in a queue on a distributive on demand administrative tasking server, the queue and distributive on demand administrative task ticket being available for selection by at least one administrative service provider.

In further embodiments, the distributive on demand service management system capable of providing automated payment for services can further include means for forwarding the distributive on demand administrative task ticket to the at least one administrative service provider for execution, and means for receiving completion information from the at least one administrative service provider, the completion information indicating that the distributive on demand service is complete. If desired, the distributive on demand service management system capable of providing automated payment for services can further include means for initiating payment to the service provider for completing the distributive on demand service. In some implementations, the geographic coordinates of the physical origin of the distributive on demand service completion information may not comport with the geographic coordinates of the location where the distributive on demand service is to be completed, and the distributive on demand administrative tasking system can further include means for generating a distributive on demand administrative task audit ticket to investigate whether the distributive on demand service has been completed, means for posting the distributive on demand administrative task audit ticket in a queue on a distributive on demand administrative tasking server, the queue and distributive on demand administrative task audit ticket being available for selection by at least one administrative service provider. In some embodiments, the distributive on demand service completion information can include a still picture or video of the location where the distributive on demand service is to be completed. In further embodiments, the distributive on demand service can include delivery of a shipment by a delivery service. In accordance with further aspects, the distributive on demand service completion information can includes a picture or video taken proximate the geographic coordinates of the location where the distributive on demand service is to be completed and further wherein the picture evidences that action was taken to complete the distributive on demand service.

In some embodiments, the distributive on demand service can be assigned to the service provider by the service provider selecting a distributive on demand service ticket from a queue in a distributive on demand service database. If desired, the service ticket can be created by the distributive on demand service database in response to receiving a request for a distributive on demand service from a customer.

In further implementations, the distributive on demand service management system capable of providing automated payment for services can further include means for forwarding a critique request to the customer after the distributive on demand service is completed to rate the quality of the services provided by the service provider. In still further implementations, the distributive on demand service management system capable of providing automated payment for services can further include means for forwarding a critique request to the service provider after the distributive on demand service is completed to rate one or more attributes of the customer.

In accordance with some implementations, the distributive on demand service can relate to at least one of: (i) food delivery services, (ii) plumbing services, (iii) mechanic services, (iv) lawn services, (ii) electrician services, (iii) carpentry services (iv) shipping services, (v) administrative services and (vi) aircraft maintenance and repair services. Moreover, the distributive on demand service ticket can include information relating to at least one of: (i) weather conditions at the geographic coordinates of the location where the distributive on demand service is to be completed (ii) an amount of compensation for completing the distributive on demand service, (iii) a description of services to be completed, (iv) a rating of the recipient of the distributive on demand service (v) a reference number for the distributive on demand service ticket and (vi) a time frame within which the distributive on demand service needs to be completed.

In accordance with further implementations, the distributive on demand service management system capable of providing automated payment for services can further include means to permit the service provider to select the distributive on demand service ticket by way of a mobile computing device, such as a tablet or smart phone.

In further implementations, the distributive on demand service completion information can include time spent by the service provider at the geographic coordinates of the physical origin of the distributive on demand service completion information, and the distributive on demand administrative tasking system can further include means for matching the time spent by the service provider with an amount required to be spent by the service provider at the geographic coordinates of the physical origin of the distributive on demand service completion information. If desired, the system can be adapted to issue payment to the service provider upon completing the service in accordance with the time spent by the service provider at the geographic coordinates of the physical origin of the distributive on demand service completion information.

The disclosure further provides system for issuing a legal violation notice. In some implementations, the systems can include means for receiving a message including legal violation information from a first party via processor, the legal violation information including (i) an indication that a legal violation has occurred and (ii) the geographic coordinates of the physical origin of the legal violation information, means for parsing the legal violation information, means for extracting at least a portion of the legal violation information from the message, means for analyzing the extracted legal violation information to identify a second party responsible for the legal violation, and means for issuing a legal violation notice to the second party.

In some embodiments, the legal violation information can include a visual representation of a vehicle parked illegally and image information of identification information of the vehicle, and the system can further include means for analyzing the image to identify the vehicle, and wherein the legal violation is issued by the system to the owner of the vehicle. In some implementations, the geographic coordinates are used to identify the location of the illegally parked vehicle. The visual representation can include at least one of a still photograph and a digital video.

The legal violation information can relate, for example, to a moving traffic violation, and the legal violation information can include a visual representation of a moving vehicle engaged in illegal activity and identification information of the vehicle. In such embodiments, the system can further include means for analyzing the image to identify the vehicle. The legal violation can be issued by the system to the owner of the vehicle, for example, based on records in public institutions such as motor vehicle departments. In further aspects, the legal violation information can relate to at least one of: (i) running a red light (ii) changing lanes without signaling (iii) driving under the influence of alcohol, (iv) driving under the influence of a controlled substance, and (v) speeding. The visual representation can include at least one of (i) a still photograph and (ii) a digital video. In many embodiments, the legal violation information can relate to violation of a law or regulation. The legal violation information can relate, for example, to at least one of: (i) unlawful trespassing, (ii) a violent crime, (iii) violation of a court order, (iv) a public nuisance, (v) property damage, (vi) a zoning violation, (vii) littering, (viii) domestic violence and (ix) abuse of a minor. In some implementations, the message including legal violation information can be generated and sent by way of a smartphone or a tablet.

The disclosure also provides various processor-readable tangible non-transient media storing one or more computer programs for operating a distributive on demand administrative tasking system. In some implementations, the programs can include means for obtaining and/or receiving distributive on demand administrative task information via a processor, the distributive on demand administrative task information relating to a distributive on demand administrative task to be performed, means for analyzing the distributive on demand administrative task information via processor to create a distributive on demand administrative task ticket containing a plurality of fields containing distributive on demand administrative task ticket information, and means for storing the distributive on demand administrative task ticket in a distributive on demand administrative task database.

In some embodiments, the computer program can further include means for receiving and/or processing a distributive on demand administrative task ticket request from an administrative service provider, and/or means for forwarding the distributive on demand administrative task ticket to the administrative service provider by way of a distributive on demand administrative tasking server. The distributive on demand administrative task ticket may or may not be time sensitive. In some embodiments, the computer program can further include means for providing a distributive on demand administrative task ticket queue on the distributive on demand administrative tasking server for posting distributive on demand administrative task tickets, the queue being adapted and configured to permit an administrative service provider to select at least one distributive on demand administrative task ticket for completion.

In other implementations, the computer program can further include means for posting a set of distributive on demand administrative task tickets to the queue on the distributive on demand administrative tasking server during a preselected time period, such as when workflow in the queue is at a relatively low level or seasonally. For example, the time period can be between mid-April and mid October, and the distributive on demand administrative task tickets relate to completion of amended tax returns, or the time period can be in any quarter of the year, and the like.

In further implementations, the computer program can further include means for posting a set of distributive on demand administrative task tickets to a queue in a distributive on demand administrative tasking server at a predetermined time of the day, the queue being adapted and configured to permit an administrative service provider to select at least one distributive on demand administrative task ticket for completion. The predetermined time of the day can be selected to overlap with a critical business flow time period, and a user interface is provided to permit a system administrator to manage the disclosed selective release of task tickets. In some instances, completion of a distributive on demand administrative task ticket within the queue results in the system issuing remuneration to the administrative service provider via the computer program. In some implementations, all or substantially all of the distributive on demand administrative task tickets in the queue can have a remuneration value, wherein completion of each ticket results in the system issuing remuneration to the administrative service provider in an amount equal to the remuneration value via the computer program. The distributive on demand administrative task tickets in the queue can have an average remuneration value, and the set of distributive on demand administrative task tickets can form a subset of distributive on demand administrative task tickets within the queue, wherein the average remuneration value of the distributive on demand administrative tasks in the set of distributive on demand administrative task tickets in the queue is more than the average remuneration value of the distributive on demand administrative task tickets in the queue.

In some implementations of the computer program, the distributive on demand administrative task ticket can relate to a task involving at least one of: (i) a strategic administrative task, (ii) verification of information in company records, (iii) verification that an agreement has been signed with a service provider, (iv) collection of competitive business intelligence, (v) contacting a service provider to establish an automated clearing house ("ACH") funds transfer agreement, (vi) governmental administrative functions, (vii) the sale of goods or services, (viii) vehicular maintenance, (ix) aircraft maintenance, (x) administrative processing of legal rights, (xi) processing of permits, (xii) processing of licenses, (xiii) resolving billing disputes, (xiv) technical support and (xv) online support. Moreover, the distributive on demand administrative task ticket can similarly relate to at least one of: (i) verifying that a contract is in place with a client, (ii) verifying that a contract is in place with a shipper, (iii) verification of address information, (iv) a credit check, (v) a cash advance, (vi) contacting administrative service providers working for a competitor in order to determine if they are interested in exploring career opportunities and (vii) contacting a trucking company to establish an automated clearing house ("ACH") funds transfer agreement.

In some implementations, the computer program can further include means for assigning a distributive on demand administrative task time frame within which the distributive on demand administrative task needs to be performed, and means for populating at least one of the plurality of fields of the distributive on demand administrative task ticket with the distributive on demand administrative task time frame. The computer program can further include means for assigning a distributive on demand administrative task description, and means for populating at least one of the plurality of fields of the distributive on demand administrative task ticket with the distributive on demand administrative task description. The computer program can further include means for assigning a distributive on demand administrative task priority level relating to the urgency of the distributive on demand administrative task, and means for populating at least one of the plurality of fields of the distributive on demand administrative task ticket with the distributive on demand administrative task priority level.

The computer program can further include means for assigning a remuneration value for completing the distributive on demand administrative task ticket, and means for populating at least one of the plurality of fields of the distributive on demand administrative task ticket with the remuneration value for completing the distributive on demand administrative task ticket. The means for assigning a remuneration value can include means for assigning a first remuneration value to a first distributive on demand administrative task ticket, and means for assigning a second remuneration value different than the first remuneration value to a second distributive on demand administrative task ticket. The first distributive on demand administrative task ticket and second distributive on demand administrative task ticket can relate to different types of administrative tasks. In some implementations, the remuneration value for completing the distributive on demand administrative task ticket varies depending on the time of day, or depending on the number of tickets in the queue. In other embodiments, the distributive on demand administrative task ticket can have a relatively high remuneration value at a time of peak workflow.

In further implementations, the means for a assigning remuneration value can include means for receiving and/or processing at least one bid from a bidder for completing the distributive on demand administrative task ticket, means for analyzing the at least one bid to determine if the at least one bid is equal to or less than a threshold value, and means for awarding the distributive on demand administrative task ticket to the bidder associated with the at least one bid if the bid is equal to or less than the threshold value.

In some implementations, the computer program can further include means for awarding the distributive on demand administrative task ticket to the lowest bidder if the lowest bid is higher than the threshold. The computer program can further include means for raising the threshold value if no bids are received that are equal to or less than the threshold, means for receiving and/or processing further bids for completing the distributive on demand administrative task ticket, means for analyzing the further bids to determine if the at least one bid is less than or equal to the threshold value, and means for awarding the distributive on demand administrative task ticket to the bidder that submitted the lowest bid if the lowest bid is less than or equal to the threshold value. By way of further example, the computer program can further include means for raising the threshold value and receiving and/or processing further bids until at least one bid is equal to or less than the threshold value, and means for awarding the distributive on demand administrative task ticket to the bidder that submitted the lowest bid. If desired, the computer program can further include means for receiving and/or processing a plurality of bids for completing the distributive on demand administrative task ticket from one or more bidders, means for reviewing the plurality of bids to identify at least one bid is less than or equal to the threshold value, and means for awarding the distributive on demand administrative task ticket to the bidder that submitted the lowest bid.

The disclosure further provides processor-readable tangible non-transient media containing one or more computer programs stored thereon for operating a distributive on demand administrative tasking system. The computer program can include, for example, means for receiving and/or processing a message containing distributive on demand administrative task information via processor, the distributive on demand administrative task information relating to a distributive on demand administrative task to be performed, means for parsing the message and extracting the distributive on demand administrative task information via processor, means for analyzing the distributive on demand administrative task information via processor, means for generating a distributive on demand administrative task ticket containing a plurality of fields of distributive on demand administrative task ticket information, and means for posting the distributive on demand administrative task ticket in a queue in a distributive on demand administrative tasking server.

The computer program can further include means for storing the distributive on demand administrative task ticket in a distributive on demand administrative task database. Moreover, the computer program can further include means for receiving and/or processing the message containing distributive on demand administrative task information is via facsimile, and the computer program can also include means for parsing the facsimile message to identify and extract the distributive on demand administrative task information. The distributive on demand administrative tasking system includes an email server for receiving and/or processing the distributive on demand administrative task information as an electronic mail message, and further wherein the computer program includes means for parsing the electronic mail message to identify and extract the distributive on demand administrative task information.

In accordance with further aspects, the distributive on demand administrative task information can relate to an inquiry from an administrative service provider. If desired, the computer program can further include means for searching the distributive on demand administrative task information to identify a key word, means for assigning a priority value to the ticket created using the distributive on demand administrative task information if the key word is present in the distributive on demand administrative task information to create a priority ticket, and means for posting the priority ticket proximate the top of the queue in the distributive on demand administrative tasking server.

In accordance with further implementations, the computer program can further include means for searching the distributive on demand administrative task information to identify a key word, means for assigning a normal value to the ticket created using the distributive on demand administrative task information if the key word is not present in the distributive on demand administrative task information to create a normal ticket, and means for posting the normal ticket to the queue in the distributive on demand administrative tasking server, or storing the distributive on demand administrative task ticket in the distributive on demand administrative task database.

In some implementations, the computer program can further include means for generating a first alarm message if the priority ticket is not selected for processing by a service provider within a first predetermined time period, and means for forwarding the first alarm message to a supervisor. The computer program can further include means for generating a second alarm message if the priority ticket is not selected for processing by a service provider within a second predetermined time period, and means for forwarding the alarm message to a supervisor.

In accordance with still further aspects, the computer program can further include means for forwarding at least one of the first alarm message and second alarm message to the supervisor as a SMS text message and/or as an electronic mail message. The computer program can further include means for forwarding the first alarm message to a plurality of service providers logged into the distributive on demand administrative tasking system. The first predetermined time period be between about one minute and about ten minutes, between about three minutes and about eight minutes, such as about five minutes, or any desired increment of one minute, one half of a minute, or one quarter of a minute.

In accordance with some embodiments, the priority ticket can relate to at least one of: (i) a credit hold, (ii) a cash advance, (iii) a credit advance, (iii) a fuel advance, (iv) a parts advance, (v) a credit check and (vi) a medical emergency. In some embodiments, the computer program is adapted to require a priority ticket to be selected by an administrative service provider for completion before a normal ticket assigned a normal priority value can be selected for completion.

The disclosure further provides processor-readable tangible non-transient media storing one or more computer programs for operating a distributive on demand administrative tasking system including means for receiving and/or processing distributive on demand administrative task information via processor, the distributive on demand administrative task information relating to a distributive on demand administrative task to be performed, means for analyzing the distributive on demand administrative task information via processor, means for creating a distributive on demand administrative task ticket containing a plurality of fields containing distributive on demand administrative task ticket information, means for forwarding the distributive on demand administrative task ticket to an administrative service provider by way of a distributive on demand administrative tasking server, means for receiving and/or processing completion information from the administrative service provider indicating that the distributive on demand administrative task is complete, and means for initiating payment to the administrative service provider for completing the distributive on demand administrative task. In some embodiments of the computer program, the amount of payment to the administrative service provider is dependent upon the degree to which the task was completed.

The disclosure provides still further processor-readable tangible non-transient media storing one or more computer programs for operating a distributive on demand administrative tasking system. The computer programs can include, for example, means for receiving and/or processing payment information via processor from a first party, the payment information relating to a payment to be received by a bank account associated with an administrator of the distributive on demand administrative tasking system from a second party in order to issue payment to a third party, means for receiving and/or processing funds transfer information relating to the bank account associated with the administrator of the distributive on demand administrative tasking system, means for analyzing the funds transfer information to identify an amount of funds transferred into the bank account associated with the administrator of the distributive on demand administrative tasking system, and means for comparing the funds transfer information to the payment information to determine if the amount of funds transferred into the bank account associated with the administrator of the distributive on demand administrative tasking system is sufficient to permit issuance of payment to the third party.

In accordance with some implementations, the computer program can further include means for generating a distributive on demand administrative task ticket including a request to resolve an insufficiency of funds, as well as means for posting the distributive on demand administrative task in a queue visible to at least one service provider. The computer program can further include means for locating a key word that, when located, causes the distributive on demand administrative tasking system to interrogate a bank account server associated with the bank account via the computer program in order to obtain the funds transfer information. The distributive on demand administrative tasking system can be adapted via the computer program to interrogate the bank account server periodically until it obtains the funds transfer information.

The disclosure provides further processor-readable tangible non-transient media storing one or more computer programs for operating a distributive on demand administrative tasking system. Such programs can include means for receiving and/or processing distributive on demand administrative task payment information via processor from a first party, the distributive on demand administrative task payment information relating to funds to be received by a bank account associated with an administrator of the distributive on demand administrative tasking system from a second party for issuing a payment in a first amount to a third party, means for analyzing the distributive on demand administrative task payment information via processor, means for creating a first distributive on demand administrative task ticket containing a plurality of fields containing distributive on demand administrative task ticket information relating to the payment, means for receiving and/or processing funds transfer information relating to the account associated with the administrator of the distributive on demand administrative tasking system, means for generating a second distributive on demand administrative task ticket, the second distributive on demand administrative task ticket including a request to determine if the funds transfer information describes a funds transfer that satisfies the payment information, means for forwarding the second distributive on demand administrative task ticket to a service provider for execution, and means for receiving and/or processing matching information from the service provider, the matching indication indicating whether funds were received from the second party in an amount sufficient to satisfy the payment.

In some implementations, the matching information may indicate that sufficient funds were received to issue payment to the third party, and the computer program can further include means for forwarding the payment in the first amount to the third party. The computer program can further include means for issuing a service payment to the service provider for completing the distributive on demand administrative task. The computer program can adapt or adjust the payment to be a predetermined percentage of the payment to the third party. In some implementations, the matching information may indicate that insufficient funds were received from the second party to issue payment in the first amount to the third party, and the computer program can further include means for forwarding a payment to the third party in a second amount less than the first amount. If desired, the computer program can further include means for directing the third party to the service provider to resolve payment issues.

The computer program can further include means for issuing a service payment to the service provider for completing the distributive on demand administrative task in an amount less than an amount the service provider would have received if the funds received from the second party were sufficient to issue payment in the first amount to the third party. The administrator can be a broker, and the first party can be an agent that arranged a service by the third party for the benefit of the second party.

The disclosure provides still further processor-readable tangible non-transient media storing one or more computer programs for operating a distributive on demand administrative tasking system. The programs can include means for obtaining and/or receiving payment information via processor from a first party, the payment information relating to a payment to be received by a bank account associated with an administrator of the distributive on demand administrative tasking system from a second party in order to issue payment to a third party, means for obtaining and/or receiving funds transfer information via processor relating to the bank account associated with the administrator of the distributive on demand administrative tasking system, means for generating a distributive on demand administrative task ticket for comparing the payment information the funds transfer information, means for forwarding the distributive on demand administrative task ticket to an administrative service provider and means for receiving and/or processing a verification message via processor from the administrative service provider, the verification message including verification information concerning whether the payment information matches the funds transfer information to permit payment to be issued to the third party.

In some implementations, the verification information may indicate that the payment information matches the funds transfer information, and the computer program can further include means for issuing payment to the third party (e.g., via financial network, ACH transfer and the like). The verification information can indicate that the payment information does not match the funds transfer information, and that the payment information is indicated as being correct, and the computer program can further include means for issuing a payment to the third party in accordance with the payment information. Alternatively, the verification information may indicate that the payment information does not match the funds transfer information that the funds transfer information is correct and the payment information is incorrect, and the computer program further includes means for issuing a payment to the third party in accordance with the funds transfer information. In some embodiments, the computer program can be adapted to issue a commission payment to the administrator when the funds transfer information is received.

The disclosure further provides processor-readable tangible non-transient media storing one or more computer programs for operating a daily deal system. The programs can include means for receiving and/or processing or processing payment input from a customer via processor to purchase a coupon for the purchase of goods and/or services from a merchant, means for distributing the coupon to the customer for purchasing the goods and/or services from the merchant, means for receiving and/or processing complaint information via processor from at least one of the merchant and the customer, the complaint information describing a complaint related to the coupon, means for generating a distributive on demand administrative task ticket for resolving the complaint, and means for forwarding the complaint to an administrative service provider to resolve the complaint. If desired, the administrative service provider is an agent that arranged a contract with the merchant for the coupon.

The disclosure also provides processor-readable tangible non-transient media storing one or more computer programs for operating a transportation booking management system. Such programs can include means for receiving and/or processing payment input from a customer via processor to purchase a ticket for travel from a first location to a second location on a carrier, means for distributing the ticket to the customer for executing the travel, means for receiving and/or processing complaint information via processor from the customer, the complaint information describing a complaint related to at least one of (i) the ticket and (ii) the travel, means for generating a distributive on demand administrative task ticket for resolving the complaint, and means for forwarding the complaint to an administrative service provider to resolve the complaint.

The disclosure also provides processor-readable tangible non-transient media storing one or more computer programs for operating a distributive on demand administrative tasking system. The programs can include, for example means for obtaining and/or receiving and/or receiving invoice information via processor, the invoice information describing a payment required to satisfy the invoice, means for obtaining and/or receiving and/or receiving payment information via processor, the payment information describing a payment for satisfying the invoice, means for comparing the invoice information to the payment information to determine if the amount of the payment is sufficient to satisfy the invoice, means for generating a distributive on demand administrative task ticket if the payment is insufficient to satisfy the invoice, and means for posting the distributive on demand administrative task ticket in a queue on a distributive on demand administrative tasking server, the queue and distributive on demand administrative task ticket being adapted via the computer program to be available for selection by at least one administrative service provider.

In some implementations, the computer program can include means for forwarding the distributive on demand administrative task ticket to the at least one administrative service provider for execution, and means for receiving and/or processing completion information from the at least one administrative service provider, the completion information indicating that the distributive on demand administrative task is complete. The computer program can additionally or alternatively include means for receiving and/or processing further payment information via processor, the further payment information describing the provision of further funds for satisfying the invoice, as well as means for comparing the invoice information to the payment information and further payment information to determine if sufficient funds have been received to satisfy the invoice. The means for comparing may generate a sufficient funds condition indicating that sufficient funds have been received to satisfy the invoice; and the computer program may further include means for issuing payment for the invoice. In other aspects, the means for comparing can generate an insufficient funds condition indicating that insufficient funds have been received to satisfy the invoice, and the computer program can further include means for generating a second distributive on demand administrative task ticket containing information relating to resolving the insufficient funds condition, and means for posting the second distributive on demand administrative task ticket in the queue on the distributive on demand administrative tasking server, the queue and distributive on demand administrative task ticket being adapted to be available for selection by the at least one service provider. The invoice can relate, for example, to at least one of: (i) payment for shipment of goods, (ii) trade services (iii) legal services, (iv) investment services and (v) administrative services.

In some implementations, the computer program can include means for logging each instance a distributive on demand administrative task ticket is generated for a first agent responsible for generating invoices or providing payment information. If desired, the computer can further include means for preparing and sending an alert to an administrator of the distributive on demand administrative tasking system if the number of tickets attributable to the first agent exceeds a threshold. The threshold can be determined by a means for comparing the number of tickets attributable to the first agent with an average number of tickets attributable to each of a plurality of agents. If desired, the computer program can include means for generating a graphical representation of the comparison and displaying the comparison to the administrator in a graphical user interface.

The disclosure further provides processor-readable non-transient media storing one or more computer programs for operating a distributive on demand service management system capable of providing automated payment for services. The programs can include means for receiving and/or processing a message including distributive on demand service completion information from a service provider via processor, the distributive on demand service completion information including (i) an indication that a distributive on demand service has been completed and (ii) the geographic coordinates of the physical origin of the distributive on demand service completion information, means for parsing the distributive on demand service completion information, means for extracting at least a portion of the distributive on demand service completion information from the message, means for retrieving reference distributive on demand service completion data from a distributive on demand service database, the reference distributive on demand service completion data including (i) a description of the distributive on demand service to be completed and (ii) the geographic coordinates of a location where the distributive on demand service is to be completed, and means for comparing the distributive on demand service completion information with the distributive on demand service completion data to determine if the geographic coordinates of the physical origin of the distributive on demand service completion information comport with the geographic coordinates of the location where the distributive on demand service is to be completed.

In some implementations, the geographic coordinates of the physical origin of the distributive on demand service completion information may comport with the geographic coordinates of the location where the distributive on demand service is to be completed, and the computer program may further include means for initiating payment to the service provider for completing the distributive on demand service. In other instances, the geographic coordinates of the physical origin of the distributive on demand service completion information may substantially comport with the geographic coordinates of the location where the distributive on demand service is to be completed, and the computer program can further include means for generating a distributive on demand administrative task ticket to confirm that the distributive on demand service has been completed, and means for posting the distributive on demand administrative task ticket in a queue on a distributive on demand administrative tasking server, the queue and distributive on demand administrative task ticket being available for selection by at least one administrative service provider. In some implementations, the computer program can include means for forwarding the distributive on demand administrative task ticket to the at least one administrative service provider for execution, and means for receiving and/or processing completion information from the at least one administrative service provider, the completion information indicating that the distributive on demand service is complete.

In some implementations, the computer program can further include means for initiating payment to the service provider for completing the distributive on demand service. In some embodiments, the geographic coordinates of the physical origin of the distributive on demand service completion information do not comport with the geographic coordinates of the location where the distributive on demand service is to be completed, the computer program may further include means for generating a distributive on demand administrative task audit ticket to investigate whether the distributive on demand service has been completed, and means for posting the distributive on demand administrative task audit ticket in a queue on a distributive on demand administrative tasking server, the queue and distributive on demand administrative task audit ticket being available for selection by at least one administrative service provider.

In some implementations, the distributive on demand service completion information can include a picture of the location where the distributive on demand service is to be completed. The distributive on demand service can include delivery of a shipment by a delivery service. In other implementations, the distributive on demand service completion information can include a picture taken proximate the geographic coordinates of the location where the distributive on demand service is to be completed and further wherein the picture evidences that action was taken to complete the distributive on demand service, such as a picture evidencing that a task was completed. The distributive on demand service can be assigned to the service provider by the service provider selecting a distributive on demand service ticket from a queue in a distributive on demand service database. The distributive on demand service ticket can be created by the distributive on demand service database in response to receiving and/or processing a request for a distributive on demand service from a customer.

In some implementations, the computer program can further include means for forwarding a critique request to the customer after the distributive on demand service is completed to rate the quality of the services provided by the service provider. If desired, the computer program can include means for forwarding a critique request to the service provider after the distributive on demand service is completed to rate one or more attributes of the customer. The distributive on demand service can relate to, for example, (i) food delivery services, (ii) plumbing services, (iii) mechanic services, (iv) lawn services, (ii) electrician services, (iii) carpentry services (iv) shipping services, (v) administrative services and/or (vi) aircraft maintenance and repair services. The distributive on demand service ticket can include information relating to, for example, (i) weather conditions at the geographic coordinates of the location where the distributive on demand service is to be completed (ii) an amount of compensation for completing the distributive on demand service, (iii) a description of services to be completed, (iv) a rating of the recipient of the distributive on demand service (v) a reference number for the distributive on demand service ticket and (vi) a time frame within which the distributive on demand service needs to be completed. The computer program can include means to permit the service provider to select the distributive on demand service ticket by way of a mobile computing device, such as a tablet or smart phone.

In some implementations, the distributive on demand service completion information can include, for example, time spent by the service provider at the geographic coordinates of the physical origin of the distributive on demand service completion information, and the computer program can further include means for matching the time spent by the service provider with an amount required to be spent by the service provider at the geographic coordinates of the physical origin of the distributive on demand service completion information. The computer program can be adapted to issue payment to the service provider upon completing the service in accordance with the time spent by the service provider at the geographic coordinates of the physical origin of the distributive on demand service completion information.

The disclosure also provides processor-readable tangible non-transient media storing one or more computer programs for operating a system for issuing a legal violation notice. Such programs can include, for example, means for receiving and/or processing a message including legal violation information from a first party via processor, the legal violation information including (i) an indication that a legal violation has occurred and (ii) the geographic coordinates of the physical origin of the legal violation information, means for parsing the legal violation information, means for extracting at least a portion of the legal violation information from the message, means for analyzing the extracted legal violation information to identify a second party responsible for the legal violation, and means for issuing a legal violation notice to the second party.

In some implementations of the computer programs, the legal violation information can includes a visual representation of a vehicle parked illegally and image information of identification information of the vehicle, and the computer program can further include means for analyzing the image to identify the vehicle, wherein the legal violation is issued by the system to the owner of the vehicle. The geographic coordinates can be used to identify the location of the illegally parked vehicle. The visual representation can include a still photograph and/or a digital video, among other things. The legal violation information can relate, for example, to a moving traffic violation, and wherein the legal violation information can include a visual representation of a moving vehicle engaged in illegal activity and identification information of the vehicle. The computer program can further include means for analyzing the image to identify the vehicle (e.g., means for interpreting and/or recognizing a license plate and the like), and wherein the legal violation is issued by the system to the owner of the vehicle. In some implementations, the legal violation information can relate to at least one of: (i) running a red light (ii) changing lanes without signaling (iii) driving under the influence of alcohol, (iv) driving under the influence of a controlled substance, and (v) speeding. The visual representation can include at least one of (i) a still photograph and (ii) a digital video.

In many implementations of the computer program, the legal violation information can relates to violation of a law or regulation, such as (i) unlawful trespassing, (ii) a violent crime, (iii) violation of a court order, (iv) a public nuisance, (v) property damage, (vi) a zoning violation, (vii) littering, (viii) domestic violence and (ix) abuse of a minor. The message including legal violation information can be generated on and sent by way of a smartphone or a tablet.

The disclosure similarly provides a processor-readable tangible non-transient media storing one or more computer programs for operating a mobile computing device in association with a distributive on demand service management system capable of providing automated payment for services. The programs can include means for generating a message including distributive on demand service completion information from a service provider via processor, the distributive on demand service completion information including (i) an indication that a distributive on demand service has been completed and (ii) the geographic coordinates of the physical origin of the distributive on demand service completion information, and means for forwarding the message to a distributive on demand service server for initiating payment for the on demand service. The disclosure also provides mobile devices (e.g., smart phones, tablets) operating using and embodying such software.

In some implementations, the computer program can further include means for obtaining and/or receiving a distributive on demand administrative task ticket, the ticket describing the on demand service, and means for forwarding completion information to the distributive on demand service server, the completion information indicating that the distributive on demand service is complete. The distributive on demand service completion information can include a picture of the location where the distributive on demand service is to be completed. The distributive on demand service can include delivery of a shipment by a delivery service. The distributive on demand service completion information can include a picture taken proximate the geographic coordinates of the location where the distributive on demand service is to be completed, and the picture can evidence that action was taken to complete the distributive on demand service. The computer program can be adapted to permit the distributive on demand service ticket to be obtained via the computer program operating on the mobile device by the service provider by selecting a distributive on demand service ticket from a queue in a distributive on demand service database. In some implementations, the computer program can further include means for obtaining and/or receiving a critique request after the distributive on demand service is completed to rate one or more attributes of a customer. The distributive on demand service can relate to one or more of (i) food delivery services, (ii) plumbing services, (iii) mechanic services, (iv) lawn services, (ii) electrician services, (iii) carpentry services (iv) shipping services, (v) administrative services and (vi) aircraft maintenance and repair services. The distributive on demand service ticket can include information relating to one or more of (i) weather conditions at the geographic coordinates of the location where the distributive on demand service is to be completed (ii) an amount of compensation for completing the distributive on demand service, (iii) a description of services to be completed, (iv) a rating of the recipient of the distributive on demand service (v) a reference number for the distributive on demand service ticket and (vi) a time frame within which the distributive on demand service needs to be completed. The mobile computing device can include, for example, a tablet or a smart phone. The distributive on demand service completion information can include time spent by the service provider at the geographic coordinates of the physical origin of the distributive on demand service completion information. The disclosure also provides mobile devices (e.g., smart phones, tablets) operating using and embodying such software.

The disclosure further provides processor-readable tangible non-transient media storing one or more computer programs for operating a mobile computing device in association with a system for issuing a legal violation notice. Such programs can includes, for example, means for generating a message including legal violation information from a user of the mobile device via a processor, the legal violation information including (i) an indication that a legal violation has occurred and (ii) the geographic coordinates of the physical origin of the legal violation information, and means for forwarding the message to a legal violation notice server for processing.

In some implementations, the legal violation information can include a visual representation of a vehicle parked illegally and image information of identification information of the vehicle, and wherein the computer program further includes means for analyzing the image to provide identification information of the vehicle. The visual representation can include, for example, at least one of (i) a still photograph and (ii) a digital video. The legal violation information can relate to a moving traffic violation, and the legal violation information can include a visual representation of a moving vehicle engaged in illegal activity and identification information of the vehicle.

The computer program can further include means for analyzing the image to identify the vehicle. If desired, the systems, methods, computer programs and mobile devices set forth herein relating to reporting violations can further include issuing compensation to the first party for reporting the violation. Such compensation can be sent to a bank account or the like of the first party. The amount of such compensation may be fixed or variable, and may depend, for example, on the time of day, or the staffing level of enforcement officers. For example, in the instance of permitting the first party to report a parking violation, the time of day associated with shift change for parking officers may coincide with a time period of an increased compensation for reporting a violation, since the decrease of officer personnel associated with shift change may make it difficult to issue violations. Also, in some implementations, it is possible for the information sent in by the first party to be verified prior to issuing compensation.

In further implementations, the legal violation information can relates to, for example, one or more of (i) running a red light (ii) changing lanes without signaling (iii) driving under the influence of alcohol, (iv) driving under the influence of a controlled substance, and (v) speeding. The visual representation can include at least one of (i) a still photograph and (ii) a digital video. The legal violation information generally can relate to violation of a law or regulation. If desired, the program can further include means to obtain legal information to permit a user to confirm that a violation has occurred. The legal violation information can relate to at least one of: (i) unlawful trespassing, (ii) a violent crime, (iii) violation of a court order, (iv) a public nuisance, (v) property damage, (vi) a zoning violation, (vii) littering, (viii) domestic violence and (ix) abuse of a minor. The disclosure also provides mobile devices (e.g., smart phones, tablets) operating using and embodying such software.

The accompanying drawings, which are incorporated in and constitute part of this specification, are included to illustrate and provide a further understanding of the methods and systems of the disclosure. Together with the description, the drawings serve to explain the principles of the disclosed embodiments.

BRIEF DESCRIPTION OF THE DRAWINGS

The accompanying drawings illustrate various non-limiting, example, innovative aspects in accordance with the present descriptions:

FIG. 1a shows a schematic block diagram illustrating aspects of system functionality in some of the DISTRIBUTIVE ON-DEMAND ADMINISTRATIVE TASKING APPARATUSES, METHODS AND SYSTEMS (hereinafter "DODAT™ embodiments" or, interchangeably, "DODAT™");

FIG. 2 shows a data flow diagram illustrating an application stack for some of the DODAT™ embodiments;

Figure 1B:
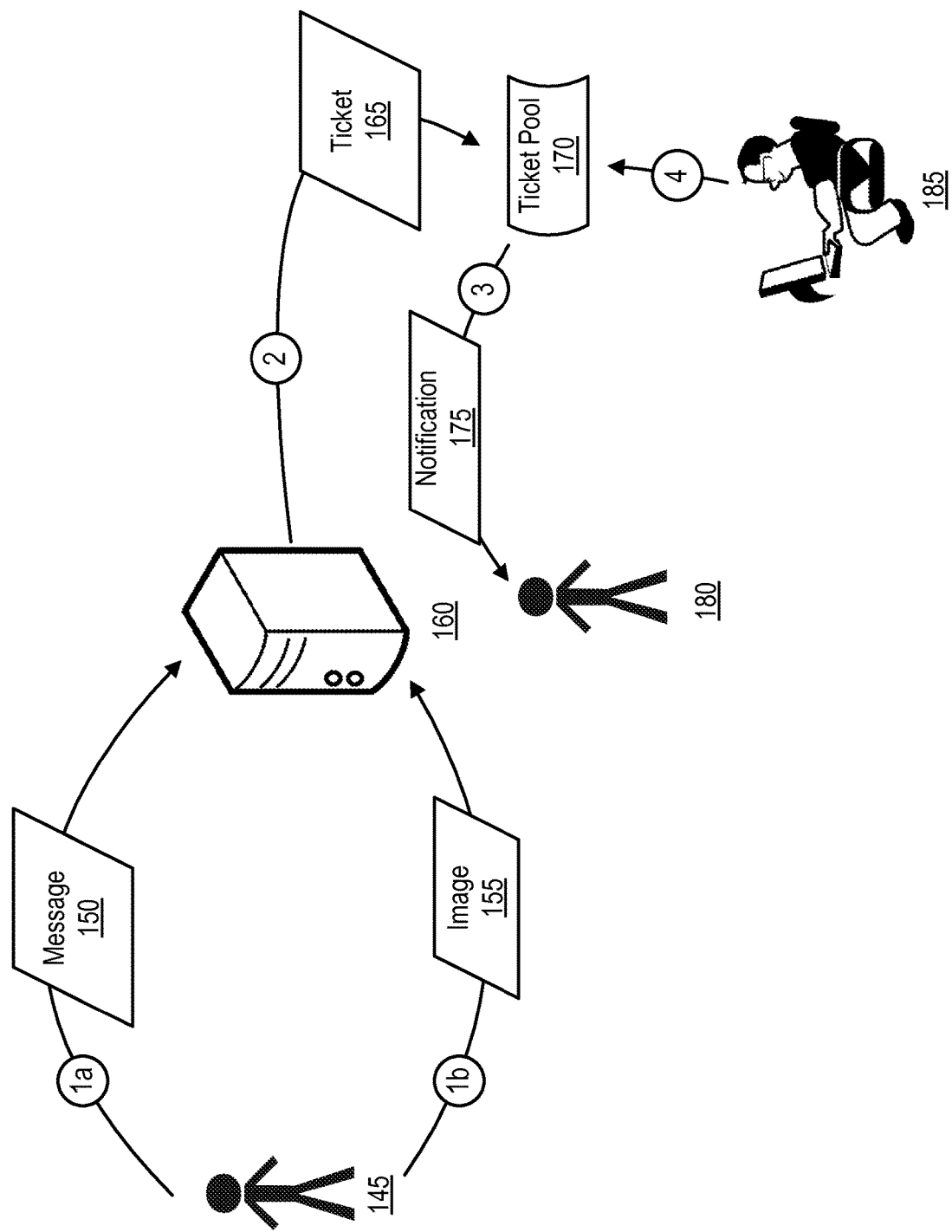
FIG. 1b shows a schematic block diagram illustrating aspects of system use and interactions in some of the DODAT™ embodiments.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

This disclosure describes apparatuses, methods, systems and machine readable computer programs for distributive on demand task systems for a variety of tasks. It is contemplated that some aspects of the methods systems and programs can be performed from a mobile computing device (e.g., smart phone or tablet, etc.).

It will be further appreciated that, while this detailed description section particularly illustrates some aspects of the disclosed systems, the illustrated principles in the figures and related text, etc. relate and enable all disclosed embodiments throughout this disclosure.

It is to be understood that, depending on the particular needs and/or characteristics of a DODAT™ supervisor, employee, ticket, delivery, data transmission and/or network framework and/or the like, various of the DODAT™ embodiments may be implemented that enable a great deal of flexibility and customization. The instant disclosure discusses embodiments and/or applications of the DODAT™ embodiments directed to facilitating the process of delegating and monitoring work tasks via the use of online tickets; however, it is to be understood that the apparatuses, methods and systems discussed herein may be readily adapted and/or reconfigured for a wide variety of other applications and/or implementations as set forth throughout this disclosure. Furthermore, aspects of the DODAT™ embodiments may be configured to generate, administer and/or manage a wide variety of forms of user data, geolocation data, image data, ticket-processing tools, and/or the like beyond specific embodiments and/or implementations described herein. It is to be understood that the DODAT™ embodiments may be further adapted to other implementations and/or interview and/or input-analyzing applications, and are not specifically limited to administrative tasks, but encompass any suitable tasks that may be implemented as disclosed herein.

FIG. 1a shows a schematic block diagram illustrating aspects of system functionality in some of the DODAT™ embodiments. In one embodiment, an employee 105 may want a streamlined method of obtaining work to complete 110. A supervisor 115 may want a streamlined method of delegating work to the employee, while keeping track of tasks that have been designated as high-priority, tasks that need to be verified, and/or the like 120. Truckers or other delivery personnel 125 may want streamlined method of obtaining quick payment for deliveries they perform 130. The DODAT embodiments 135 allow the supervisor to create tickets in order to streamline the work process, allows employees to choose and complete tickets, and allows delivery personnel to initiate payment immediately after delivery by allowing them to provide proof of delivery immediately after the delivery has been performed.

FIG. 1b shows a schematic block diagram illustrating aspects of system use and interactions in some of the DODAT™ embodiments. Supervisors 145 may create a ticket 165 by submitting the ticket body in a message 150 tracked by a server 160, or by submitting an image 155. In some implementations, the message may be an email, instant message, SMS message, and/or the like. In some implementations, the image may be in .jpg, .bmp, gif, .png, .tiff, and/or a like format, and may contain EXIF and/or like data that may include geographic data, the date and time the image was taken, the device used to create the image, and/or like data. The server may generate the ticket using information from the message or image, and may then add it to a ticket pool 170. In some implementations, the ticket pool may contain all tickets that have not been closed yet. In some implementations, the ticket pool may only contain high-priority tickets, until all the high-priority tickets have been completed. An employee 185 may access the ticket pool and choose a ticket to work on. When the ticket is chosen, it may be put in the employee's queue. The employee may close out the ticket when it has been completed. In some implementations, if the ticket has either been unselected for a specified amount of time, or it has been chosen by an employee but has not been acted upon for a specified amount of time, a notification 175 may be sent to a supervisor 180 responsible for monitoring the progress for the ticket. In some implementations, if a ticket remains idle in an employee's queue, it may be returned to the ticket pool.

FIG. 2 shows a data flow diagram illustrating an application stack for some of the DODAT™ embodiments. In some implementations, the DODAT embodiments may provide an API interface 220 with which other systems can connect with in order to facilitate the ticket submission process 205, the ticket selection process 210, and the ticket completion process 215. When utilizing exemplary interfaces provided by the DODAT embodiments, the systems may access the Administrative Tasking Application Stack 225, which may provide a plurality of components that may include a ticket creation component 230, ticket pool retrieval component 235, ticket update component 240, ticket closing and payment component 245, ticket pool maintenance component 250, and a notification component 255.

Figure 3:
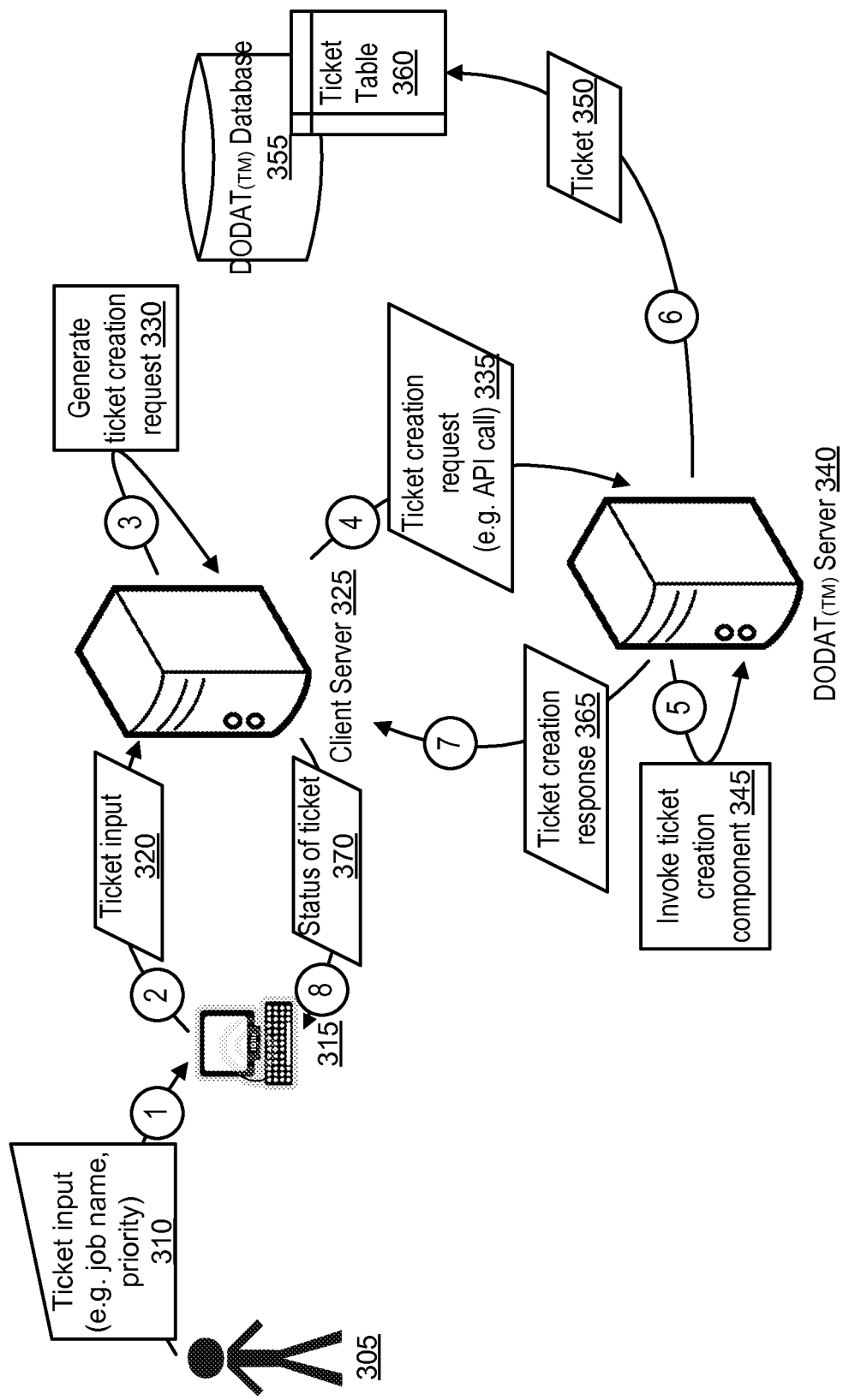
FIG. 3 shows a data flow diagram illustrating creating a ticket in some of the DODAT™ embodiments.

FIG. 3 shows a data flow diagram illustrating creating a ticket in some of the DODAT™ embodiments. In some implementations, a supervisor or other administrative personnel 305 may provide ticket input for a new ticket 310 via an electronic device 315. In other implementations, the ticket input may also be provided by delivery personnel who have completed a delivery and are submitting proof of delivery. In some implementations, the electronic device may be a personal computer, a mobile phone (e.g., Apple iPhone, Samsung Galaxy, Blackberry, Motorola Droid, and/or the like), a tablet (e.g., Apple iPad, Samsung Galaxy Tablet, HP Touchpad, Amazon Kindle Fire, and/or the like), and/or a like device. In some implementations, the ticket input may contain information such as the name of the job or task that the ticket represents, the priority of the ticket, a due date for the ticket (if applicable), a description of the task, the companies and/or customers associated with the ticket, the amount of money the ticket is worth, any supervisors that should monitor the status of the ticket, and/or like information. In some implementations, the ticket input may be provided by server 325 rather than a supervisor (e.g., as a result of a ticket maintenance check; see FIG. 7 for further information).

The administrative personnel may be able to specify the amount the ticket is worth based on the task; in some implementations, the system may parse the ticket for keywords, and may attempt to determine a price to assign to the ticket based on previous tickets that contained the same keywords. In some implementations, personnel may be able to edit the value specified for the ticket (e.g., administrative personnel may be able to edit the ticket value when it is clear that the ticket value specified is not high enough to entice employees to watch the ticket pool, or when the ticket has been left unclaimed for too long, and/or the like).

In some implementations, the ticket input may be passed in a message 320 to the server. In some implementations, the message may be a HTTP(S) POST message that resembles the example below:

```
POST /ticketcreationrequest.php HTTP/1.1
Host: www.DODATproccess.com
Content-Type: Application/XML
Content-Length: 788
<?XML version = "1.0" encoding = "UTF-8"?>
<ticketCreation_request>
    <timestamp>2012-01-06 12:30:00</timestamp>
    <ticket_params>
        <ticket_name>Return Call From Example Company</ticket_name>
        <ticket_desc>John Smith from Example Company left a message regarding a recent delivery. The call should be returned as soon as possible. Phone number (555) 555-5555.</ticket_desc>
        <ticket_priority>1</ticket_priority>
        <ticket_due>2012-01-06 18:30:00</ticket_due>
        <ticket_customer>John Smith, Example Company</ticket_customer>
        <ticket_value>2</ticket_value>
        <ticket_supervisors>Jane Doe</ticket_supervisors>
    </ticket_params>
</ticketCreation_request>
```

The server may generate a ticket creation request 330, which may include the ticket input, as well as a HTML request to a DODAT server 340 which may maintain the DODAT™ embodiment components. This request 335 may be sent in the form of a HTTP(S) POST message to the DODAT™ server, which may use it to invoke the ticket creation component 345. Using the ticket creation component, the DODAT™ embodiments may create a ticket 350 using the information in the ticket input. In some implementations, the ticket may also contain information such as the time the ticket was created, a ticket ID, the ID of the ticket creator, and/or the like. In some implementations, the ticket may also be associated with a secure key that prevents unauthorized personnel from viewing the ticket. The ticket may then be stored as a data structure in a ticket table 360 within the DODAT™ database 355. In some implementations, if the ticket is submitted from delivery personnel, the DODAT™ embodiments may immediately specify the ticket as being completed (thereby initiating payment; see at least FIG. 6c), and/or may issue a request to check the details of the ticket (see at least FIG. 7).

Figure 4A:
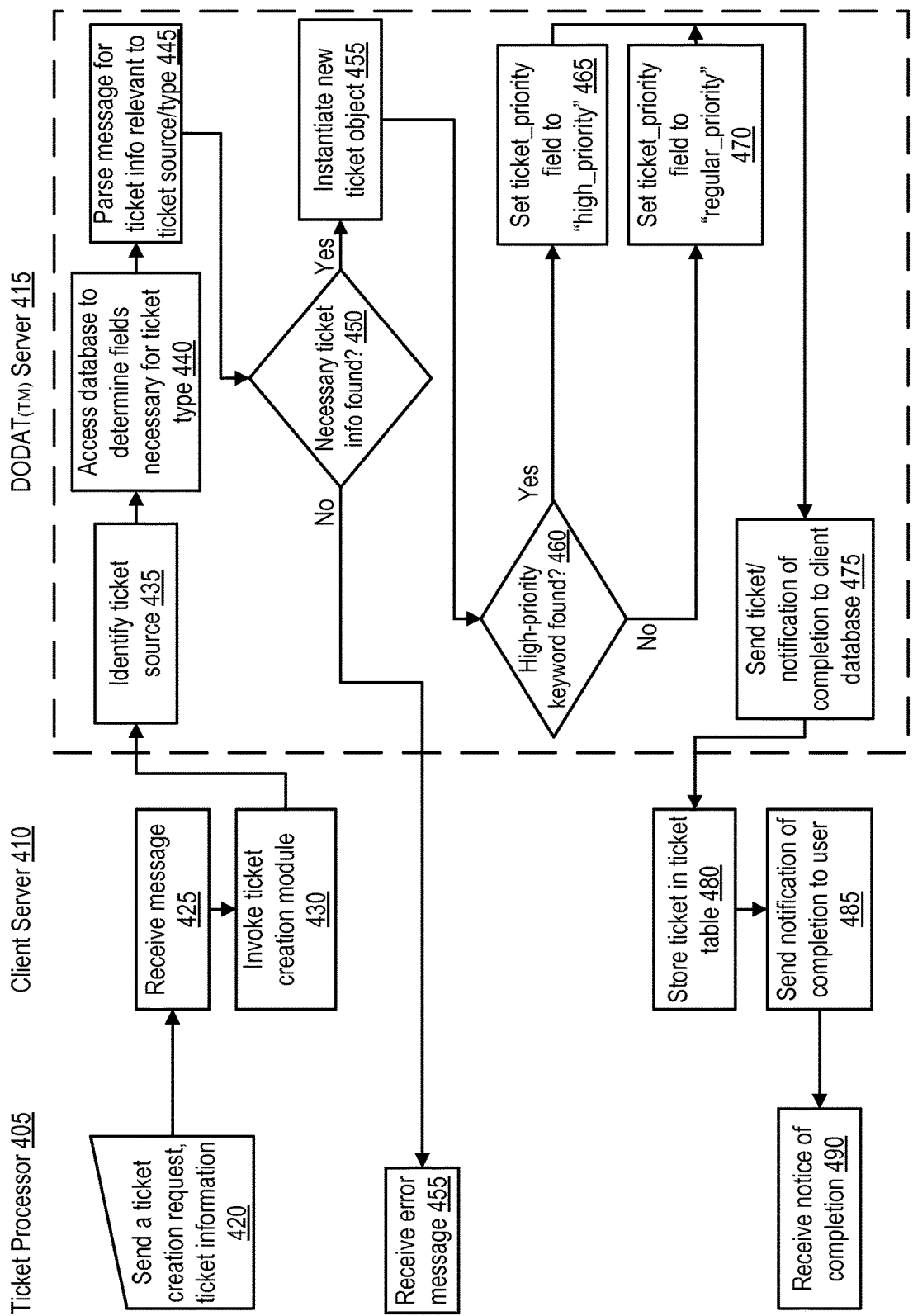
FIG. 4a-b shows logic flow diagrams illustrating creating a ticket in some of the DODAT™ embodiments.

FIG. 4a shows a logic flow diagram illustrating creating a ticket in some of the DODAT™ embodiments. In some implementations, the ticket processor (e.g., the supervisor or administrator creating the ticket and/or a like person) 405 sends a ticket creation request which includes ticket information necessary for the creation of the ticket (e.g., the ticket name, description, and/or the like) 420. The server 410 may receive this information and invoke the ticket creation module 430 within the DODAT™ server 415. The module may identify the ticket source 435 (e.g., whether the ticket comes from a supervisor, or has been created due to a completed delivery, and/or the like). Based on what the ticket source is, the DODAT™ server may access the DODAT™ database in order to determine the fields necessary to complete the appropriate ticket for the task (e.g., determine whether a due date is required based on the source of the ticket, and/or the like). The DODAT™ embodiments may parse the ticket input received 445 in order to make sure the proper information has been provided 450. For example, if the ticket has come from a delivery personnel's mobile device, the DODAT™ embodiments may determine whether an image is included in the message, and whether the image contains EXIF data. If not, the DODAT™ embodiments may send an error message to the ticket processor indicating that the ticket input did not contain required information 445.

If all the necessary information has been found in the ticket input, the DODAT™ embodiments may instantiate a new ticket object 455 using the information in the ticket input. The DODAT™ embodiments may then parse the ticket input for a high-priority keyword 460. In some implementations, the keyword may be "high-priority," "priority," "urgent," and/or a like term. If such a term is found, the ticket is set to have a high priority 465; if the term is not found, then the ticket is specified as a regular priority ticket 470. In some implementations, high-priority tickets may be available to employees before all other ticket types, and employees may not be able to complete regular priority tickets until all high-priority tickets have been taken and/or completed, in order to ensure the more important tasks are completed. The DODAT™ server may then send the ticket object and a notification of completion to the client server 475. In some implementations, the ticket may be stored in a ticket table of a database in the server 480. The notification may then be forwarded to the ticket processor 485, who may receive the notification that the ticket creation process has been completed 490.

Figure 4B:
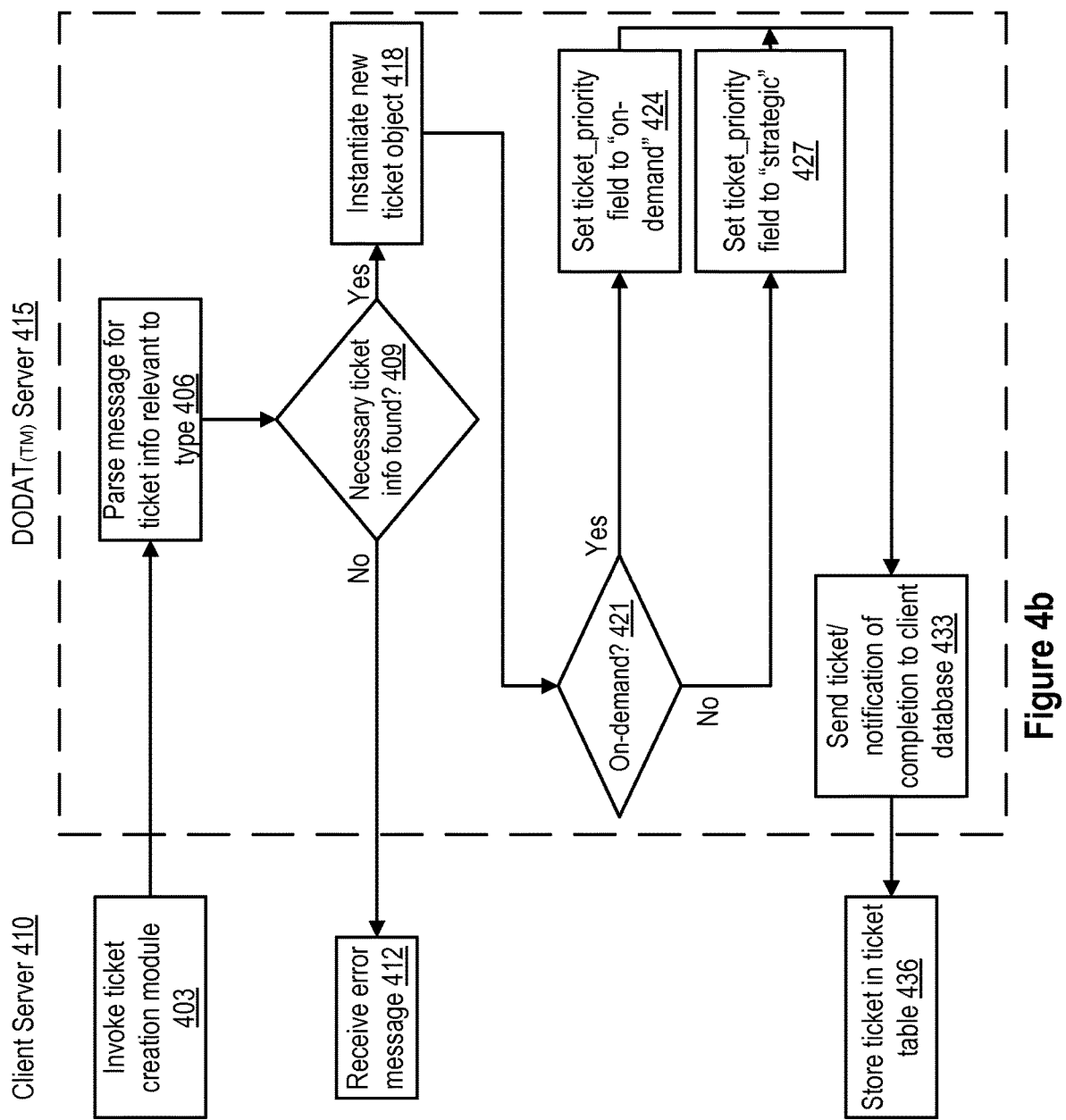

FIG. 4b shows a logic flow diagram illustrating creating a ticket in further DODAT™ embodiments. In some implementations, the client server 410 will create tickets to add to the queue. These tickets may be in response to maintenance checks, could be tickets that the server is scheduled to make in intervals (e.g., for the purpose of status-checking orders, performing reviews of other employees, and/or the like). The client server may invoke the ticket creation module 403, which may involve sending a message to the DODAT™ server 415, indicating that a ticket should be made, and indicating the numerous pieces of information necessary to create the ticket (e.g., the ticket name, ticket date, ticket value, ticket description, and/or the like). In some implementations, a supervisor or administrative personnel may specify how much certain tickets created by the client server should be worth; in other implementations, the server may choose a value for the ticket, based on parameters specified by the administrative personnel (e.g., the maximum and minimum value for such tickets, the average value of accepted tickets, and/or like information).

The DODAT™ server may receive the message and parse it to find information necessary to create the ticket 406. If the DODAT™ server cannot find all of the necessary information 409, it may send an error message back to the client server 412, which may indicate the information that was missing. If the DODAT™ server is able to find the relevant information, then the server may instantiate a new ticket object 418 using the information found in the message. In some implementations, the message may also specify a priority for the ticket: if there is a keyword in the message to specify the ticket as being on-demand 421, then the server will automatically set the priority of the ticket to "on-demand" 424. If a keyword is not found, then the ticket may be set to "strategic" priority 427.

In some implementations, on-demand and strategic-priority tickets may only be available for employees to claim when there are not enough high or regular-priority tickets in the ticket pool; in other implementations, on-demand and strategic-priority tickets may only be added to the pool at certain times of the day, at specified intervals over an entire day, and/or the like. In some implementations, on-demand tickets may include tickets related to maintenance checks and/or any work that should be completed but is not time-sensitive. In some implementations, strategic tickets may include status check tickets, and/or any work that is not important to complete and does not have a deadline. In some implementations, the number of strategic tickets released to the queue may be limited to an amount specified by an administrator. In some implementations, the on-demand and strategic-priority tickets may be released in this manner for the purpose to keeping employees occupied during busy times of the day, while making sure the ticket pool is not over-crowded with tickets during less busy work times. The release schedule may also prevent employees from only visiting the ticket pool at certain times of day, as the release schedule may be changed to suit work demand on a day-by-day basis.

In some implementations, after the priority of the ticket has been established, the ticket, and a notification of completion, may be sent to the client database 433.

Figure 5A:
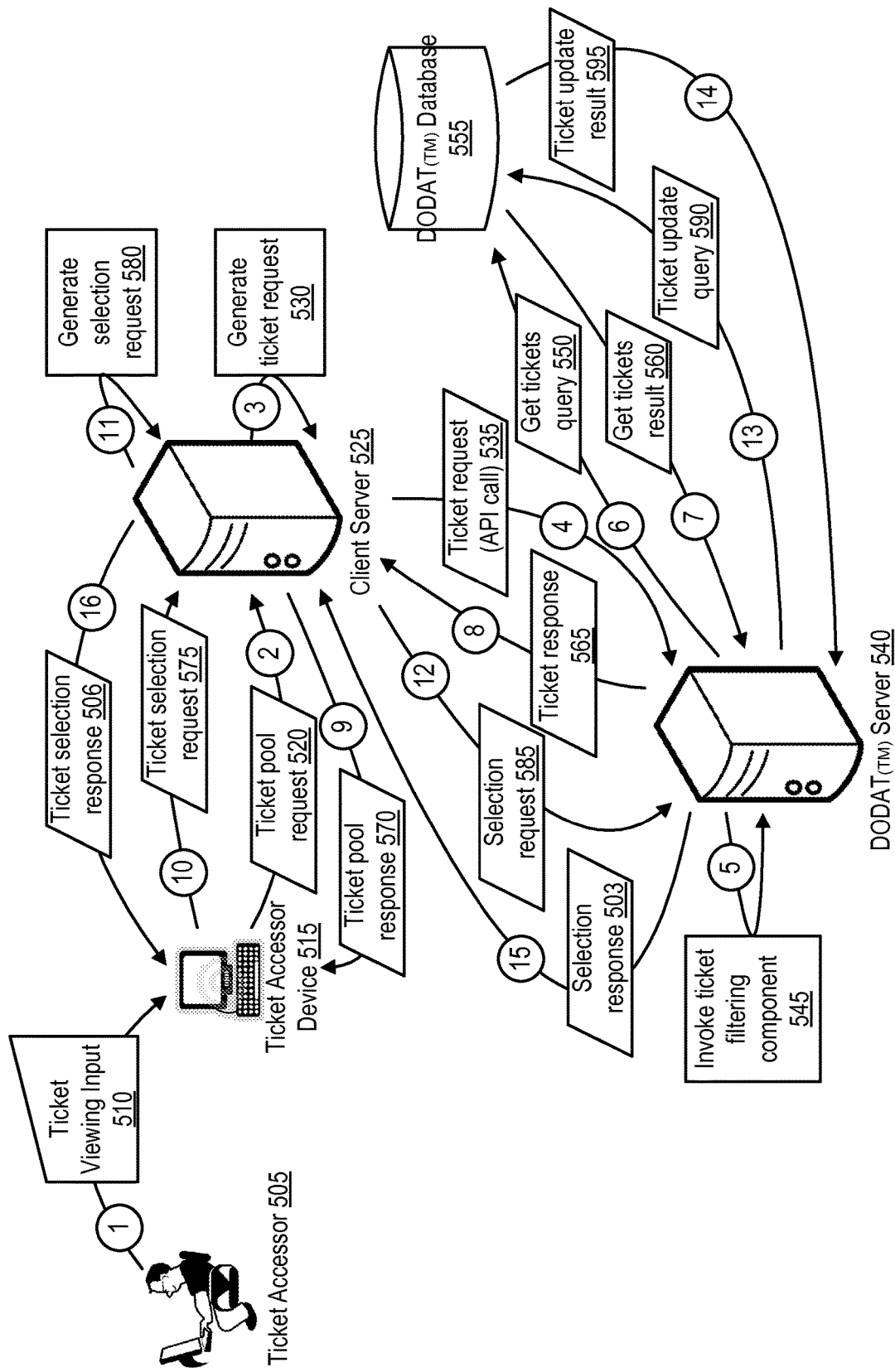
FIG. 5a shows a data flow diagram illustrating retrieving and selecting tickets in some of the DODAT™ embodiments.

FIG. 5a shows a data flow diagram illustrating retrieving and selecting tickets in some of the DODAT™ embodiments. In some implementations, a ticket accessor 505 may provide input 510 to an electronic device 515, in order to access the ticket pool and select a ticket. The electronic device may send a ticket pool request to the client 525. In some implementations, the request may be an HTTP(S) POST message that resembles the following:

```
POST /ticketpoolrequest.php HTTP/1.1
Host: www.DODATproccess.com
Content-Type: Application/XML
Content-Length: 788
<?XML version = "1.0" encoding = "UTF-8"?>
<ticketPool_request>
<timestamp>2012-01-06 12:30:00</timestamp>
    <personnel_params>
      <personnel_ID>12345abCD</personnel_ID>
      <personnel_name>John Smith</personnel_name>
      <personnel_type>employee</personnel_type>
      <personnel_company>MyCompany</personnel_company>
      <personnel_tickets>1234, 5678</personnel_tickets>
    </personnel_account_params>
</ticketPool_request>
```

The client may then generate a ticket retrieval request 530, which may access an API call 535 to the DODAT™ server 540. The DODAT™ server may use the information provided in the ticket pool request to filter tickets based on the user information (e.g., the user's company, the user's rank, the number of tickets the user is already working on, and/or the like). The DODAT™ server may send a query for these tickets 550 to the DODAT™ database 555. The DODAT™ database may return the set of tickets via a query result 560, which may be sent to the client via a response to the ticket request 565. The client may then send a ticket pool response 570 to the electronic device of the ticket accessor. The DODAT™ embodiments may then present the tickets to the ticket accessor in the form of a ticket pool, where the ticket accessor may choose a ticket to complete. If the ticket accessor selects a ticket, a ticket selection request 575 may be sent from the ticket accessor's electronic device to the client. The client may generate a selection request 580, which may be sent 858 to the DODAT™ server. The DODAT™ server may then initiate a query 590 to update the ticket to indicate that a new owner has been assigned to the ticket. The result of the ticket update 595 may be provided to the DODAT™ server, which may then send a selection response 503 to the client, which may in turn send a ticket selection response 506 to the ticket accessor's electronic device. In some implementations, the ticket selection response may comprise a message to the ticket accessor indicating the ticket selection was successful.

Figure 5B:
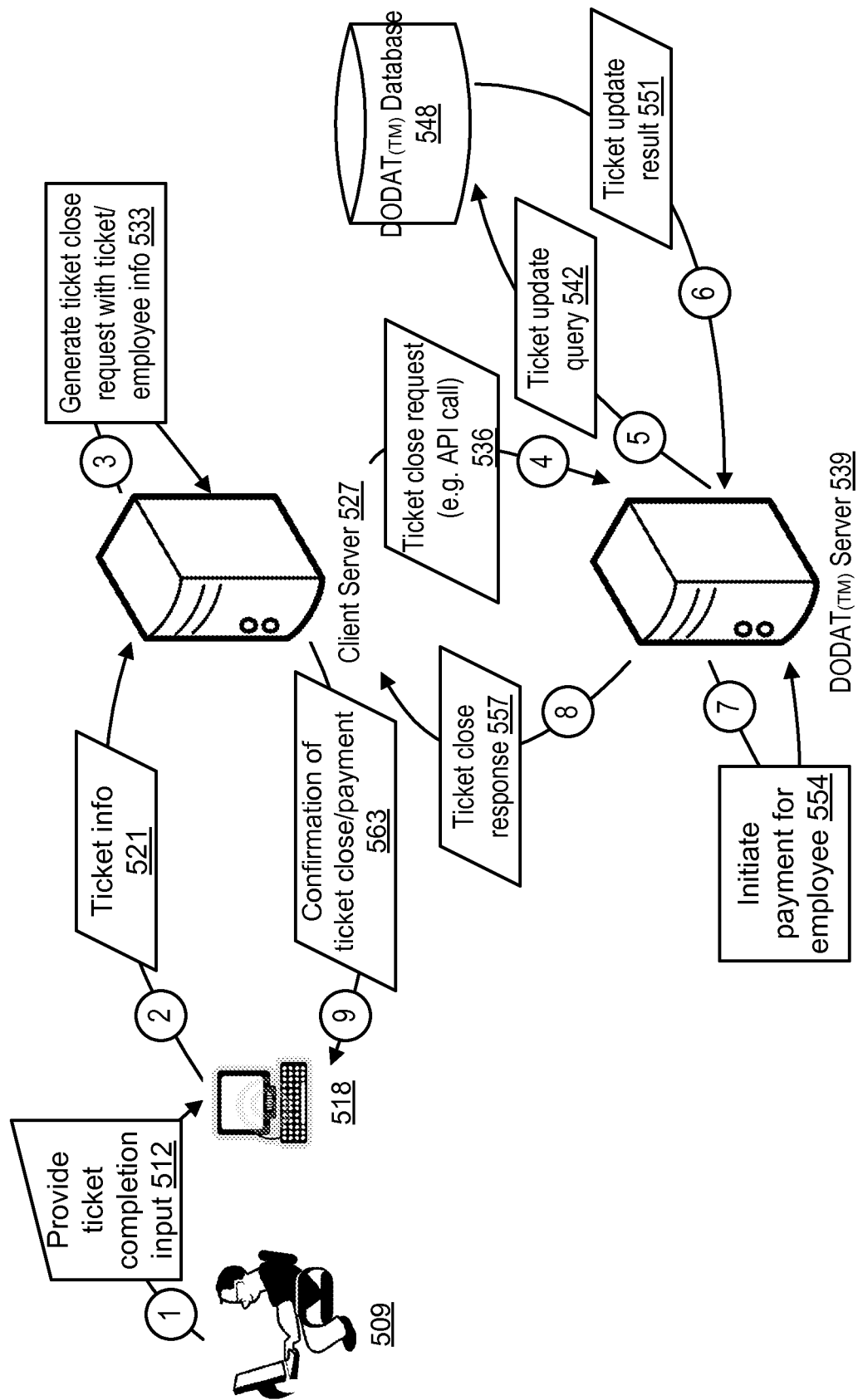
FIG. 5b shows a data flow diagram illustrating closing a ticket in some of the DODAT™ embodiments.

FIG. 5b shows a data flow diagram illustrating closing a ticket in some embodiments of the DODAT™ embodiments. In some implementations, the ticket accessor (e.g., employee) 509 may provide ticket completion input 512 to an electronic device 518. In some implementations, the ticket completion input may be selecting a "close" option on a ticket viewing page. The DODAT™ embodiments may then send a ticket information message 521 to the client server 527; in some implementations, the message may be in the form of a HTTP(S) POST message. The client server may then generate a ticket close request 533, using the information from the ticket and the ticket accessor closing the ticket. The client may then send a ticket close request 536 to the DODAT™ server 539. The DODAT™ server may send a query 542 to the DODAT™ database 548 in order to update the status of the ticket (e.g., to mark it as "closed"). Once the DODAT™ server has received a successful update result 551 from the DODAT™ database, the DODAT™ server may initiate payment for the ticket accessor who completed the ticket task 554. In some implementations, initiating payment may involve accessing the ticket accessor's online payment information (e.g., direct deposit information), creating a ticket for preparing and mailing a physical check to the ticket accessor, and/or the like. In some implementations, initiating payment may involve crediting the ticket accessor with the value of the ticket being closed, and withholding actual payment until a specified amount has been credited to the ticket accessor (e.g., crediting a ticket accessor's account until the ticket accessor has earned at least $50, and/or some like value). The DODAT™ server may also send a ticket close response 557 to the client server to indicate that the ticket update has been completed. The client may send a ticket information response 563 to the ticket accessor, which may include confirmation that the ticket has been closed, as well as confirmation that payment has either been initiated or completed.

Figure 6A:
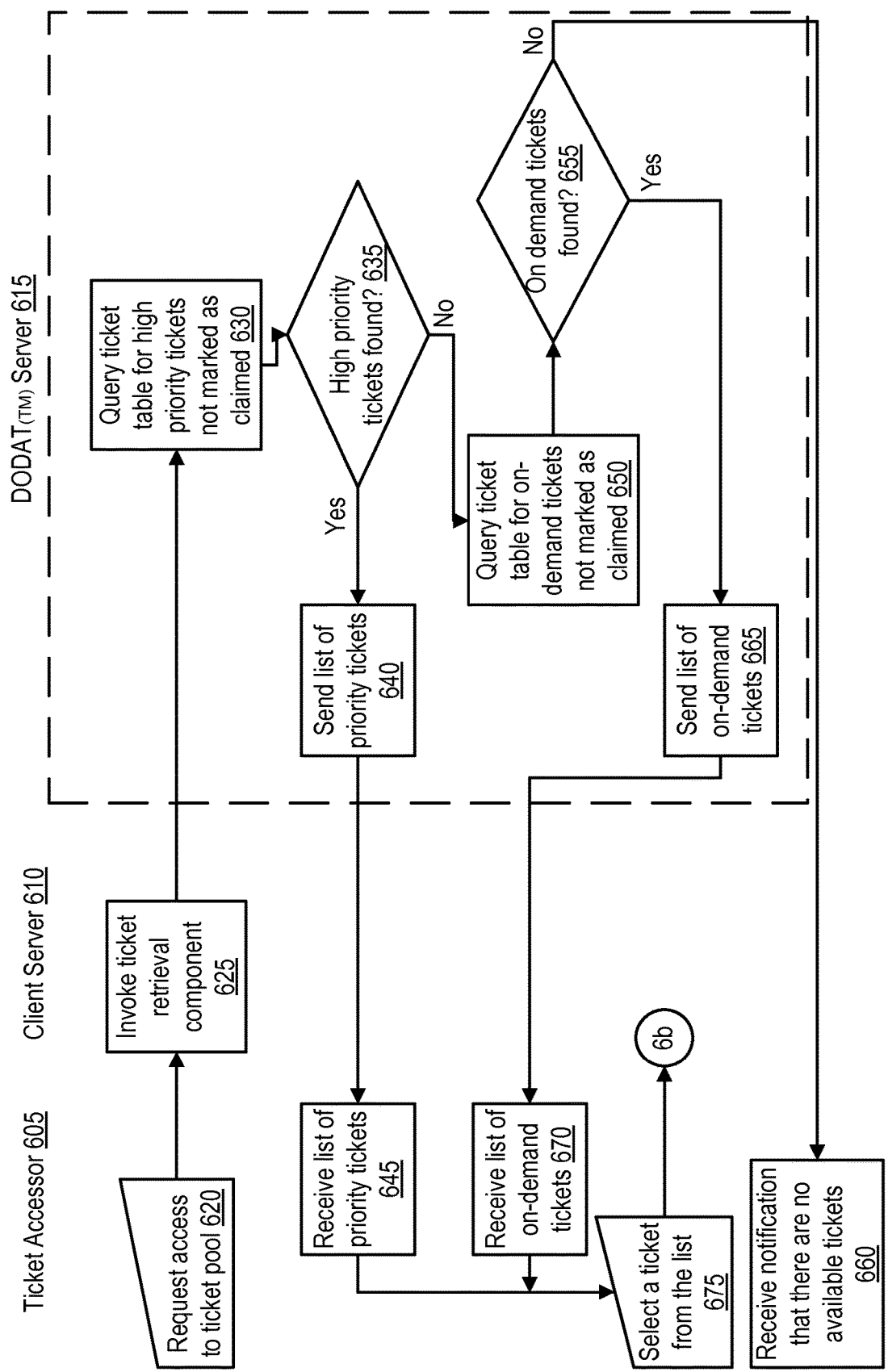
FIG. 6a-b shows logic flow diagrams illustrating retrieving and selecting tickets in some of the DODAT™ embodiments.
Figure 6B:
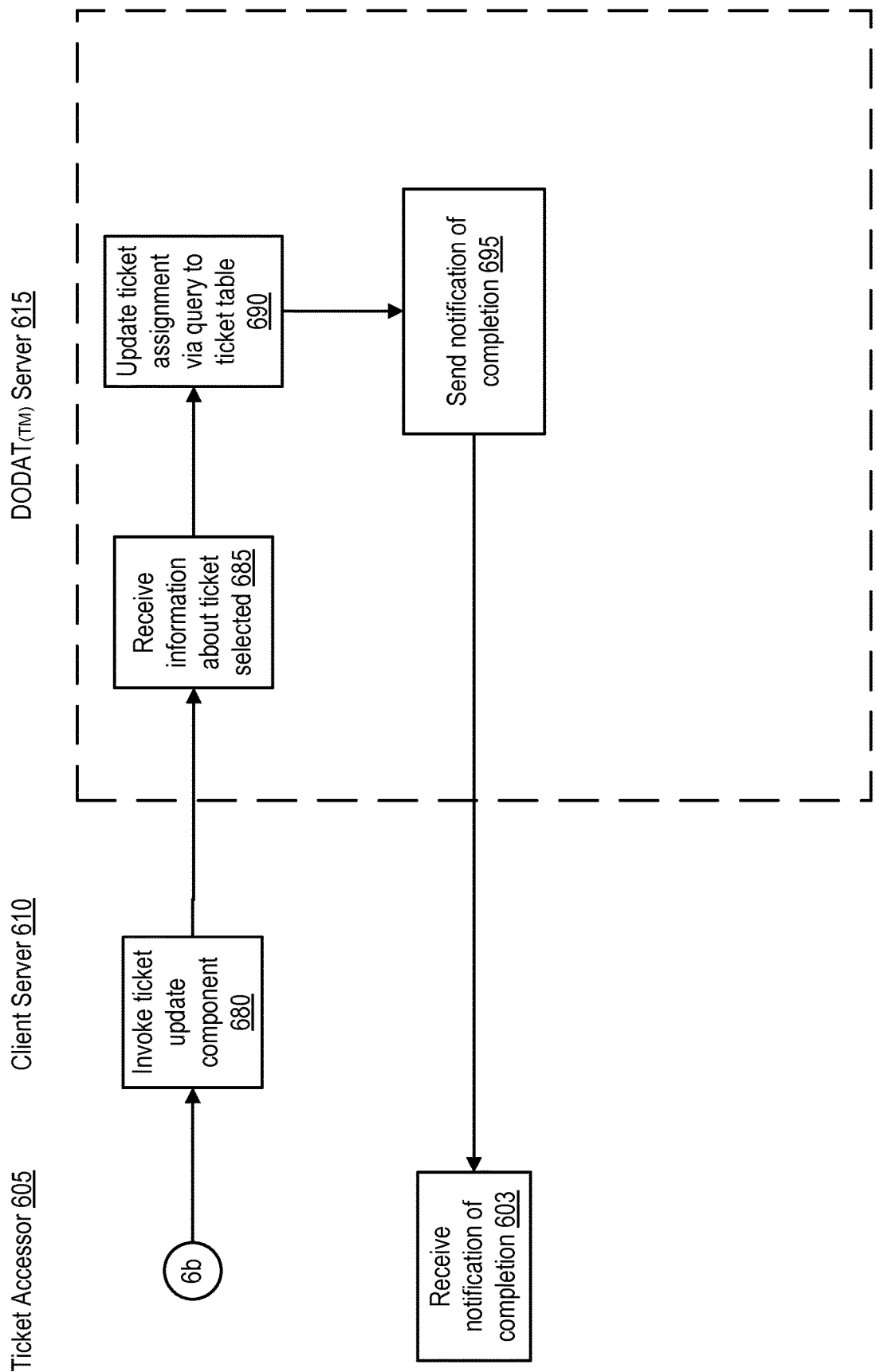

FIGS. 6a-b show logic flow diagrams illustrating retrieving and selecting tickets in some embodiments of the DODAT™ embodiments. In some implementations, the ticket accessor 605 may request access to the ticket pool 620. In some implementations, accessing the ticket pool may involve accessing a ticket pool interface that displays all available tickets for the ticket accessor to complete. When the ticket accessor requests access to the ticket pool, a message may be sent to the client server 610, which may invoke the ticket pool retrieval component 625. The ticket pool retrieval component may query the ticket table of the DODAT™ database on a DODAT server 615, which may involve searching the table for high-priority tickets that have not been claimed by other ticket accessors 630. In some implementations, tickets may be further filtered by the position the ticket accessor holds, tickets the ticket accessor has successfully completed before, and/or the like.

If high-priority tickets are found in the ticket table 635, then the DODAT™ server may send a list of references to the high-priority tickets that match the filtering parameters 640 to the server. If high-priority tickets are not found in the ticket table, the DODAT™ server may then query the ticket table for other priority tickets that are not marked as claimed 650. The DODAT™ server may also filter tickets based on parameters described above, and/or the like. References to the non-priority tickets may then be sent back to the server 665. If the ticket table also does not contain any non-priority tickets that match the filtering parameters, the ticket accessor may be sent a notification indicating that there are no available tickets to work on 660.

The server may then display the referenced high-priority 645 or on-demand 670 tickets in the interface that the ticket accessor is viewing the ticket pool from may. The ticket accessor may then select one of the tickets displayed in the ticket pool 675, initiating a process that may prompt the client server 610 to invoke the ticket update component 680. This component may receive the information about the ticket the ticket accessor selected 685, and may then query the ticket table of the DODAT™ database in association with the DODAT™ server 615 in order to find the ticket and update its status (e.g., to "claimed") and its owner (e.g., the ticket accessor) 690. In some implementations, the DODAT™ server may also send a notification of completion 695 to the ticket accessor, who may receive the notification of completion 603 via the ticket pool interface. In some implementations, a notification may also be sent to any supervisors linked to the ticket, and may include information as to who claimed the ticket, the date and time it was claimed, and/or the like.

Figure 6C:
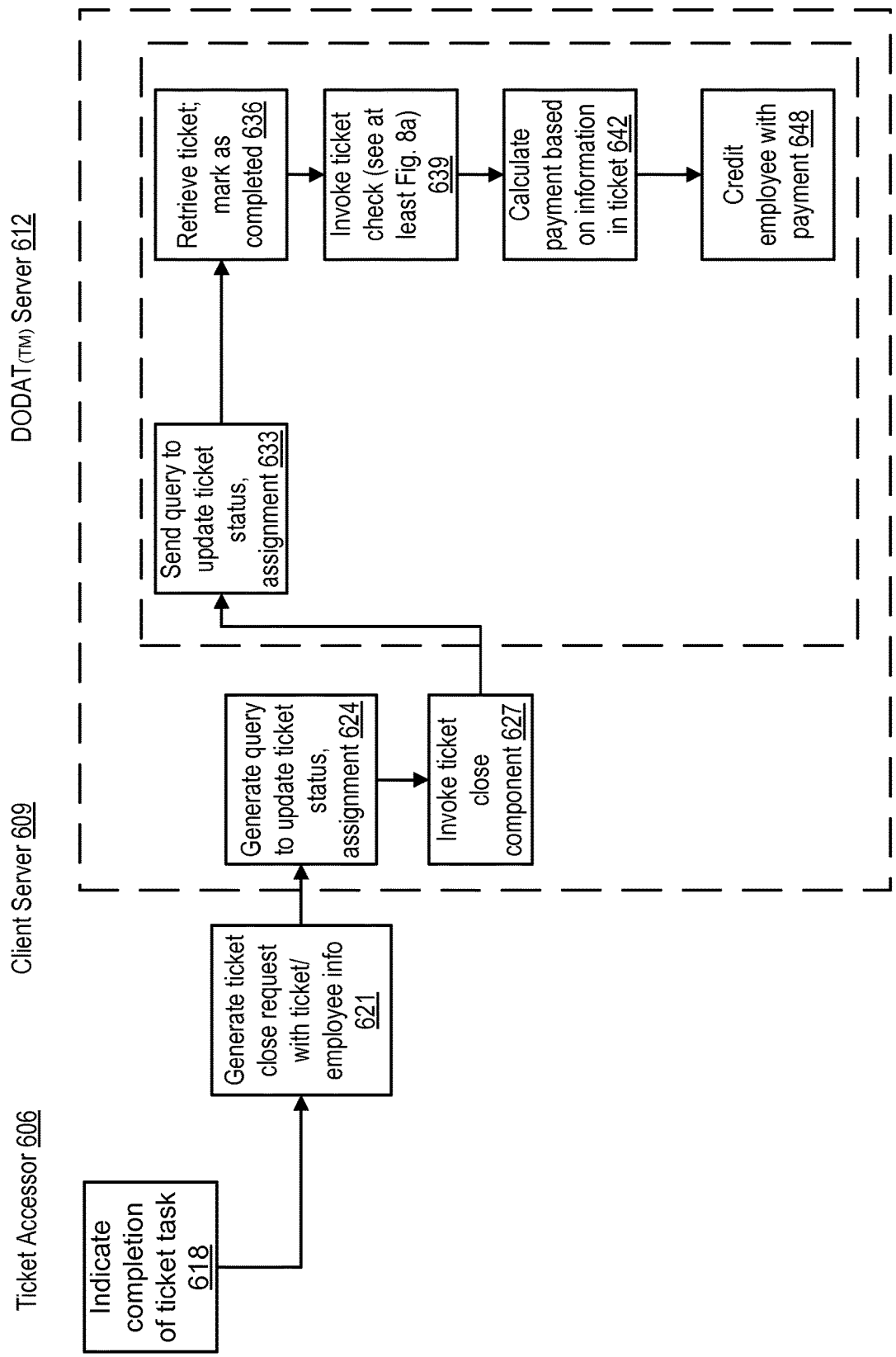
FIG. 6c shows a logic flow diagram illustrating closing tickets in some of the DODAT™ embodiments.

FIG. 6c shows a logic flow diagram illustrating closing tickets in some of the DODAT™ embodiments. In some implementations, a ticket accessor 606 may indicate that he has completed a task specified by a ticket 618. In some implementations, the ticket accessor may achieve this by viewing the ticket in a ticket viewing interface, and editing information regarding the ticket (e.g., choosing a "closed" option, entering in a description of what actions were performed in order to complete the ticket, and/or the like). Once the ticket accessor has submitted that the task has been completed, a ticket close request may be generated 621, which may possess information about the ticket being closed and the ticket accessor closing the ticket. The client server 609 may generate a query to the ticket table in the DODAT™ database on the DODAT™ server 612, in order to update the ticket information 624. Doing so may invoke a ticket close component 627, which may send this query to the DODAT™ server. The DODAT™ server may then retrieve the ticket 636 and may update the ticket information (e.g., marking the ticket as completed, indicating the time and date the ticket accessor completed the ticket, and/or the like). The DODAT™ server may invoke a ticket check 639 (see FIG. 8a) in order to determine whether the ticket has been satisfactorily completed; if the closed ticket clears the ticket check, the DODAT™ server may then calculate payment for the ticket accessor 642 based on the ticket value provided in the ticket information. The DODAT™ embodiments may then credit the ticket accessor with the payment 648.

In some implementations, crediting the ticket accessor may involve sending the ticket accessor the payment for the ticket task. In some implementations, this may involve retrieving financial information (e.g., a direct deposit account) that may be used to electronically provide the ticket accessor with the funds via direct depositing procedures. The DODAT™ embodiments may use the financial information to determine the financial institution that the ticket accessor uses, and may send a request to the financial institution (e.g., via an API call to the financial institution's server) to update the ticket accessor's account balance with the payment from the ticket task. The DODAT™ embodiments may also save a record of the payment in the transactions table of the DODAT™ database. In other implementations, if the ticket accessor does not possess an account that supports direct deposit, the DODAT™ embodiments may retrieve enough information (e.g., the name of the ticket accessor, the amount of the transaction, the ticket accessor's address, and/or the like) to create a ticket indicating that personnel should write a physical check, money order, and/or the like for the ticket accessor, and should mail it to the ticket accessor's address. In some implementations, the ticket created may be a regular-priority or on-demand ticket.

In other implementations, crediting the ticket accessor may involve crediting a ticket accessor account with the value of the ticket. In such implementations, the personnel account for the ticket accessor may include an account_balance field that may keep track of how much money has been credited to the ticket accessor by the DODAT™ embodiments. In some implementations, records of each credit may also be stored in the transactions table of the DODAT™ database. After a specified amount of money has been credited to the ticket accessor (the specified amount being chosen by the ticket accessor, by administrative personnel, and/or the like), the DODAT™ embodiments may automatically initiate actual payment to the ticket accessor using at least the techniques described above.

Figure 7:
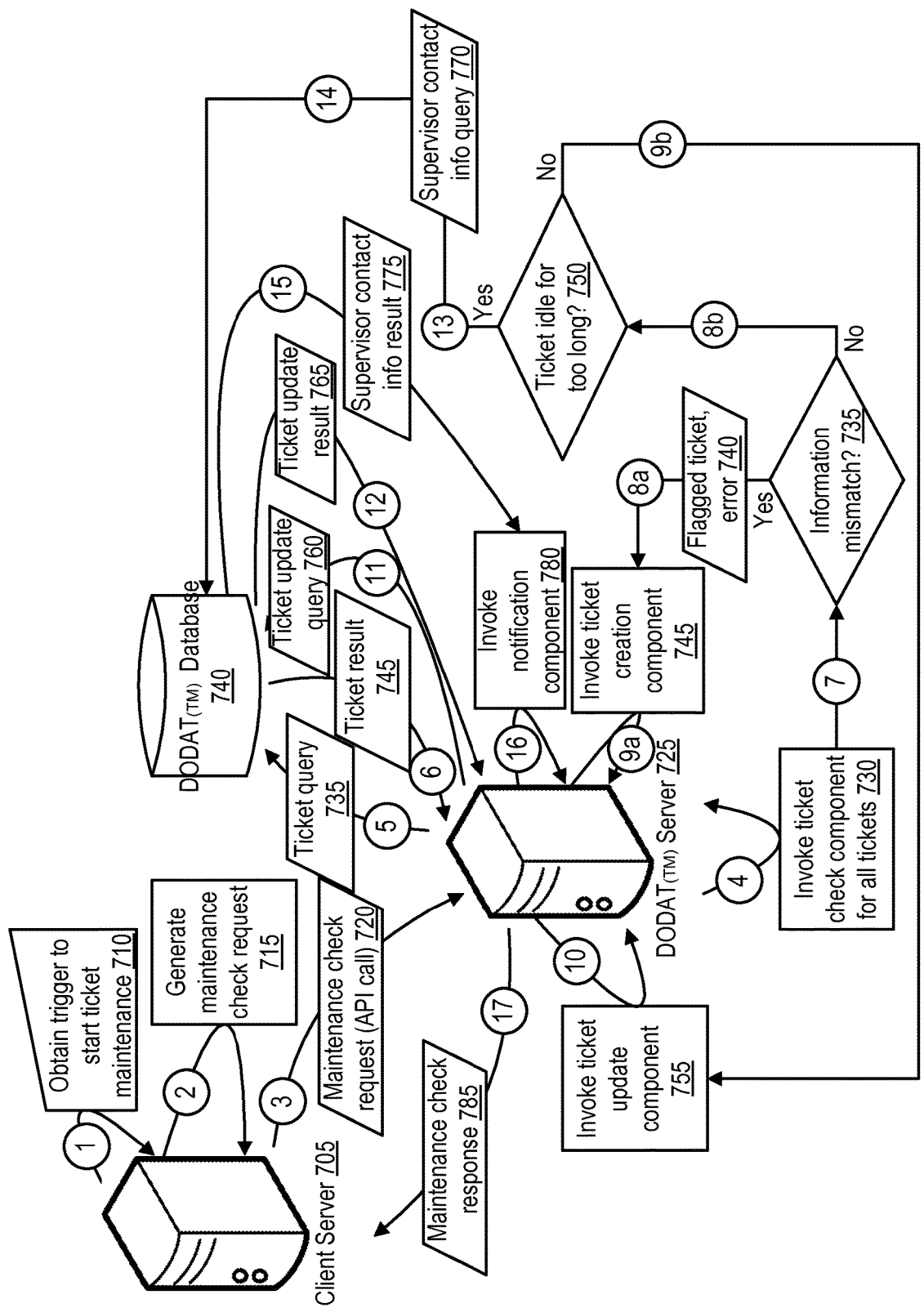
FIG. 7 shows a data flow diagram illustrating ticket maintenance in some of the DODAT™ embodiments.

FIG. 7 shows a data flow diagram illustrating ticket maintenance in some of the DODAT™ embodiments. In some implementations, the server 705 may receive a trigger to start ticket maintenance 710. In some implementations, the trigger may be a scheduled maintenance check on all tickets, a ticket processor-prompted ticket check, a ticket close procedure, and/or the like. Receiving a trigger may initiate generating a maintenance check request 715, which may comprise information about specific tickets to be checked, if only some tickets are to be checked. The server may then send a maintenance check request 720 to the DODAT™ server 725, which may prompt the DODAT™ server to invoke a ticket check component for all the tickets 730. In some implementations, the ticket check component may only be invoked for specified tickets. The DODAT™ server may then query 735 the DODAT™ database 740 in order to access a ticket to be checked, and send the result of the query 745 to the DODAT™ server. The DODAT™ database may also contain information as to what details should be in the ticket to be checked, and these details may also be sent with the result of the query. The DODAT™ server may then compare the information in the ticket to be checked with the information that should be in the ticket, in order to determine whether the ticket being checked has incorrect information 735.

If the information does not match, then the ticket may be flagged as a ticket with a potential error in it, and an error may be sent to the DODAT™ server 740. For example, if a delivery personnel submits a proof of delivery (and thus creates a ticket in the system), and the geolocation data in the proof of delivery image indicates that the delivery personnel submitted the document a state away from the expected delivery location, the DODAT™ embodiments may flag the ticket submitted by the delivery personnel. In some implementations, flagging the ticket may involve changing a boolean value within the ticket to indicate that it is flagged. When a ticket is flagged, the DODAT™ server may invoke the ticket creation component 745, which may create a ticket indicating that the flagged ticket needs to be reviewed by human personnel.

If the human personnel determine that the flagged ticket is correct, the ticket may be unflagged. In some implementations, this could involve closing the ticket prompting the personnel to review the flagged ticket, which may in turn unflag the flag ticket automatically; in other implementations, the human personnel may manually unflag the ticket. If the human personnel determine that the flagged ticket does contain errors, they may be prompted to rectify the discrepancies in the ticket, to complete the ticket task a second time, and/or a like action. For example, if a human personnel verifies that the proof of delivery does seem to have been submitted from a location different from the expected delivery address, the personnel may be prompted to create tickets to call the delivery personnel to get more information on the delivery, to call the client and determine if the delivery made it to the right destination, and/or the like. The personnel may also be prompted to cancel any payments that have been issued to the delivery personnel who completed the task.

If the information in the checked ticket matches the information that the ticket should contain, the DODAT™ embodiments may then check to determine whether the ticket has been idle for too long 750. In some implementations, the amount of idle time allowed may be specified on a per-ticket basis; in some implementations, it may be specified based on the priority of the ticket (e.g., a high-priority ticket may allow an idle time of a minute, while a regular ticket may be allowed to be idle for five minutes, and/or the like). If the ticket has been idle for too long, a query may be sent to the DODAT™ database in order to obtain the contact information of the ticket processor(s) responsible for the ticket 770. The DODAT™ database may return the contact information in a ticket processor contact information result 775 from the database, which may prompt the DODAT™ server to invoke a notification component 780 that sends a message to the ticket processor indicating that the ticket has been left idle for too long. If the ticket has not been idle for too long, then the ticket may be updated through the ticket update component 755, which may send a ticket update query 760 to the DODAT™ database in order to indicate that the ticket has been cleared in the maintenance check. In some implementations, information as to when the ticket was checked may be stored in a log that may keep track of discrepancies found in each of the tickets in the DODAT™ embodiments. The DODAT™ database may then send a ticket update result 765 to the DODAT™ server, which may then repeat the process of checking tickets until the last ticket has been checked. Once the last ticket has been checked, the DODAT™ server may send a maintenance check response 785 to the server 705, indicating that the maintenance check has been completed. In some implementations, the response may also contain information as to how many tickets contained discrepancies, the ticket accessors and processors associated with the tickets that contained discrepancies, and/or the like.

Figure 8A:
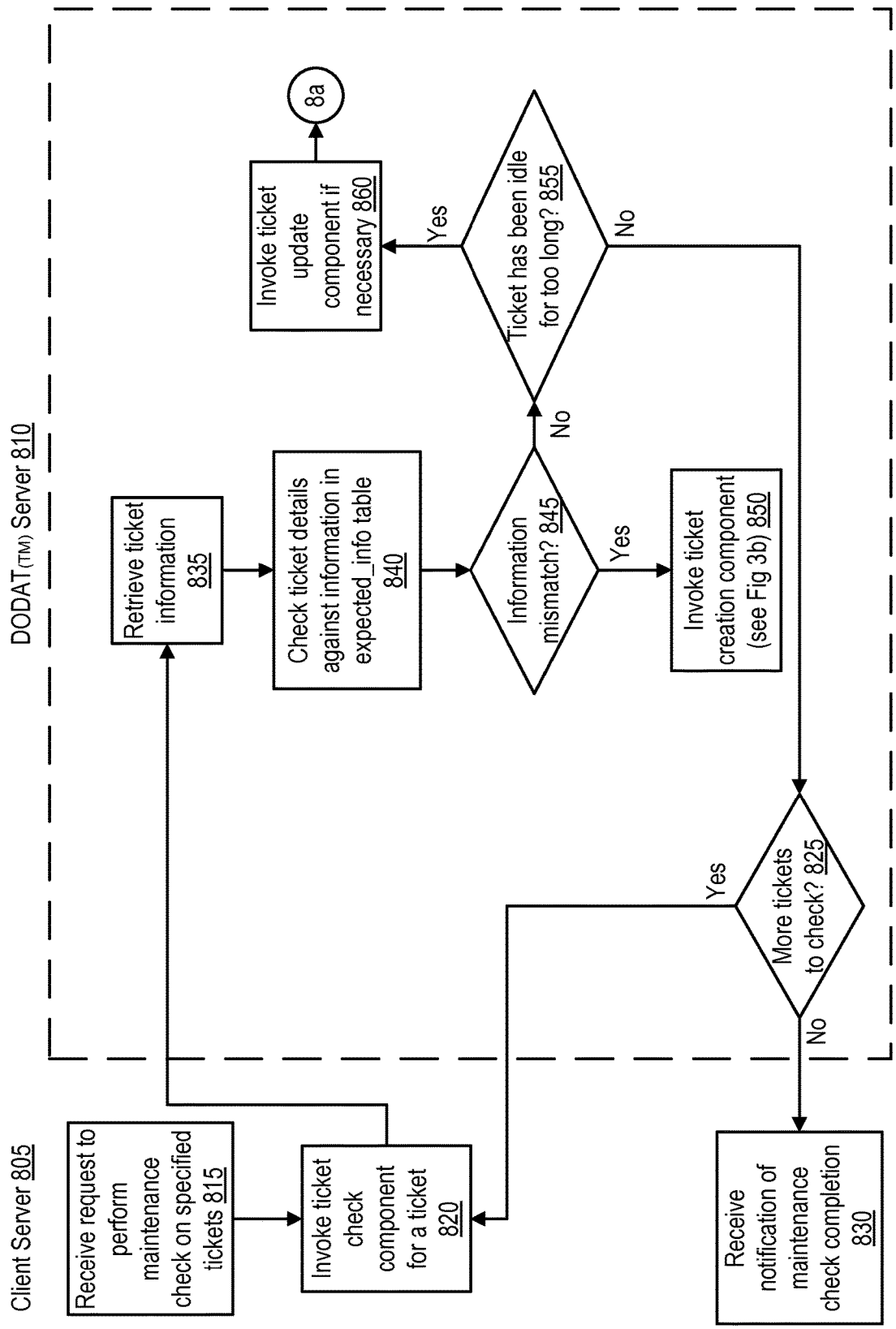
FIG. 8a-b shows logic flow diagrams illustrating ticket maintenance in some of the DODAT™ embodiments.
Figure 8B:
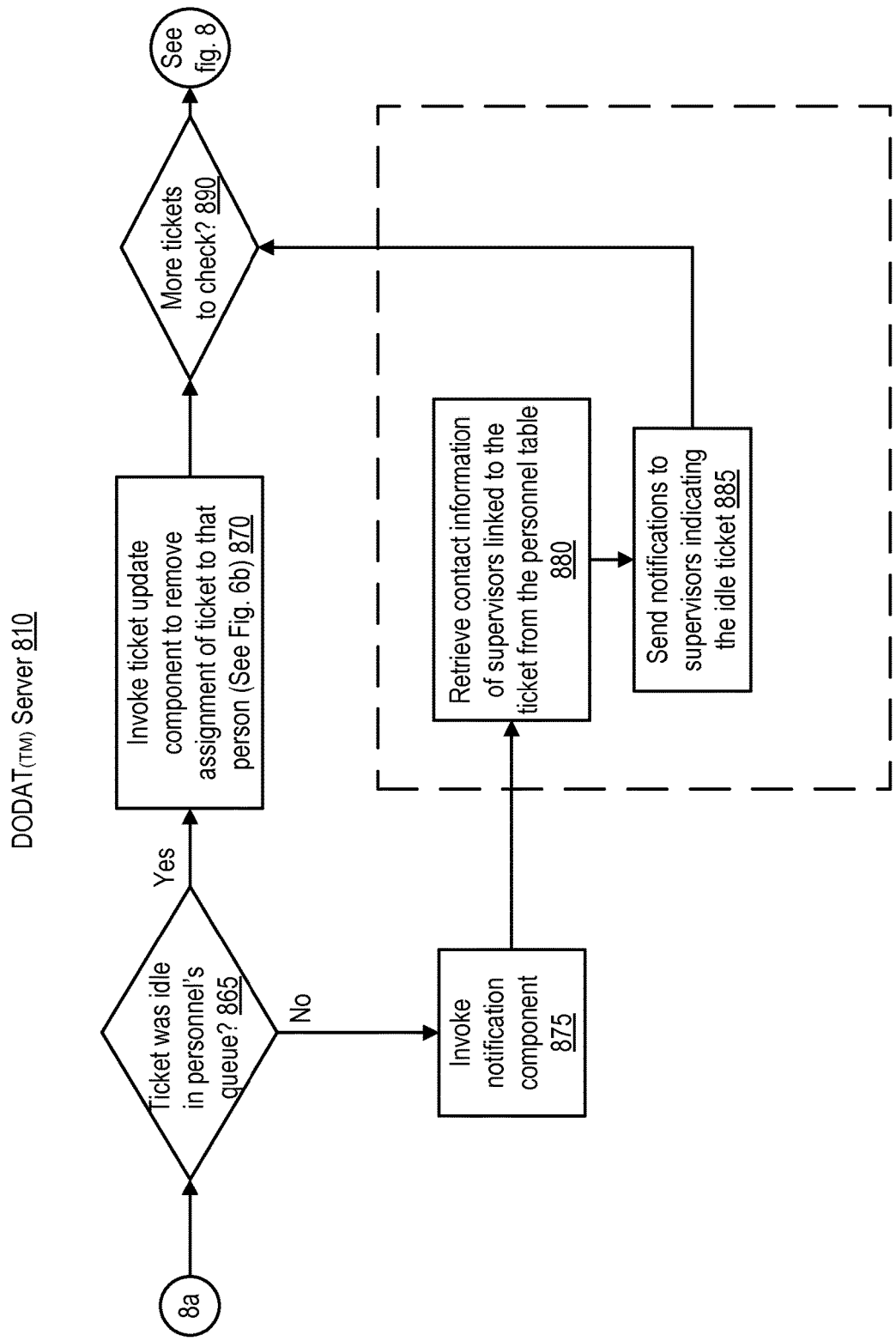

FIGS. 8a-b show logic flow diagrams illustrating ticket maintenance in some of the DODAT™ embodiments. In some implementations, the server 805 may receive a request to perform a maintenance check on specified tickets 815. In some implementations, the specified tickets may be a subset of the total tickets. In other implementations, the specified tickets may include all tickets in the DODAT™ database. The server may invoke a ticket check component for each ticket 820. The ticket check component may retrieve ticket information 835 in the ticket table of the DODAT™ database within the DODAT™ server 810; the ticket check component may also access information in a expected_info table 840, which represents information that should be in the ticket in the ticket table. For example, if the ticket being checked is supposed to contain proof of a delivery scheduled for a particular day in a particular location, the information linked to the ticket in the expected_info table may specify the time and location that should be present in the EXIF data present in the image within the proof of delivery ticket. The DODAT™ server may check the information in the ticket against the information retrieved from the expected_info table. If there is a mismatch in the information 845, the DODAT™ server may flag the ticket as being in error, and may invoke the ticket creation component 850 in order to make a ticket with instructions to check the flagged ticket. If there is no mismatch, the DODAT™ server may check to determine whether the ticket has been left idle for too long 855. If it has not been left idle for too long, then the DODAT™ server may check to determine whether there are more tickets to check 825, and may either invoke the ticket check component for the next ticket to be checked 820, or may send a notification to the server indicating that the maintenance check has been completed 830. If the ticket has been left idle for too long, then the DODAT™ server may invoke the ticket update component 860. In some implementations, if the ticket was left idle in a ticket accessor's queue 865, the DODAT™ server 810 may remove assignment to the ticket accessor and to return the ticket to the ticket pool 870. If the ticket was left idle, but was not assigned to a ticket accessor's queue, the DODAT™ server may invoke a notification component 875, which may retrieve the contact information of ticket processors linked to the idle ticket 880. In some implementations, the contact information may be retrieved from the personnel table in the DODAT™ database on the DODAT™ server. The DODAT™ server may then send notifications to the ticket processors linked to the idle ticket, indicating that the ticket has been left idle for too long 885. In other implementations, the ticket update component may be invoked if the ticket has a close deadline; in such instances, the DODAT™ embodiments may elevate the priority of the ticket. The DODAT™ server may then determine whether there are more tickets to check 890; if there are more tickets, the DODAT™ server may check the next ticket 820; otherwise it may send a notification to the server indicating that the maintenance check was completed 830.

DODAT™ Controller

Figure 9:
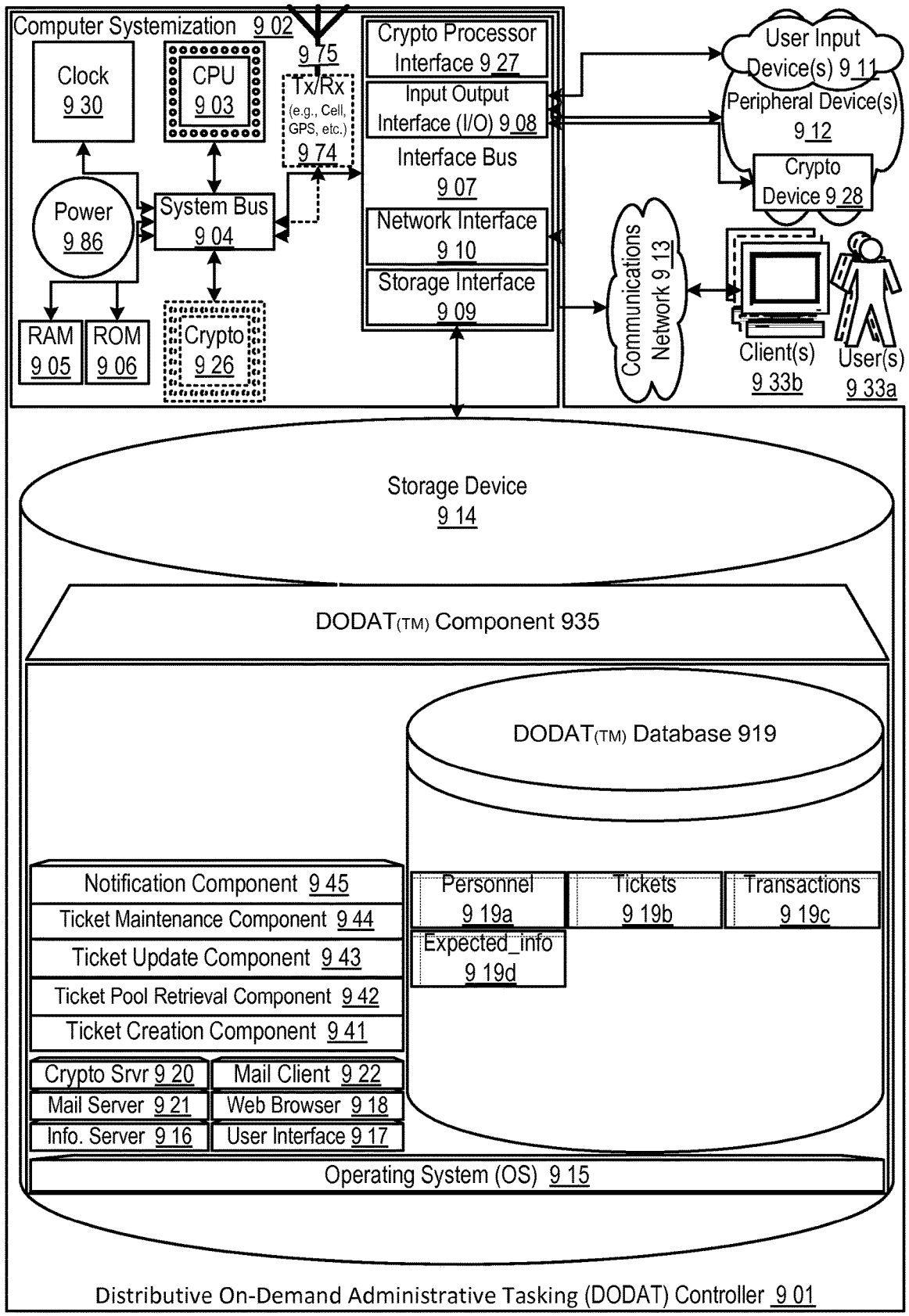
FIG. 9 shows a block diagram illustrating some aspects of a DODAT™ controller.

FIG. 9 shows a block diagram illustrating embodiments of a DODAT™ controller. In this embodiment, the DODAT™ embodiments controller 901 may serve to aggregate, process, store, search, serve, identify, instruct, generate, match, and/or facilitate interactions with a computer through internet technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DODAT™ controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DODAT™ controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the DODAT™ controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DODAT™ controller and beyond through various interfaces. Should processing requirements dictate a greater amount speed and/or capacity, distributed processors (e.g., Distributed DODAT™ embodiments), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DODAT™ embodiments may be achieved by implementing a microcontroller such as CAST's R8051XC2 microcontroller; Intel's MCS 51 (i.e., 8051 microcontroller); and/or the like. Also, to implement certain features of the DODAT™ embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DODAT™ embodiments component collection (distributed or otherwise) and/or features may be implemented via the microprocessor and/or via embedded components; e.g., via ASIC, coprocessor, DSP, FPGA, and/or the like. Alternately, some implementations of the DODAT™ embodiments may be implemented with embedded components that are configured and used to achieve a variety of features or signal processing.

Depending on the particular implementation, the embedded components may include software solutions, hardware solutions, and/or some combination of both hardware/software solutions. For example, DODAT™ features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DODAT™ embodiments features. A hierarchy of programmable interconnects allow logic blocks to be interconnected as needed by the DODAT™ embodiments system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DODAT™ embodiments may be developed on regular FPGAs and then migrated into a fixed version that more resembles ASIC implementations. Alternate or coordinating implementations may migrate DODAT™ controller features to a final ASIC instead of or in addition to FPGAs. Depending on the implementation all of the aforementioned embedded components and microprocessors may be considered the "CPU" and/or "processor" for the DODAT™ embodiments.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the DODAT™ embodiments thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the DODAT™ embodiments controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DODAT™ embodiments), architectures may similarly be employed to pool, load balance, and/or otherwise increase the communicative bandwidth required by the DODAT™ controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 912 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the DODAT™ controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DODAT™ controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the DODAT™ controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the DODAT™ controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blueray, CD ROM/ RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the DODAT™ embodiments component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the DODAT™ controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DODAT™ controller to communicate with other entities through a communications network 913. Various communication protocols may be used by the DODAT™ controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DODAT™ controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DODAT™ database 919, operating systems, other program components, user interfaces, Web browsers, and/or the like.

Access to the DODAT™ database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DODAT™ embodiments. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DODAT™ embodiments as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DODAT™ embodiments enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DODAT™ embodiments.

Access to the DODAT™ embodiments mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DODAT™ embodiments may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DODAT™ embodiments component to engage in secure transactions if so desired. The cryptographic component facilitates the secure accessing of resources on the DODAT™ embodiments and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DODAT™ Database

The DODAT™ database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DODAT™ database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DODAT™ database is implemented as a data-structure, the use of the DODAT™ database 919 may be integrated into another component such as the DODAT™ embodiments component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919a-d. A personnel table 919a includes fields such as, but not limited to: a personnel ID, personnel_company_ID_number, personnel_name, personnel_type, personnel_company, personnel_tickets, and/or the like. The personnel table may support and/or track multiple entity accounts on the DODAT™ embodiments. A tickets table 919b includes fields such as, but not limited to: ticket_ID, ticket_priority, ticket_timestamp, ticket_due_date, ticket_status, ticket_company, ticket_title, ticket_value, ticket_supervisors, ticket_assignee, ticket_key, and/or the like. The ticket table may track and/or store multiple tickets created on the DODAT™ embodiments. A transactions table 919c includes fields such as, but not limited to: transaction_ID, transaction_payee, transaction_payer, transaction_timestamp, transaction_amount, transaction_billing_info, transaction_relevant_ticket, and/or the like. An expected_info table 919d includes fields such as, but not limited to: expected_info_ID, expected_info_relevant tickets, and/or the like. Similarly, other data fields can be provided to implement any other embodiment described herein. Such data can include, but is not limited to, GPS coordinates of a service provider or customer, a price for goods or description of goods, an expiration time, a description of a legal or regulatory violation, an individual submitting traffic violation information, a description of services to be performed, and the like.

In some embodiments, the DODAT™ database may interact with other database systems. For example, employing a distributed database system, queries and data access by search DODAT™ component may treat the combination of the DODAT™ database, an integrated data security layer database as a single database entity.

In one embodiment, user programs may contain various user interface primitives, which may serve to update the DODAT™ embodiments. Also, various accounts may require custom database tables depending upon the environments and the types of clients the DODAT™ embodiments may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-d. The DODAT™ embodiments may be configured to keep track of various settings, inputs, and parameters via database controllers.

The DODAT™ database may communicate to and/or with other components in a component collection, including itself, and/or facilities of the like. Most frequently, the DODAT™ database communicates with the DODAT™ component, other program components, and/or the like. The database may contain, retain, and provide information regarding other nodes and data.

The DODAT™ Component

The DODAT™ component 935 is a stored program component that is executed by a CPU. In one embodiment, the DODAT™ component incorporates any and/or all combinations of the aspects of the DODAT™ embodiments that were discussed in the previous figures or other portions of the present disclosure. As such, the DODAT™ embodiments affect accessing, obtaining and the provision of information, services, transactions, and/or the like across various communications networks.

The DODAT™ embodiments transform ticket and user inputs via DODAT components 941-945 and 919a-d into payment and work product outputs.

The DODAT™ embodiments component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DODAT™ server employs a cryptographic server to encrypt and decrypt communications. The DODAT™ component may communicate to and/or with other components in a component collection, including itself, and/or facilities of the like. Most frequently, the DODAT™ component communicates with the DODAT™ database, operating systems, other program components, and/or the like. The DODAT™ embodiments may contain, communicate, generate, obtain, and/or provide program component, system, user, and/or data communications, requests, and/or responses.

Distributed DODAT Embodiments

The structure and/or operation of any of the DODAT™ node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DODAT™ controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DODAT™ controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
```

-continued

```
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm
    and other parser implementations:
http://publib.boulder.ibm.com/infocenter/tivihelp/v2rl/index.jsp?topic=/com.ibm.IBMDI.doc/referenceguide259.htm all of which are hereby expressly incorporated by reference.

Figure 10:
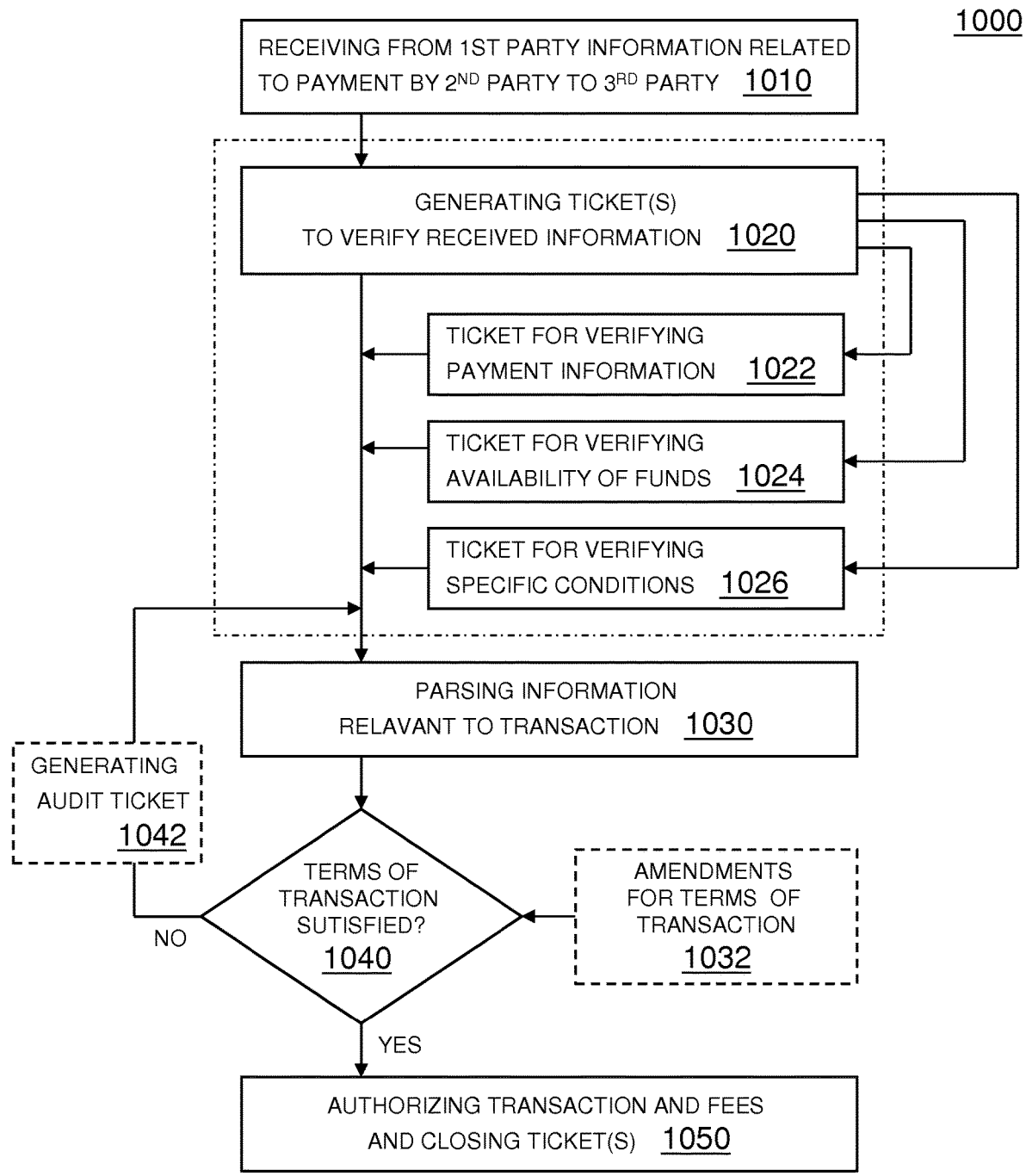
FIG. 10 shows a logic flow diagram of further DODAT™ embodiments.

Referring to FIG. 10, there is depicted a high level logical flowchart of a method 1000 for servicing financial transactions using a distributive on demand service management system (i.e., the DODAT™ system). In broader terms, applications of the method 1000 relate to administration by the DODAT™ system, as an administrative service provider, of payments performed, via an intermediary (1st party), by a 2nd party to a 3rd party.

The method 1000 can be utilized for servicing financial transactions between and/or within entities or between customers and service providers, among other types of financial transactions. Such transactions and related communications may be performed by mail, fax/phone or via electronic means (i.e., processors and servers connected to communication networks/the Internet) or a combination thereof and, in some instances, may include person-to-person communication.

Illustrative examples of the applications of the method 1000 include administration of payments on invoices between the involved parties, mitigation of documental/material discrepancies (e.g., insufficient or erroneous payment amounts, incorrect payee or routing information, and the like) and financial errors (e.g., lack of sufficient funds), and complaint management. In some embodiments, the invoices may relate to payments for shipment of goods, trade services, legal services, investment services, or administrative services. Another representative group of applications relates to management of payments and customer complaints within daily deal systems, such as GroupOn® and LivingSocial® and the like, as well as within booking systems, such as transportation, hotel, entertainment and other booking systems.

In further embodiments, the method 1000 may include administration of payments having specific conditions (e.g., resolution of customer complaints prior to payment initiation, execution of payments in installments, on specific dates, and the like).

Illustrative examples of the transactions include, but not limited to, payments on invoices for services, products, parts, transportation, bookings and reservations, medical treatment and drugs, debt/installment payments, advance/late/conditional payments, among other types of payments.

In the depicted embodiment, at step 1010, a financial transaction is initiated by a $1^{st}$ party (i.e., client of the DODAT™ system) that forwards to an administrative service provider (i.e., administrator of the DODAT™ system) a message requesting to service (or informing about) a payment to be performed by a $2^{nd}$ to a $3^{rd}$ party. The message may be delivered by an electronic means (e.g., via a processor) or any other means of communications, and at least portions of the message may relate to time-sensitive events.

In exemplary applications, the administrator may be an individual (broker, accountant, attorney, trustee, agent, and the like) or an entity utilizing the DODAT™ system. Alternatively, at least a portion of functions of the administrator may be performed by a computer program running on a computer(s) accessible by the $1^{st}$ party.

The received from the $1^{st}$ party message generally includes payment information (e.g., names and addresses of the involved parties, account/routing number(s), due date(s) and amount(s) of payments, invoice(s) number(s), description of provided/received service(s), DODAT™ processing fee (i.e., remuneration), payment schedule, etc.) or at least pre-determined portions thereof necessary for executing the transaction between these parties.

The funds for the transaction and paying service fees (e.g., to the administrator of the DODAT™ system) may reside at or be credited to an account (or accounts) associated with the administrator of the DODAT™ system. In an alternate embodiment, at least a portion of the funds may be associated with an account (or accounts) of the $1^{st}$ party.

Generally, a service fee schedule for using the DODAT™ system is agreed upon in advance with the administrator of the system (e.g., based on an amount of the transaction and/or complexity of its execution), and these fees may be charged against pre-selected accounts of one or several involved parties. Remuneration value of the service fees may depend on the value, urgency, and complexity of the transaction, among other factors.

At step 1020, the administrator of the DODAT™ system generates at least one distributive on demand administrative task ticket for verifying elements of the information received from the $1^{st}$ party. For example, the administrator may generate a distributive on demand administrative task ticket for verifying payment information, availability of funds information, as well as compliance with other terms and conditions of the transaction between by the involved parties.

Alternatively (as depicted in FIG. 10), the administrator of the DODAT™ system may issue several distributive on demand administrative task tickets, each selectively related to a specific task or tasks, e.g., a first distributive on demand administrative task ticket 1022 for verifying the payment information, a second distributive on demand administrative task ticket 1024 for verifying availability of the funds, and a third distributive on demand administrative task ticket 1026 for verifying compliance with other terms and conditions of the transaction.

In other embodiments, a number of the generated distributive on demand administrative task tickets may by either greater or smaller than 3, and the DODAT™ system performs the same processes regardless of a number of the generated distributive on demand administrative task tickets.

Each of the tickets may be posted on the DODAT™ server (discussed in reference to FIGS. 3, 5a-5b, 7, and 9), assign a different level of priority (i.e., placed in queue among other distributive on demand administrative task tickets), and have a plurality of fields selectively corresponding to particular sub-tasks. Level of priority of the distributive on demand administrative task tickets is generally based on their urgency and workload of personnel. The queue may further be adapted and configured to permit the DODAT™ system to select such distributive on demand administrative task tickets or portions thereof for review or completion.

The distributive on demand administrative task tickets may also include attributes stipulating specific processing conditions, such as particular need dates/time, and the like. When such conditions are violated or there is a substantial risk of their violation, the DODAT™ system may generate alarm signals directed to personnel assigned to these ticket (s) and/or the administrator.

At step 1030, the distributive on demand administrative task tickets (illustratively, tickets 1022, 1024, and 1026) are processed, as discussed above in reference to FIGS. 4a-4b, 5a-5b, 6a-6c, 7, and 8a-8b. At least a portion of these tasks may be performed using computers associated the DODAT™ system. In optional embodiments, the DODAT™ system may assign remuneration values for completing a specific distributive on demand administrative task ticket or a portion thereof, as well as offer the ticket or its portions for processing to a winning bidder.

The results of the processing may be presented in tabular, graphical, and other formats. In general, at step 1030, personnel assigned to the distributive on demand administrative task tickets (e.g., one or several administrators of the DODAT™ system or their staff) parses the message received at step 1010, and then extracts relevant reference information from the message and/or the DODAT™ database (discussed in reference to FIGS. 5a-5b, 7 and 9), as well as uses records available from other data depositories.

In some embodiments, information and records of interest may be accessed using mobile computing devices, such as a tablet, a smart phone, and the like. Noticed discrepancies and/or errors are reported to the $1^{st}$ party for taking corrective actions. In some cases, the $2^{nd}$ and $3^{rd}$ parties may also be contacted to resolve the discrepancies and/or errors.

During execution of the distributive on demand administrative task ticket 1024, availability of the funds information is generally verified using records from the respective financial institutions (e.g., banks) that maintain an account (or accounts) to be credited by the $2^{nd}$ party. Such information may be obtained from bank account servers and other depositories of financial data. In some embodiments, the received from the $1^{st}$ party information includes pre-selected key words that, when parsed and detected, cause the DODAT™ system to interrogate a bank account server associated with the respective bank account in order to obtain the funds availability or fund transfer information.

Correspondingly, execution of the distributive on demand administrative task ticket 1026 includes verifying satisfaction of the specific condition, if any, for the transaction. Noticed violations, discrepancies and/or errors are reported to and discussed with the involved parties for taking corrective actions.

At step 1040, the method 1000 queries whether the payment information (distributive on demand administrative task ticket 1022) is correct (or has been corrected), the needed funds are available (distributive on demand administrative task ticket 1024) and all other conditions (distributive on demand administrative task ticket 1026) of the transaction have been verified, matched, and/or otherwise positively confirmed.

If the query is answered negatively, the method 1000 proceeds back to step 1030. In a further embodiment, at an optional step 1042, the method 1000 may generate a distributive on demand administrative audit task ticket to investigate whether the distributive on demand service has been completed or to determine reasons for delays in the completion. If the query of step 1040 is answered affirmatively, the method 1000 proceeds to step 1050.

In further embodiments, at optional step 1032, the involved parties may agree to amend the payments schedule or any other terms of the transaction (e.g., in case of insufficiency of funds, parties may agree to installment payments instead of a full payment or to an extended payment schedule, and the like), and these amendments are taken into consideration in queries of step 1040.

At step 1050, the administrator of the DODAT™ system authorizes (i.e., initiates) the requested transaction (i.e., payment to the $3^{rd}$ party) and the DODAT™ system service fees and closes the distributive on demand administrative task ticket(s) generated at step 1020 and optional step 1042. Typically, the administrator of the DODAT™ system maintains for future reference records of the assignments and clients in the database of the system.

In one illustrative application, the method 1000 is used in a financial services industry for processing, at request of a $1^{st}$ party (as a client of the DODAT™ system) a payment performed by a $2^{nd}$ party on an invoice (or bill) from a service provider (or credit card company) as a $3^{rd}$ party. In this application, the payment can be initiated from an account associated (i.e., under control of) an administrator of the DODAT™ system. At step 1010, the $1^{st}$ party provides the administrator of the DODAT™ system with information materially relevant to the requested payment and parties involved in the transaction. At step 1020, the administrator of the DODAT™ system generates at least one distributive on demand administrative task ticket for verifying the provided information (e.g., addresses and account information, availability of funds, validity/completion of serviced to be paid for, etc.) and, at step 1130, the ticket(s) is(are) processed. Noticed errors and discrepancies, if any, are reported for resolution to the respective parties. At step 1040, the DODAT™ system queries if all terms of the request of step 1110 have been satisfied and repeats returning to step 1130 until the query is answered affirmatively. Thereafter, the method 1000 proceeds to step 1050, where the DODAT™ system initiates the requested payment and collection of its service fees and then closes the open ticket(s).

Figure 11:
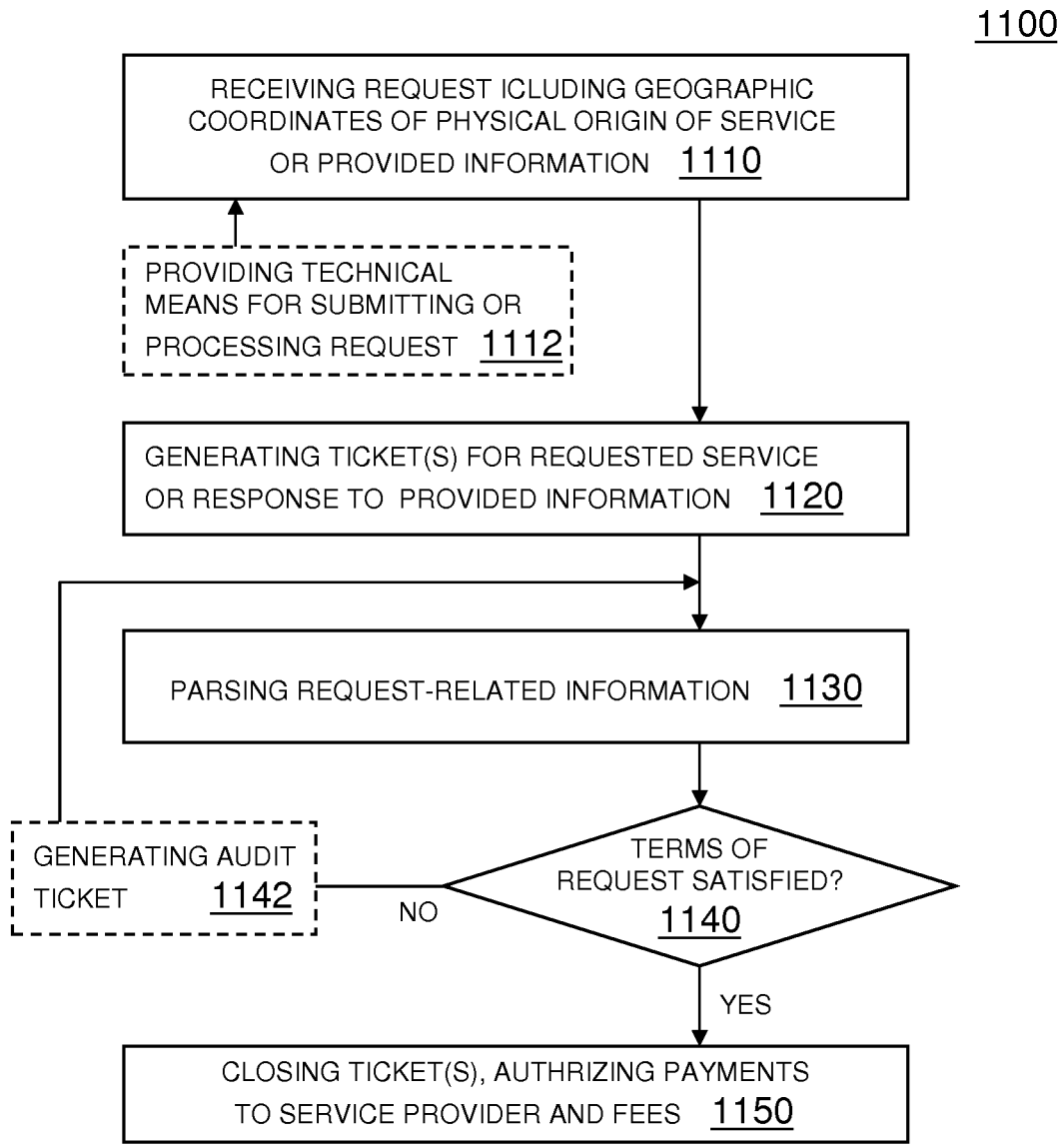
FIG. 11 shows a logic flow diagram of still further DODAT™ embodiments.

Referring to FIG. 11, there is depicted a high level logical flowchart of a method 1100 for using a distributive on demand service management system (i.e., the DODAT™ system) for servicing transactions or information exchanges that include geographic coordinates of a physical origin (i.e., location) where particular services were or to be performed or information of interest is/was available or recorded. In broader terms, in applications of the method 1100, the DODAT™ system operates as an intermediary (i.e., administrative service provider) between a $1^{st}$ party (client of the DODAT™ system) and a $2^{nd}$ party, such as a provider of trade services or a source of provided information associated with a location at specific geographic coordinates (e.g., information related to legal violation or administrative services).

Representative applications of the method 1100 include, but not limited to, trade services (e.g., maintenance and repair services for aircraft, cars, trucks, and other means of transportations, delivery services for people, perishable (food, medicine, flowers, etc.) or imperishable products, locality-bound trade services (e.g., plumbing, mechanic, repair, lawn/landscaping, electrician, carpentry, moving and shipping services, and the like), legal services (reporting on crime or court order violations, trespassing, property damage, littering, zoning, etc. violations) and administrative services, such as collection of customer's critiques and complaints (e.g., to rate customer demands and/or quality of particular services at the identified locations).

Other examples of the administrative services may include verification of information in company records, verification of agreements between service providers, collection of competitive business intelligence, governmental administrative functions such as processing of legal rights, permits, licenses or credit checks, resolution of billing disputes, and technical/online support.

In some implementations, the method 1100 relates to applications that allow an end user (e.g., customer) purchase and/or bid on goods in transit. Such goods may be subject to expiration dates and/or their price may otherwise be a subject to negotiations. For example, in particular embodiments, the method 1100 relates to delivery services which products in transit are subject to expiration dates (e.g., deliveries of prepared foods, flowers, etc.) and the price the products in transit may depend on a duration of the time remaining to the expiration dates and, as such, current geographical locations of the goods, end user, or both.

In the depicted embodiment, at step 1110, an administrative service provider (i.e., administrator of the DODAT™ system) receives from its client (i.e., $1^{st}$ party) a message containing a request for a particular service or a response (e.g., legal or administrative action, and the like) to the provided information and including geographic coordinates of the location where service should be or was completed or, alternatively, the information relates to or was originated. The message may be received via an electronic means (e.g., processor) or non-electronic means, and at least portions of the message may relate to time-sensitive events or products.

In exemplary applications, the administrator may be an individual (broker, accountant, attorney, trustee, agent, and the like) or an entity utilizing the DODAT™ system. Alternatively, at least a portion of functions of the administrator may be performed by a computer program running on a computer(s) accessible by the $1^{st}$ party.

At optional step 1112, a technical means for collecting and documenting the information or confirming completion of the service may be provided, in advance, to the requesting party or, alternatively, the administrator of the DODAT™ system. Such a means may include, e.g., an Internet connection, a digital still or video camera, a GPS (Global Positional System) enabled recording device, a mobile computing device such as a tablet or a smart phone, or a combination thereof).

At step 1120, the administrator of the DODAT™ system generates at least one distributive on demand administrative task ticket related to verification and processing of the request of step 1110. Such distributive on demand administrative task ticket(s) are generally saved on the DODAT™ server (discussed in reference to FIGS. 3, 5a-5b, 7, and 9), include fields for relevant sub-tasks, and may be provided with attributes defining their degree of urgency, particular need dates/time, and other specific conditions. When such conditions are violated or there is a substantial risk of their violation, the DODAT™ system may generate alarm signals directed to personnel assigned to these ticket(s) and/or the administrator.

At step 1130, the distributive on demand administrative task ticket(s) generated at step 1120 is(are) processed within the DODAT™ system, as discussed above in reference to FIGS. 4a-4b, 5a-5b, 6a-6c, 7, and 8a-8b. Noticed discrepancies and/or errors are reported to the $1^{st}$ party for taking corrective actions. In some cases, the $2^{nd}$ party may also be contacted to resolve the discrepancies and/or errors.

In general, the ticket can be assigned to the distributive on demand administrative task personnel (e.g., one or several administrators of the DODAT™ system or their staff) which parses the message received at step 1110, and then extracts relevant reference information from the message and/or the DODAT™ database (discussed in reference to FIGS. 5a-5b, 7 and 9), as well as uses records available from other data depositories to verify validity, terms, conditions and status of the service or received information. In some embodiments, information and records of interest may be accessed using mobile computing devices, such as a tablet, a smart phone, and the like.

In optional embodiments, the DODAT™ system may assign remuneration values for completing a distributive on demand administrative task ticket or a portion thereof, as well as offer the ticket or its portions for processing to a winning bidder. At least a portion of these tasks may be performed using computers associated the DODAT™ system.

Retrieved reference data generally includes (i) a description of the distributive on demand service or a description of the provided information, and (ii) the geographic coordinates of a location where the service was completed or the information was recorded. In further embodiments, the completion data may also include an amount of time expected and/or actually spent by the service provider at the identified location.

The results of the processing may be presented in tabular, graphical, and other formats. Noticed discrepancies and/or errors are reported to the $1^{st}$ party for taking corrective actions. In some cases, the $2^{nd}$ party may also be contacted to resolve the discrepancies and/or errors.

Illustrative examples of provided services include ordering deliveries to or repairs at particular location identified by their geographic coordinates and control over their completion. When such deliveries relate to perishable goods (e.g., pizza, flowers, etc.) or time-sensitive services, the DODAT™ system may determine or negotiate their prices as a function of the time remaining to the respective expiration or due dates. In some embodiments, the administrator of the DODAT™ system may be given the authority to penalize the $2^{nd}$ party for the confirmed legal violations and/or reward the reporting party (e.g., $1^{st}$ party) for the provided information.

Correspondingly, illustrative examples of the received information may include records of violations (e.g., picture evidence of crime, parking or zoning violations, trespassing, property damage, etc.) at the identified locations, whereas administrative services may relate to responses on customer's critiques and complaints at these locations.

At step 1140, the method 1100 queries whether all terms and conditions of the request of step 1110 are verified, matched, and/or positively confirmed. In particular, the method 1100 compares the distributive on demand service completion records or responses to the provided information with the distributive on demand service data to determine if the geographic coordinates of the physical origin of the distributive on demand service completion records or provided information comport with the geographic coordinates of the location where the distributive on demand service was completed or the information recorded. If the query is answered negatively, the method 1100 proceeds back to step 1130. If the query of step 1140 is answered affirmatively, the method 1000 proceeds to step 1150.

In a further embodiment, at an optional step 1142, the method 1100 may generate a distributive on demand administrative audit task ticket to investigate whether the distributive on demand service has been completed or a response to the provided information has been received, or to determine reasons for delays in the completion or expected response.

Illustrative examples of confirmed completion of performed services or responses to the provided information identified by their geographic coordinates communicated at step 1110, include verification of deliveries to or repairs performed at these location(s) by picture evidences, confirmation receipt(s) or reports from corresponding authorities, photographs taken at or proximate to the locations identified by their geographic coordinates, and witness testimonies, among other documents or articles of graphical evidence.

At step 1150, the administrator of the DODAT™ system closes the ticket(s) generated at 1120, authorizes (i.e., initiates) the DODAT™ processing fee and, if requested by the $1^{st}$ party, payments to service providers, as well as payments (e.g., awards) to the sources of provided information. The payments to the service providers are generally contractual or otherwise negotiated sums.

Alternatively or additionally, these payments at least in part may be determined by weather conditions, season, specific dates (e.g., weekdays, weekend, holidays), time spent for completing the assignment, among other materially relevant conditions and circumstances. The DODAT™ processing fees (i.e., remuneration) are generally agreed upon in advance by the $1^{st}$ party and the administrator or alternatively, by all parties involved, and may depend on urgency and the scope of the assignment. Typically, the administrator of the DODAT™ system maintains for future reference records of the assignments and clients in the database of the system.

In one illustrative application, the method 1100 is used in a food industry for delivery comestible products, such as pizza. A comestible product can be assigned a profile or other data describing the product (e.g., type, size, toppings, etc.), and applicable regulatory requirements (e.g., time stamp of when the pizza was cooked, price, and expiration date), and the product or its delivering vehicle may be provided with means (e.g., GPS marker or tracking device) providing, in real time, tracking of their current geographical location. At step 1110, a $1^{st}$ party (e.g., client of the DODAT™ system) may place with an administrator of the DODAT™ system a request for negotiating the price and ordering a particular pizza and delivering it, by a specific time, to a location at particular geographic coordinates. At step 1120, the administrator of the DODAT™ system generates at least one distributive on demand administrative task ticket related to verification and processing of the request of step 1110 and, at step 1130, the ticket(s) are processed. In particular, the DODAT™ system verifies the description of the product and its compliance with the regulatory requirements, ability of the delivery service to meet the delivery schedule, negotiates the price for the service (e.g. with a driver or a pizza cooking facility). Then, the DODAT™ system places the order and verifies its completion (i.e., timely delivery of the ordered pizza to the location at the identified geographic coordinates). When some instructions of the $1^{st}$ party cannot be met, the DODAT™ system contacts the $1^{st}$ party for additional instructions and inquires whether available terms are acceptable to the $1^{st}$ party. At step 1140, the DODAT™ system queries if all terms of the original or amended request of step 1110 have been satisfied and repeats returning to step 1130 until the query is answered affirmatively. Thereafter, the method 1100 proceeds to step 1150, where the DODAT™ system closes the open ticket(s) and initiates payment for the delivered pizza and collection of its service fees.

In another illustrative application, the method 1100 is used for reporting on automotive-related legal violations, such as parking, speeding, running a red light, changing lanes without signaling or driving under the influence of alcohol or controlled substance violations as defined by the respective laws or regulations. At step 1110, a $1^{st}$ party (e.g., client of the DODAT™ system) provides an administrator of the DODAT™ system with information related to recorded legal violation at a location identified by its geographic coordinates and requests to follow up on the information. Such documented information may be originated by a person using a GPS-enabled recording device or, alternatively, by an automatic recording apparatus. At step 1120, the administrator of the DODAT™ system generates at least one distributive on demand administrative task ticket for verifying the provided information and monitoring processing of the information by the respective authorities (e.g., the Police, Motor Vehicle Department, etc.) and, at step 1130, the ticket(s) are processed. In particular, the DODAT™ system verifies facts relevant to the reported violation, forwards the confirmed information to the authorities, and follows up on the provided information until receiving their response. The DODAT™ system may also contact the $1^{st}$ party or the authorities for additional information and/or clarifications. At step 1140, the DODAT™ system queries if all terms of the request of step 1110 have been satisfied and repeats returning to step 1130 until the query is answered affirmatively. Thereafter, the method 1100 proceeds to step 1150, where the DODAT™ system closes the open ticket(s) and initiates collection of its service fees and, when authorized, payment of optional awards payment for reporting on the legal violation.

In order to address various issues and advance the art, the entirety of this application for DISTRIBUTIVE ON-DEMAND ADMINISTRATIVE TASKING APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DODAT™ embodiments individual and/or enterprise user, database configuration and/or relational model, data type, data transmission and/or network framework, syntax structure, and/or the like, various of the DODAT™ embodiments, may be implemented that enable a great deal of flexibility and customization. For example, aspects of the DODAT™ embodiments may be adapted for reporting incidents to authorities.

For example, a user could take a picture of a ticketable offense, such as illegal parking, a car missing a license plate, and/or the like, using his mobile device. The mobile device may attach EXIF data to the photo, including the date and location where it was taken. The user may then be able to send the photo to a local police station, Department of Motor Vehicles, and/or a like office, where a ticket may be created to verify the violation. If the violation appears valid, personnel may either issue a warning, ticket, and/or like punishment to the party committing the offense, based on information present in the user's photograph, or may contact the user in order to obtain more information about the part committing the offense, such as the license plate of the car, and/or like information. A similar system may also be used to report general crimes, to speed up the process of dialing 911, and/or a similar purpose.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of circuitry and method steps and computer programs represent conceptual embodiments of illustrative circuitry and software embodying the principles of the disclosed embodiments. Thus the functions of the various elements shown and described herein may be provided through the use of dedicated hardware as well as hardware capable of executing software in association with appropriate software as set forth herein.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable media and so executed by a computer or processor, whether or not such computer or processor is explicitly shown. Moreover, the various processes can be understood as representing not only processing and/or other functions but, alternatively, as blocks of program code that carry out such processing or functions.

The methods, systems, computer programs and mobile devices of the present disclosure, as described above and shown in the drawings, provide for improved approaches for managing tasks. It will be apparent to those skilled in the art that various modifications and variations can be made in the devices, methods, software programs and mobile devices of the present disclosure without departing from the spirit or scope of the disclosure. Thus, it is intended that the present disclosure include modifications and variations that are within the scope of the subject disclosure and equivalents.

What is claimed is:

1. A method for operating a computerized task management system, the method comprising:
    a) executing computer-readable code of the system on a server accessible by at least one manager of the system to provide an application programming interface (API) to a user to receive order data from the user to create a task ticket;
    b) in response to receiving the order data from the user via the API:

(i) transforming using JSON encoding the order data into task data to be further processed via at least one processor circuit on the server;
(ii) creating via processor from the task data at least one computer-accessible task ticket having fields identifying at least four of (i) a ticket ID, (ii) a ticket priority, (iii) a ticket timestamp, (iv) a ticket due date, (v) a ticket status, (vi) a ticket value, (vii) a ticket supervisor, (viii) a ticket assignee, (ix) a ticket key, (x) a task status, and (xi) at least one task requirement; and
(iii) storing the at least one task ticket in a database accessible by the server via the at least one processor circuit;

c) managing selective availability of the at least one task ticket in a queue for a service provider to select via API;

d) permitting the at least one task ticket to be accepted by the service provider via the API, wherein the ticket is provided by way of a ticket retrieval request that accesses and API call to the server;

e) receiving acceptance information indicating that the at least one task ticket has been accepted by the service provider;

f) receiving completion information from the service provider via the API indicating that the at least one task has been completed, wherein the completion information includes verification information in the form of an electronic message including geo-coordinates of the service provider in the form of JSON-encoded text data, and further wherein the verification information includes a digital image tagged with said geo-coordinates, said geo-coordinates corresponding to a location where a task is to be performed;

g) parsing the JSON-encoded text data of the verification information into PHP script variables;

h) analyzing the verification information via the at least one processor circuit to determine if an image including EXIF data is included in the verification information and whether the geo-coordinates in the verification information indicate that the verification information was generated at geo-coordinates corresponding to the location where the task was to be performed; and i) responsive to receipt of the completion information, automatically remunerating the service provider via the at least one processor circuit for performing the at least one task, wherein automatically remunerating the service provider occurs responsive to determining that the verification information was generated at the geo-coordinates corresponding to the location where the task was to be performed.

2. The method of claim 1, wherein the database includes a transactions table that includes at least three of: (i) a transaction ID field, (ii) a transaction payee field, (iii) a transaction payer field, (iv) a transaction timestamp field, (v) a transaction amount field, (vi) transaction billing information field, and (vii) transaction relevant ticket information field.

3. The method of claim 1, wherein the database includes an expected information table including at least three of: (i) an expected information ID field, (ii) an expected information field, (iii) a relevant ticket field, (iv) a field for receiving GPS coordinates of a service provider, (v) a field for receiving GPS coordinates of a customer, (vi) a field for a price for goods, (vii) a field for receiving a description of goods, (viii) an expiration time field and (ix) a field for a description of services to be performed.

4. The method of claim 1, wherein the at least one task relates to at least one of: (i) verification of information in company records, (ii) verification of agreements between service providers, (iii) collection of competitive business intelligence, (iv) governmental administrative functions such as processing of legal rights, permits, licenses or credit checks, (v) resolution of billing disputes, and (vi) technical/online support.

5. The method of claim 1, wherein the at least one order relates to the transportation industry.

6. The method of claim 5, wherein the at least one order relates to the transportation of goods.

7. The method of claim 1, wherein the managing step includes awarding the at least one task ticket to a service provider that has won a bit for the at least one task ticket.

8. The method of claim 1, wherein the managing step includes assigning a priority level to the at least one task ticket.

9. The method of claim 8, wherein the at least one task ticket is made available in the permitting step via the at least one processor circuit if the priority level meets or exceeds a threshold value.

10. The method of claim 1, wherein the creating step includes assigning at least one time frame for execution of the at least one task.

11. The method of claim 1, wherein the remuneration step includes compensating the service provider via the at least one processor circuit in accordance with pre-defined compensation schedule.

12. The method of claim 1, wherein the managing step includes allowing the at least one manager of the system to modify the at least one task ticket via the at least one processor circuit.

13. The method of claim 1, wherein the automatically remunerating step includes retrieving financial information to electronically provide the service provider with the remuneration, wherein the financial information includes direct deposit account information for the service provider.

14. The method of claim 13, wherein the server sends a request to a financial institution holding an account of the service provider via an API call to a server of the financial institution to update the service provider's accessor's account balance with the remuneration.

15. The method of claim 14, wherein the server saves a record of the payment in a transactions table of database.

16. The method of claim 1, wherein the API functions are executed through a Web server operably coupled to the server.

17. The method of claim 1, wherein:
(i) the server is configured to automatically process order data provided in the form of a facsimile message, wherein the server parses the facsimile message to identify and extract the task data; and
(ii) the server is configured to automatically process order data provided in the form of an electronic mail message, wherein the server parses the electronic mail message to identify and extract the task data;
wherein:
  the task data includes a key word;
  the server assigns a priority value to the ticket based on detecting the key word to create a priority ticket; and
  the server posts the priority ticket proximate a top of a ticket queue in the server.

* * * * *